(12) United States Patent
Wolfenbarger

(10) Patent No.: US 11,920,653 B1
(45) Date of Patent: Mar. 5, 2024

(54) DRIVESHAFT DAMPER

(71) Applicant: Caraustar Industrial and Consumer Products Group, Inc., Austell, GA (US)

(72) Inventor: Josh Wolfenbarger, Ida, MI (US)

(73) Assignee: CARAUSTAR INDUSTRIAL AND CONSUMER PRODUCTS GROUP, INC., Austell, GA (US)

( * ) Notice: Subject to any disclaimer, the term of this patent is extended or adjusted under 35 U.S.C. 154(b) by 578 days.

(21) Appl. No.: 17/076,079

(22) Filed: Oct. 21, 2020

Related U.S. Application Data

(63) Continuation of application No. 16/198,089, filed on Nov. 21, 2018, now Pat. No. 10,844,928.

(60) Provisional application No. 62/748,024, filed on Oct. 19, 2018, provisional application No. 62/589,806, filed on Nov. 22, 2017.

(51) Int. Cl.
    *F16F 15/129* (2006.01)
    *F16C 3/02* (2006.01)

(52) U.S. Cl.
    CPC ............ *F16F 15/129* (2013.01); *F16C 3/023* (2013.01); *F16F 2226/04* (2013.01)

(58) Field of Classification Search
    CPC ...... F16F 15/129; F16F 2226/04; F16C 3/023
    USPC ................................ 464/180, 181; 428/36.9
    See application file for complete search history.

(56) References Cited

U.S. PATENT DOCUMENTS

| | | |
|---|---|---|
| 3,075,406 A | 1/1963 | Butler, Jr. et al. |
| 3,430,543 A | 3/1969 | Cunningham |
| 3,548,724 A | 12/1970 | Hall |
| 3,567,101 A | 3/1971 | Ranne |
| 4,331,305 A | 5/1982 | Marquis et al. |
| 4,454,734 A | 6/1984 | Marquis et al. |
| 4,507,351 A | 3/1985 | Johnson et al. |
| 4,621,508 A | 11/1986 | Baxley, Jr. et al. |
| 4,863,416 A * | 9/1989 | Gupta ............... B29C 53/58 464/181 |
| 4,909,361 A | 3/1990 | Stark et al. |
| 5,094,404 A | 3/1992 | BesRosiers et al. |
| 5,331,737 A | 7/1994 | Jarvela |
| 5,571,883 A | 11/1996 | Jourdain et al. |
| 5,643,093 A | 7/1997 | Breese |
| 5,673,437 A | 10/1997 | Chase et al. |

(Continued)

FOREIGN PATENT DOCUMENTS

| | | | |
|---|---|---|---|
| GB | 1167032 A | 10/1969 | |
| WO | 2008/005863 A2 | 1/2008 | |

OTHER PUBLICATIONS

Higgins, R. A., "Properties of Engineering Materials," 2nd ed. Industrial Press Inc., 1994, p. 314. [Cited in Specification].

(Continued)

*Primary Examiner* — Greg Binda
(74) *Attorney, Agent, or Firm* — Additon, Pendleton & Witherspoon, P.A.

(57) ABSTRACT

Driveshaft dampers are provided for use in driveshafts to dampen or attenuate aspects of noise, vibration, and harshness (NVH). Systems and methods for making and using driveshaft dampers are further provided. The driveshaft dampers may be made using a helical-winding process and include attenuation strips with elongate protrusions. Various embodiments of helically-wound driveshaft dampers include a core and one or more attenuation strips helically wound around the core.

35 Claims, 50 Drawing Sheets

(56) References Cited

U.S. PATENT DOCUMENTS

| | | | |
|---|---|---|---|
| 5,693,166 A * | 12/1997 | Crane | B29D 99/0035 |
| 5,699,683 A | 12/1997 | Rieker | |
| 5,904,622 A | 5/1999 | Breese et al. | |
| 5,924,531 A | 7/1999 | Stark et al. | |
| 5,976,021 A | 11/1999 | Stark et al. | |
| 6,234,911 B1 | 5/2001 | Breese et al. | |
| 6,247,346 B1 | 6/2001 | Dickson, Jr. | |
| 6,370,756 B1 | 4/2002 | Conger et al. | |
| 6,520,678 B2 | 2/2003 | Aiken et al. | |
| 6,662,423 B2 | 12/2003 | Menosky et al. | |
| 6,719,230 B2 | 4/2004 | Baranov et al. | |
| 6,752,722 B2 | 6/2004 | Armitage et al. | |
| 6,854,685 B2 | 2/2005 | Couchey | |
| 7,083,523 B2 | 8/2006 | Haile et al. | |
| 7,774,911 B2 | 8/2010 | Sun et al. | |
| 8,176,613 B2 | 5/2012 | Sun et al. | |
| 8,528,180 B2 | 9/2013 | Sun et al. | |
| 8,801,526 B1 | 8/2014 | Conger et al. | |
| 8,832,941 B1 | 9/2014 | Pennington et al. | |
| 8,863,390 B1 | 10/2014 | Ley et al. | |
| 9,033,807 B1 | 5/2015 | Ley et al. | |
| 9,175,718 B1 | 11/2015 | Ley et al. | |
| 9,599,147 B1 | 3/2017 | Conger et al. | |
| 9,890,808 B2 | 2/2018 | Wang | |
| 9,933,020 B2 | 4/2018 | Leko et al. | |
| 10,018,244 B2 | 7/2018 | Ley et al. | |
| 10,508,681 B1 | 12/2019 | Conger et al. | |
| 10,641,354 B1 | 5/2020 | Conger et al. | |
| 10,844,928 B1 | 11/2020 | Wolfenbarger | |
| 11,781,617 B1 | 10/2023 | Wolfenbarger | |
| 2005/0049054 A1 | 3/2005 | Laskey | |
| 2006/0276250 A1 | 12/2006 | Tkacik et al. | |
| 2006/0276251 A1 | 12/2006 | Tkacik et al. | |
| 2006/0276252 A1 | 12/2006 | Tkacik et al. | |
| 2007/0087848 A1 | 4/2007 | Larsen et al. | |
| 2009/0005183 A1 | 1/2009 | Baumhauer et al. | |
| 2009/0015913 A1 | 1/2009 | Bratt et al. | |
| 2009/0048031 A1 | 2/2009 | Conger et al. | |
| 2018/0313428 A1 | 11/2018 | Ley et al. | |

OTHER PUBLICATIONS

Dow Corning, Product information on Dow Corning's 3-8186 Thixotropic Foam, Midland, MI (1997), pp. 1-2.

Dow Corning, Material Safety Data Sheet, Dow Corning(R) 3-8186 Thixotropic Foam Part B, Midland, MI, pp. 1-7, Feb. 6, 2002.

Dow Corning, Material Safety Data Sheet, Dow Corning(R) 3-8186 Thixotropic Foam Base, Midland, MI, pp. 1-7, Sep. 26, 2002.

Siversten, Katrine, Polymer Foams, Spring 2007, Massachusetts Institute of Technology, Polymer Physics 3.063, pp. 1-17 [parent U.S. Appl. No. 12/650,763].

A & D Rubber Products Company [online] Dec. 17, 2003 {retrieved on Aug. 12, 2009} Retrieved from the Internet: URL http://web.archive org/web/20031217073911/http://adrubber.com/materials.html, pp. 1-5 [parent U.S. Appl. No. 12/650,763].

International Search Report and Written Opinion in commonly owned International Application No. PCT/US2007/072529 dated Aug. 5, 2008.

International Preliminary Report on Patentability in commonly owned International Application No. PCT/US2007/072529 dated Jan. 6, 2009.

Sun, Zhaohui et al., "Attenuation of Driveline Vibrations through Tuning of Propeller Shaft Liners", SAE International, May 17, 2011, pp. 1-8.

Ley, Jason et al., "Optimization of Propshaft Liner Tuning and Damping: A SYLENT Approach", SAE International, Jun. 15, 2015, pp. 1-5.

* cited by examiner

ABSORBER w/BARRIER　　FIG. 36

Frequency Response Function
Comparative "DAS-1EP" Driveshaft Damper

Frequency Response Function
*"DAS-3EP" Driveshaft Damper*

Frequency Response Function
*Surficial-Foam "SAS-3EP" Driveshaft Damper*

Frequency Response Function
*Dual Driveshaft Dampers*

Frequency Response Function
*Empty Steel Propshaft Tube*

Frequency Response Function
*Dual Driveshaft Dampers*

DRIVESHAFT DAMPER

CROSS-REFERENCE TO PRIORITY APPLICATIONS

This application is a continuation of U.S. patent application Ser. No. 16/198,089 for Methods for Making Driveshaft Dampers, (filed Nov. 21, 2018), now U.S. Pat. No. 10,844,928, which itself claims the benefit of U.S. Patent Application No. 62/589,806 for Driveshaft Dampers and Systems and Methods for Making the Same (filed Nov. 22, 2017) and U.S. Patent Application No. 62/748,024 for Driveshaft Dampers and Systems and Methods for Making and Using the Same (filed Oct. 19, 2018). Each of the foregoing commonly assigned patent applications is hereby incorporated by reference in its entirety.

FIELD OF THE INVENTION

The present disclosure relates to driveshaft dampers that may be installed in driveshafts to dampen or attenuate noise, vibration, and harshness (NVH), and systems and methods for making and using driveshaft dampers. The present disclosure further relates to the use of driveshaft dampers in various power-transfer systems, including automotive drivetrains, propeller shafts, industrial machinery, and other equipment.

BACKGROUND

Many kinds of machinery use a driveshaft for power transfer. Driveshafts are commonly used in automotive powertrains, such as in cars, trucks, tractors, all-terrain vehicles, rolling stock, and heavy machinery. Additionally, driveshafts are commonly used in marine powertrains, such as in boats and other marine vessels and aquatic machinery. Further, industrial machinery in a manufacturing facility or a processing plant may use driveshafts for power transfer. Those having ordinary skill in the art will appreciate numerous other applications that utilize driveshafts.

A driveshaft conventionally employs a driveshaft damper to help attenuate aspects of noise, vibration, and harshness arising from various sources. Noise, vibration, and harshness are commonly referred to collectively as "NVH" throughout the automotive and various other industries. NVH can sometimes be transmitted or amplified to other components and/or into the passenger cabin of a vehicle. It is desirable to dampen or attenuate NVH associated with a driveshaft and related machinery to provide for quieter and smoother operation, to reduce wear and tear, and to improve operator comfort. Sometimes, a driveshaft may transmit or even amplify NVH originating from various powertrain components or from outside sources. For example, an automotive driveshaft may transmit NVH into the cabin of a vehicle, causing cabin occupants to experience annoying or uncomfortable aspects of NVH, such as road noise. A need therefore exists to provide improved driveshaft dampers to better dampen or attenuate NVH, providing for (i) quieter and smoother powertrain operation, (ii) reduced wear and tear on powertrain and other components that may be vulnerable to various aspects of NVH, and (iii) improved operator comfort such as by reducing cabin noise.

Some driveshaft dampers are known in the art. For example, the following commonly assigned patents, patent applications, and patent application publications provide driveshaft dampers that address NVH and other issues, each of which is hereby incorporated by reference in its entirety:

U.S. patent application Ser. No. 14/317,636, filed Jun. 27, 2014, now U.S. Pat. No. 9,599,147, which issued on Mar. 21, 2017, which is a division of U.S. patent application Ser. No. 13/681,851, filed Nov. 20, 2012, now U.S. Pat. No. 8,801,526, which issued on Aug. 12, 2014, which is a continuation-in-part of U.S. patent application Ser. No. 12/650,763, filed Dec. 31, 2009, which itself claims the benefit to U.S. Patent Application No. 61/141,952, filed Dec. 31, 2008, and U.S. Patent Application No. 61/143,610, filed Jan. 9, 2009;

U.S. patent application Ser. No. 14/585,859, filed Dec. 30, 2014, now U.S. Pat. No. 10,641,354, which issued May 5, 2020, which claims the benefit of U.S. Patent Application No. 61/922,562, filed Dec. 31, 2013, and which is a continuation-in-part of U.S. patent application Ser. No. 14/317,636, filed Jun. 27, 2014, now U.S. Pat. No. 9,599,147, which issued on Mar. 21, 2017, which is a division of U.S. patent application Ser. No. 13/681,851, filed Nov. 20, 2012, now U.S. Pat. No. 8,801,526, which issued on Aug. 12, 2014, which is a continuation-in-part of U.S. patent application Ser. No. 12/650,763, filed Dec. 31, 2009, which itself claims the benefit to U.S. Patent Application No. 61/141,952, filed Dec. 31, 2008, and U.S. Patent Application No. 61/143,610, filed Jan. 9, 2009;

U.S. patent application Ser. No. 12/256,553, filed Oct. 23, 2008, and published as U.S. Pub. No. 2009/0048031 on Feb. 19, 2009, which is a continuation of International Application No. PCT/US07/72529, filed Jun. 29, 2007, and published as International Pub. No. WO 2008/005863 A2, which itself claims the benefit of U.S. Patent Application No. 60/806,379, filed Jun. 30, 2006;

U.S. patent application Ser. No. 11/422,631, filed Jun. 7, 2006, and published as U.S. Pub. No. 2006/0276250 on Dec. 7, 2006, which claims the benefit of U.S. Patent Application No. 60/688,054, filed Jun. 7, 2005;

U.S. patent application Ser. No. 11/422,660, filed Jun. 7, 2006, and published as U.S. Pub. No. 2006/0276251 on Dec. 7, 2006, which claims the benefit of U.S. Patent Application No. 60/688,054, filed Jun. 7, 2005;

U.S. patent application Ser. No. 11/422,759, filed Jun. 7, 2006, and published as U.S. Pub. No. 2006/0276252 on Dec. 7, 2006, which claims the benefit of U.S. Patent Application No. 60/688,054, filed Jun. 7, 2005;

U.S. Pat. No. 6,370,756, which issued on Apr. 16, 2002, from U.S. patent application Ser. No. 09/572,767, filed May 17, 2000;

U.S. Pat. No. 5,976,021, which issued on Nov. 2, 1999, from U.S. patent application Ser. No. 08/892,146, filed Jul. 14, 1997;

U.S. Pat. No. 5,924,531, which issued on Jul. 20, 1999, from U.S. patent application Ser. No. 08/721,550, filed Sep. 26, 1996; and U.S. Pat. No. 4,909,361, which issued on Mar. 20, 1990, from U.S. patent application Ser. No. 07/257,070, filed Oct. 13, 1988.

The present disclosure provides even further improved driveshaft dampers and systems and methods for making and using driveshaft dampers.

SUMMARY

The present disclosure embraces driveshaft dampers for use in driveshafts (e.g., vehicle driveshafts, propeller shafts, machinery, etc.) to dampen or attenuate noise, vibration, and harshness (NVH). The present disclosure further embraces systems and methods for making and using driveshaft dampers. The driveshaft dampers may be formed using a helical-winding process and may include attenuation strips (e.g., polymeric retaining members) with a plurality of elongate protrusions (e.g., attenuation tape or ribbon with a plurality of elongate protrusions configured for interference fit within a driveshaft).

In one aspect, the present disclosure embraces helically-wound driveshaft dampers including a core or other substantially cylindrical structure having a plurality of helically-wound plies of a core material and one or more attenuation strips helically wound around the core. In exemplary embodiments, the plies of core material (e.g., strips of paper, paperboard, or other core materials) may have a width of about 2 to 5 inches. An exemplary helically-wound core may exhibit a pitch angle θ (theta) of about 45 to 74 degrees and an outer diameter of between about 3 inches and 5 inches. The attenuation strips typically include a plurality of elongate protrusions (e.g., at least three elongate protrusions).

In another aspect, the present disclosure embraces attenuation strips configured for making helically-wound driveshaft dampers. Exemplary attenuations strip may include a plurality of elongate protrusions. In some exemplary embodiments, the attenuation strips include a base configured to be adhered to a core and elongate protrusions extending upwardly from the base. Exemplary attenuation strips exhibit a base-to-protrusion ratio BPR of at least 8 and a protrusion-spacing ratio PSR between 1 and 5.

In yet another aspect, the present disclosure embraces methods of making driveshaft dampers, including helically-wound driveshaft dampers and convolute driveshaft dampers. Exemplary methods of making driveshaft dampers include helically winding plies of core material around a mandrel at a winding angle $θ_w$ to form a core, and concurrently helically winding one or more attenuation strips (e.g., a "triple-ridge" attenuation strip) around the core as the core advances longitudinally along the mandrel and securing the one or more attenuation strips to the core at a pitch angle θ. A driving force may be provided to helically wind the plies of core material and to advance the core material longitudinally along the mandrel.

The foregoing illustrative summary, other objectives and/or advantages of the present disclosure, and the manner in which the same are accomplished are further explained within the following detailed description and its accompanying drawings.

BRIEF DESCRIPTION OF THE DRAWINGS

The drawings are provided as examples, may be schematic, and may not be drawn to scale. The present inventive aspects may be embodied in many different forms and should not be construed as limited to the examples depicted in the drawings.

DETAILED DESCRIPTION

In this detailed description, various aspects and features are herein described with reference to the accompanying figures. These aspects and features generally pertain to driveshaft dampers for use in driveshafts to dampen or attenuate noise, vibration, and harshness (NVH), and to systems and methods for making and using driveshaft dampers. Exemplary driveshaft dampers include helically-wound driveshaft dampers having one or more attenuation strips (e.g., attenuation tape-like structures, such as elastomeric attenuation strips) helically wound around a core or other substantially cylindrical structure. The core may be formed from a plurality of plies of helically-wound core material laminated with an adhesive.

Specific details are set forth to provide a thorough understanding of the present disclosure. It will be apparent, however, to those having ordinary skill in the art that the disclosed driveshaft dampers, systems, and methods may be performed without some or all of these specific details. As another example, features disclosed as part of one embodiment can be used in the context of another embodiment to yield a further embodiment. In some instances, well-known aspects have not been described in detail to avoid unnecessarily obscuring the present disclosure. This detailed description is therefore not to be taken in a limiting sense, and it is intended that other embodiments are within the spirit and scope of the present disclosure.

Figure 1:
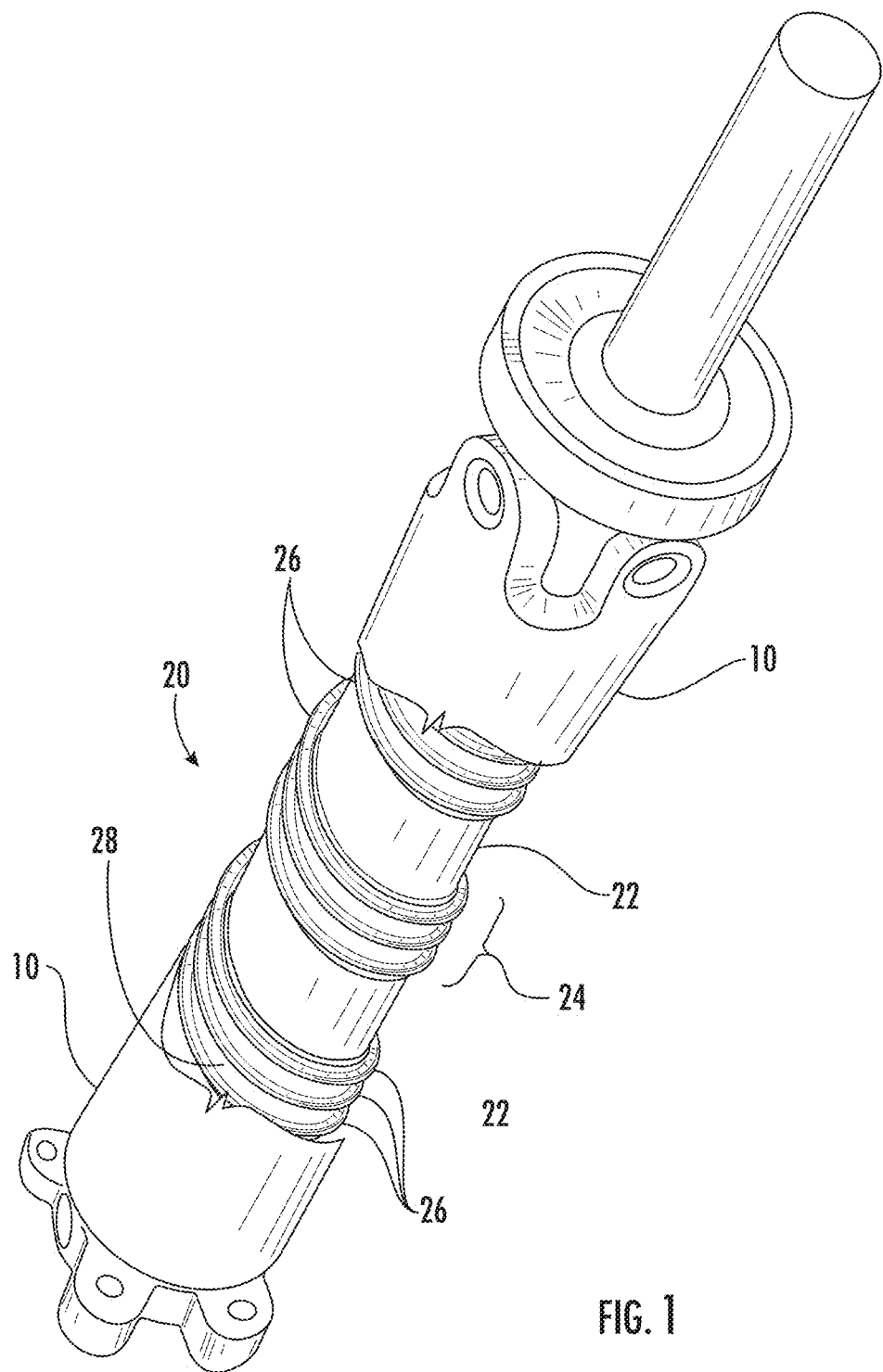
FIG. 1 is a cut-away perspective view of a driveshaft showing an exemplary driveshaft damper installed in the driveshaft.

FIG. 1 is a schematic, cut-away, perspective view of a driveshaft 10 showing an exemplary driveshaft damper 20 installed therein, in accordance with an embodiment of this disclosure. In FIG. 1, an intermediate, lengthwise portion of the driveshaft 10 is cut away to show a portion of the damper 20 that is normally hidden from view within the driveshaft. Those having ordinary skill in the art will appreciate that the driveshaft 10 may be configured for use with any number of various applications. As examples, a dampened tubular driveshaft 10 with a driveshaft damper 20 frictionally secured therein may be provided for: automotive powertrains such as those commonly used in cars, trucks, tractors, all-terrain vehicles, rolling stock, heavy machinery; marine powertrains, such as those commonly used in boats and other marine vessels and aquatic machinery; and industrial machinery in a manufacturing facility or processing plant. Generally, a driveshaft damper 20 will be installed in a hollow region of a tubular driveshaft 10 as depicted in FIG. 1. Such a driveshaft damper 20 may be installed in any suitable driveshaft, such as a main driveshaft or a half shaft. For example, a vehicle may have a main driveshaft that transfers power to a main drive axle and a half shaft that transfers power to an auxiliary drive axle. The main drive axle may be configured to transfer power to the rear wheels and the auxiliary drive axle may be configured to transfer power to the front wheels, or vice versa.

During normal vehicle operation, internal factors within the operation of the vehicle's transmission and rear axle (e.g., gear mesh, axle whine, and clutch clunk), along with external factors (e.g., operational vehicle speed, operational vehicle load, or critical vehicle speed), can cause excitation of the driveshaft 10 (e.g., the propshaft tube), thereby amplifying NVH. Resonance dampers 20 can limit the intensity (dB) of various noises at the propshaft's natural resonance frequency when aggregated with vehicle noise occurring at those frequencies. Resonance dampers 20 can sometimes shift frequencies away from problematic natural resonance frequencies. Those having ordinary skill in the art will appreciate that some frequencies (e.g., about 600 Hz in aluminum propshafts 10) are more problematic than others, such that elevated resonance at some frequencies is not necessarily a problem until external factors or operational factors work together to amplify NVH.

With continued reference to the example depicted in FIG. 1, a representative driveshaft damper 20 typically includes a core 22 and at least one attenuation strip 24 helically wound about the circumference of the core (or the perimeter of a non-circular core). The embodiment depicted in FIG. 1 is a helically-wound driveshaft damper 20 that includes a single attenuation strip 24 mounted on the outer surface of a cylindrical core 22. The core 22 may be formed by helically winding a plurality of plies of core material. The one or more attenuation strips 24 may be helically wound around the core 22 concurrently with the winding of the plies of core material. Multiple plies of helically-wound core material may be adhesively laminated together to form the core 22. Alternatively, a core 22 may be formed using any other suitable methods, including rolling plies of core material to form a convolute tube, or extruding, pressing, or milling a core material to form a unitary core. In addition, various other driveshaft damper configurations are within the spirit and scope of the present disclosure.

NVH can sometimes be transmitted or amplified to other components, such as into the passenger cabin of a vehicle. The driveshaft damper 20 helps dampen or attenuate NVH associated with the driveshaft 10 and related equipment (not shown) to provide for quieter and smoother operation, to reduce wear and tear, and to improve operator comfort. The respective NVH components emanating from an engine, a transmission, a rear axle, or other powertrain or drivetrain components may resonate to the driveshaft 10. Even low levels of NVH may become dramatically amplified in the driveshaft 10 because of structural resonance or acoustic resonance, which can occur when the frequency of respective NVH components match a resonance frequency of the driveshaft 10. Likewise, NVH components resonating in (or emanating from) the driveshaft 10 may further resonate to adjacent components or supporting structures. Here again, even low levels of NVH resonating in (or emanating from) the driveshaft 10 may become dramatically amplified because of structural resonance or acoustic resonance of such adjacent components or supporting structures.

A driveshaft damper 20 with desired damping and attenuation characteristics may be formed using one or more core materials and attenuation strips 24 as disclosed herein. Both the properties and configuration of the core 22 and attenuation strips 24 may affect damping and attenuation characteristics of a driveshaft damper 20. Without being bound to any theory, it is thought that various features of a driveshaft damper 20 and its respective components affect NVH damping and attenuation performance factors. For example, the composition and configuration of a driveshaft damper 20 affect damping performance factors such as damping ratio $\zeta$ (zeta), Q factor, and logarithmic decrement $\delta$ (delta). Additionally, such aspects affect attenuation performance factors such as attenuation coefficient $\alpha$ (alpha). Such aspects include the nature and extent of the contact surface engaging with the inner surface of the driveshaft 10, the size and mass of the core 22, and the physical properties of the core material and attenuation strips 24.

In one aspect, a driveshaft damper 20 may be configured to operate as a passive damper, damping or attenuating NVH by absorbing energy from various components of NVH. For example, the core 22 of a driveshaft damper 20 formed from suitable materials will typically have a lower resonance frequency than that of a driveshaft 10, and as such, the core 22 isolates higher frequency NVH in the driveshaft.

In another aspect, a driveshaft damper 20 may be configured to operate as a dynamic absorber or tuned mass damper (e.g., the terms "dynamic absorber" and "tuned mass damper" are used herein interchangeably except where context requires). For example, the attenuation strips 24 may be configured to allow the core 22 to oscillate with a desired phase shift with respect to a resonance frequency of one or more NVH components. Various aspects of the driveshaft damper 20 can be configured as disclosed herein to obtain desired operability as a passive damper and/or as a dynamic absorber.

The core 22 of a driveshaft damper typically may be made from paper material (e.g., paperboard), although other suitable core material may be used in addition or as an alternative to paper material. For example, core materials may include, individually or in combination, various kinds of paperboard or other paper materials (e.g., treated paper-like materials, such as parchment paper, wax paper, or polymeric film or sheet), particle board materials, fiberboard materials, engineered wood materials, polymeric materials, plastic materials, engineered plastic materials, fiber-reinforced polymer materials, metal or metal alloy materials, carbon fiber materials, fiberglass materials, and ceramic materials (e.g., flexible ceramic). Any of these materials or combinations of these materials may be formed into a core 22 using any suitable method, including rolling plies of core material (e.g., paper plies) to form a helically-wound or convolute tube, or extruding, pressing, or milling a core material to form a unitary core. In some embodiments, a core 22 may be formed from multiple plies of core material, laminated together using an adhesive, such as emulsion adhesives (e.g., polymer dispersion adhesives and solvent-based adhesives), pressure-sensitive adhesives, contact adhesives, and thermoplastics. In some embodiments, a core 22 may be formed from multiple plies of core material wound around a unitary core in a helical or convolute manner.

The attenuation strips 24 (e.g., retaining members) are typically formed from a suitable elastomeric material, such as natural or synthetic rubber (e.g., extruded rubber). The elastomeric material may have a Shore hardness between 20 and 100 Shore A durometer (e.g., 30 to 80 Shore A hardness) in accordance with ASTM D 2000. In accordance with the present disclosure, durometer of the elastomeric material may be chosen to modify the damping characteristics of the driveshaft damper 20 (e.g., to reduce or to shift resonance frequencies). Exemplary materials for the attenuation strips 24 include ethylene propylene diene monomer (EPDM) rubber (e.g., 55+/−5 Shore A durometer), hydrogenated nitrile butadiene (HNBR), silicone rubber (e.g., 20-80 Shore A durometer, such as 45-55 Shore A durometer), and thermoplastic elastomer (TPE) material. The attenuation strips 24 are typically extruded to yield a unitary solid (e.g., extruded EPDM or silicone rubber). For example, a silicone rubber that is suitable for forming heat-resistant attenuation strips 24 is available from Timco Rubber Products, Inc. as 50 DUROMETER SILICONE. In an alternative embodiment, the elastomeric materials are aerated during extrusion or otherwise modified to form a closed-cell rubber foam (e.g., rubber sponge). One or more attenuation strips 24 are typically secured to a core (e.g., a paperboard core) about its circumference to form a driveshaft damper. As noted, the attenuation strips 24 may be secured to the core using an adhesive, such as emulsion adhesives (e.g., polymer dispersion adhesives and solvent-based adhesives), pressure-sensitive adhesives, contact adhesives, and thermoplastics.

The attenuation strips 24 are typically configured so predetermined portions (e.g., contact surfaces) of the attenuation strips frictionally engage with the inner surface of the driveshaft 10 in a predetermined manner. This both frictionally secures the driveshaft damper 20 in position within the tubular driveshaft 10 via interference fit and at least partially provides a spring rate of the driveshaft damper. The secure engagement and spring rate are cooperatively configured in a manner that allows the driveshaft damper 20 to provide good NVH damping or attenuation.

With continued reference to the example depicted in FIG. 1, the attenuation strips 24 may include at least one contact surface and at least one non-contact surface. A contact surface refers generally to any portion of an attenuation strip 24 (e.g., an outer portion of an elongate ridge or protrusion 26) that securely contacts the inner surface of the driveshaft 10. A non-contact surface refers generally to the portions of the base 28 of the attenuation strip 24 (or structures supporting the elongate protrusions 26) between or otherwise near the engageable elongate protrusions. The nature and extent of the contact surfaces may be configured to obtain desired damping or attenuation characteristics. For example, the number and configuration of the attenuation strips 24 may be configured to allow a desired oscillation under certain operating conditions of the driveshaft 10. In some embodiments, NVH damping/attenuation and oscillation performance factors may be augmented by increasing or decreasing the number of contact surfaces (e.g., outer portions of the protrusions 26) of the attenuation strips 24 engaging the inner surface of the driveshaft 10. For example, the number and arrangement of the elongate protrusions 26 may be configured as disclosed herein.

To achieve effective NVH damping, the contact surfaces of the attenuation strips 24 (e.g., the outer portions of the elongate protrusions 26) are typically configured for significant interference fit (e.g., substantial frictional fit) within a driveshaft or propshaft 10.

With respect to an attenuation strip 24, the term "significant interference fit" means that a contact surface of the attenuation strip is in forced engagement with the inner surface of the driveshaft 10 and requires more than mere touching. For example, the term "significant interference fit" embraces elongate-protrusion displacement (e.g., strain, such as bending, resulting from the interference fit reducing the height of an elongate protrusion 26 by at least 10 percent (e.g., about 15 percent) of the maximum height of an elongate protrusion (e.g., a 0.25-inch elongate protrusion displaced by at least 0.025 inch when frictionally fit within a driveshaft 10), typically at least 20 percent (e.g., strain resulting from the interference fit reducing the height of an elongate protrusion by about 25 percent) of the maximum height of an elongate protrusion (e.g., a 0.25-inch elongate protrusion displaced by at least 0.05 inch when frictionally fit within a driveshaft), and more typically at least 30 percent (e.g., strain resulting from the interference fit reducing the height of an elongate protrusion by about 35-50 percent) of the maximum height of an elongate protrusion (e.g., a 0.25-inch elongate protrusion displaced by at least 0.075 inch when frictionally fit within a driveshaft). This concept of elongate-protrusion displacement embraces the reduction in the height of the elongate protrusion 26 when a driveshaft damper 20 is installed via interference fit within a driveshaft or propshaft 10.

Similarly, with respect to a driveshaft damper 20 having an exemplary attenuation strip 24, the term "significant interference fit" means that a contact surface of the driveshaft damper (e.g., an attenuation strip with elongate protrusions 26) is in forced engagement with the inner surface of the driveshaft 10 (i.e., more than mere surficial touching). For example, for exemplary driveshaft dampers 20 having outermost diameters of between about 3 inches and 6 inches, the term "significant interference fit" embraces an interference fit having the effect of reducing the outer diameter of the damper by over 2 percent (e.g., between about 2.5 and 5 percent) of the driveshaft damper's diameter. Typically, on a percentage-of-diameter basis, driveshaft dampers 20 with smaller diameters are configured to have a larger percentage interference fit than driveshaft dampers with somewhat larger diameters (e.g., a 100-mil interference fit for a 3-inch diameter driveshaft damper as compared with a 120-mil interference fit for a 6-inch diameter driveshaft damper).

Various different embodiments are depicted in the drawings of this disclosure and discussed herein. The disclosed embodiments may be alike, except for variations noted and variations that will be apparent to those of ordinary skill in the art. For ease of understanding, similar reference numerals are used for features having at least some similarity, with the reference numerals being incremented by 100 from embodiment to embodiment.

Figure 2:
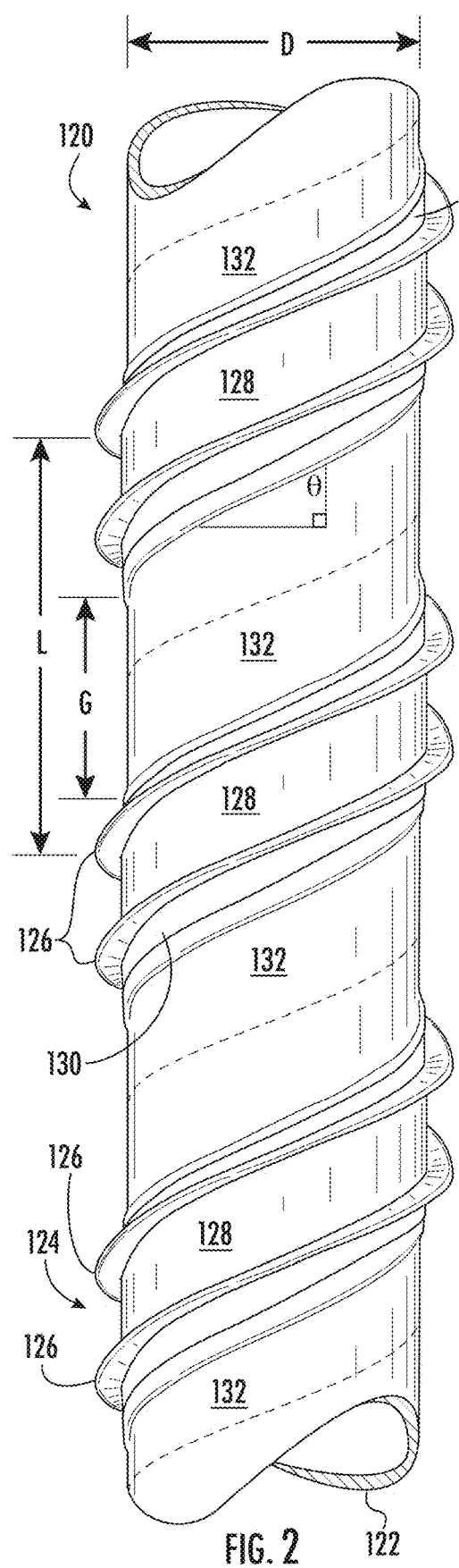
FIG. 2 depicts an exemplary helically-wound driveshaft damper that has one attenuation strip with two elongate protrusions helically wound about the circumference of a core.

FIG. 2 depicts a cut-away length of an exemplary helically-wound driveshaft damper 120 that has one attenuation strip 124 with two elongate protrusions 126 helically wound about the circumference of a core 122, in accordance with another embodiment of this disclosure. More generally with reference to FIG. 2, in an exemplary helically-wound driveshaft damper 120, one or more attenuation strips 124 helically wind about the circumference of a core 122 at a pitch angle, θ (theta). For convention, pitch angle is measured as the acute angle characterized according to this equation:

$$\theta = \arctan\left(\frac{\pi D}{L}\right), \qquad \text{(eq. 1)}$$

where L is a pitch length representing the lateral distance between windings at a given cross-sectional radian of the resulting core 122 and D is the outer diameter of the resulting core. The pitch angle θ is measured from the longitudinal axis of the tubular core 122. As such, a steeper pitch angle θ corresponds to a shorter pitch length L. As will be discussed in greater detail (below), in a given damper 120, each of the one or more attenuation strips 124 and the strips that form the core 122 (e.g., core plies) may all have the same pitch angle θ, although variations are within the scope of this disclosure.

A dimensionless pitch ratio P may be characterized according to this equation:

$$P = \frac{\text{core diameter}}{\text{pitch length}}. \qquad \text{(eq. 2)}$$

Driveshaft dampers 120 made using a typical helical-winding pitch length process may exhibit a pitch ratio P between 0.7 and 1.0. For example, a core 122 having a diameter D of 3.5 inches wound from plies of core material 4.3 inches wide provides a winding angle $\theta_w$ of about 67 degrees, which yields a pitch length L of about 4.7 inches and a pitch ratio P of about 0.75. The pitch ratio P can be modified (e.g., increased) somewhat, by adjusting (e.g., decreasing) the width of the plies of core material. For a core 122 having a diameter D of 3.5 inches, however, the plies of core material typically would not be decreased to less than 3.2 inches wide. Core material with a width of 3.2 inches provides a winding angle $\theta_w$ of 73 degrees, which yields a pitch length of about 3.3 inches, and a pitch ratio P of about 1.0.

Without being bound to any theory, it is thought that in some embodiments a driveshaft damper 120 having an attenuation strip may be configured to provide improved NVH damping or attenuation by increasing the pitch ratio P, which in turn increases the attenuation-strip contact surface engaging the inner surface of the driveshaft 10 (FIG. 1). This can be achieved, for example, by increasing the pitch ratio P of the attenuation strips 124. In some embodiments, an increase in the attenuation-strip contact surfaces engaging the inner surface of the driveshaft 10 can advantageously increase the spring rate of the driveshaft damper 120. The attenuation strips 124 may allow the driveshaft damper 120 to function as a dynamic absorber. Additionally, the attenuation strips 124 may modify the resonance frequency of the driveshaft damper 120.

When using a conventional continuous helical-winding process to simultaneously form a core 122 and mount one or more attenuation strips 124 on the core, the pitch angle θ of the attenuation strips follows (e.g., is typically about the same as) the pitch angle of the core material (e.g., the winding angle $\theta_w$ of paper strips that form a helically-wound, paper-tube core). Pitch angle θ is limited by factors associated with both manufacturing conditions and structural requirements of the core 122. For example, and as will be discussed in greater detail (below), with a typical continuous helical-winding process, a helically-wound core 122 is formed on a mandrel. A driving force is supplied both to wind core material helically around a mandrel and to advance the core material longitudinally along the mandrel as the core is formed. Such a helical-winding process may employ a serpentine belt configured to supply a rotational force to wind the core material, as will be discussed in greater detail (below). The rotating core material translates a lateral force to advance the resulting core 122 longitudinally along the mandrel. In such processes, core material advances along the mandrel at a rate that may be characterized by the lateral distance advanced per helical revolution of the core material.

Without being bound to any theory, if the pitch angle θ (i.e., the winding angle $θ_w$) is too small or too large, the core material will not properly advance along the mandrel because of insufficient translational lateral driving force. In addition, if the pitch angle θ (i.e., the winding angle $θ_w$) is too small or too large, the core material will not properly wind helically around the mandrel and translational lateral forces may exceed the shear strength of the core material at its interface with the mandrel, leading to runnability issues with helical-winding machines.

Additionally, increasing pitch angle θ requires a corresponding decrease in the width of the core material helically wound to form the core, and structural characteristics of the core 122 depend on the width of the core material. If the core material (e.g., a paper attenuation strip) is too narrow or too wide, the resulting core 122 may lack sufficient structural integrity. Additionally, helical-winding machines may exhibit further runnability issues with core materials that are too narrow or too wide because of an increasing tendency to tear under tension forces inherent in the winding process.

FIG. 2 depicts a representative driveshaft damper 120 formed using a typical helical-winding process. FIG. 2 schematically depicts that the core 122 was formed from a plurality of plies of core material because, for example, a butt joint (e.g., a seam) defined between inner plies is schematically represented by a helical dashed line in FIG. 2. In the embodiment depicted in FIG. 2, one elastomeric attenuation strip 124 is helically wound about the circumference of the core 122 (i.e., a single-start configuration). The attenuation strip 124 has two elongate protrusions 126. As shown, the 122 core has a diameter D, and the attenuation strip 124 winds helically around the circumference of the core at a pitch angle θ.

Typically, the core material and the attenuation strips 124 have a common pitch angle when using a continuous helical-winding process in which the plies of core material and the one or more attenuation strips are wound concurrently around a mandrel. When concurrently winding plies of core material and one or more attenuation strips 124, the plies of core material and the attenuation strips may be introduced along the mandrel in close longitudinal proximity to one another or at positions longitudinally offset along the length of the mandrel. As the plies of core material and the attenuation strips 124 are wound helically around the mandrel, the resulting helically-wound core 122 or driveshaft damper 120 advances longitudinally along the mandrel. The advancement rate depends on the pitch angle θ and the linear speed of the serpentine belt that supplies a rotational force to wind the core material.

The helical windings exhibit a pitch length L, which may be measured longitudinally from any selected position on the plies of core material or on the one or more attenuation strips 124. For example, a centerline or a lateral edge of a ply or strip (or of an elongate protrusion 126) may be used as a reference point when measuring pitch length L. As similarly depicted in FIG. 2, a gap G exists between adjacent lateral edges of the attenuation strip 124, and the width of the gap G may be measured along the longitudinal axis of the driveshaft damper 120. As depicted in FIG. 2, the pitch length L for either elongate protrusion 126 is greater than the gap G between the attenuation strip's adjacent lateral edges.

In exemplary embodiments (e.g., as depicted in FIG. 2), an attenuation strip 124 includes a base 128 having adhesion flanges 130 extending from opposite sides thereof to assist with adhering the attenuation strip to the core 122. In the embodiment depicted in FIG. 2, outer ends of the adhesion flanges 130 are beneath at least one outer layer 132 of material overlapping the respective adhesion flanges on respective sides of the attenuation strip 124. The extent of the adhesion flanges 130 beneath the overlapping material 132 may vary.

In some embodiments, the overlapping material 132, if present, may be an additional ply of core material, or another kind of material selected from among the core materials discussed herein. The additional ply of overlapping material 132 (e.g., a paper "hold-down" ply 132) may be included to mechanically secure the attenuation strip 124 to the core 122. In this regard, although the single-start, dual-protrusion attenuation strip 124 is bonded by adhesive material to the core 122, adhesive bonds can fail. An optional "hold-down" ply 132 provides an additional mechanism to secure the dual-protrusion attenuation strip 124 to the core. Failure of the adhesive bond between the attenuation strip 124, even with its adhesion flanges 130 on either side of the two protrusions 126, and the core 122 can cause the attenuation strip to separate from the core. Such delamination failure of the driveshaft damper 120 could cause rattling within the propshaft or hinder the reduction of NVH, such as by changing the oscillation rate and/or shifting the resonance frequency of the driveshaft tube. Such delamination failure seems less likely as the width of the attenuation strip 124 increases, thereby providing more bonding area between the attenuation strip and the core. For example, comparative retaining members, such as disclosed in commonly assigned U.S. Pat. No. 4,909,361, are typically narrow (e.g., less than 1 inch or so), thereby providing limited bonding area and necessitating the application of an outer, reinforcing corrugated winding.

The width of the "hold-down" ply 132 is typically selected to overlap adjacent adhesion flanges 130 of the dual-protrusion attenuation strip 124 as helically wound around the core 122. In this regard, the width of the "hold-down" ply 132 is necessarily slightly greater than gap G, which exists between adjacent lateral edges of the attenuation strip 124. For example, a gap G of 1 inch might require a 1.25-inch "hold-down" ply, and a gap G of 2 inches might require a 2.25-inch "hold-down" ply. When the "hold-down" ply 132 is bonded to the core 122, the respective edge portions of the "hold-down" ply overlap the adjacent adhesion flanges 130 of the dual-protrusion attenuation strip 124, thereby mechanically securing the dual-protrusion attenuation strip 124 to the core 122 (i.e., the "hold-down" ply is typically not bonded to the top portions of the adhesion flanges). In effect, a "hold-down" ply 132 provides an additional mechanism to ensure the attenuation strip 124 is an integral part of the driveshaft damper 120.

In another embodiment, the overlapping material 132 may include polyether foam or other damping material (e.g., a polymeric batting or a polymeric nonwoven). For example, additional overlapping material can be positioned upon a "hold-down" ply 132 or used in lieu of a "hold-down" ply.

When configuring a core 122 for use in a driveshaft damper 120, trigonometry determines a winding angle $\theta_w$ for the helically-wound plies of core material. The winding angle $\theta_w$ generally depends on the width of the core material and the diameter of the core 122. The diameter of the core 122 can be based, for example, either on the mandrel around which the plies of core material will be helically wound (e.g., the inner diameter of the resulting core) or, more typically, on the desired outer diameter of the resulting core. Unless otherwise specified, the winding angle $\theta_w$ and the pitch angle θ are specified for the outer diameter D of the core, and the strip width w is specified for the outer ply of core 122 (e.g., the outermost strip of paper forming the core).

The width of the core material and the diameter of the core 122 may be selected based on (i) process considerations, including runnability, productivity, or practical limitations of the helical-winding machine, and/or (ii) performance considerations, including structural requirements of the core, the planned use of the resulting driveshaft damper 120, and the damping and attenuation performance of the driveshaft damper (e.g., greater damper mass). For a given core material, the thickness and density of the core 122, as well as the selected core material and the width of the plies of core material, all correlate to the resulting core's structural integrity. As examples, structural integrity of a core 122 may be characterized by axial compression strength, lateral compression strength, or radial compression strength. Additionally, even if a given winding angle may be mathematically possible, there are practical limitations to the range of winding angles that can be achieved on a conventional helical-winding machine to form a core 122 having a desired set of physical properties and structural integrity characteristics.

Given the width w of the plies of core material, the core winding angle $\theta_w$ for the plies may be determined using this equation:

$$\theta_w = \arccos\left(\frac{w}{\pi D}\right), \quad \text{(eq. 3)}$$

where D is the outer diameter of the resulting core 122. A resulting core pitch length $L_w$ may be calculated from the core winding angle $\theta_w$ and the width w of the core material using this equation:

$$L_w = \frac{w}{\sin\theta_w}. \quad \text{(eq. 4)}$$

As noted, the strip width w references the outer ply of core material (e.g., the outermost paper strip) where different ply-widths are employed.

Typically, the core winding angle $\theta_w$ will allow a given ply of core material to helically wind around the mandrel without overlapping upon itself. Overlapping may cause an uneven surface, which may compromise the quality of the resulting core 122 or driveshaft dampers 120 made from such a core. The winding angle $\theta_w$ may provide for a nominal seam gap. As an example, the option of a butt joint or a seam gap is schematically represented by a helical dashed line in FIG. 2. Seam gaps are discussed in greater detail (below) with reference to FIG. 4. If the ply width remains constant, the seam gap will widen as the diameter of the resulting core 122 increases with successive plies of core material. To control seam-gap widening during core construction, the initial plies of core-material strips (i.e., the inner plies) are narrower than the final, outer plies of core-material strips (i.e., the outer plies). For example, the inner paper ply might be a 4.5-inch strip while the outer paper ply might be a 4.625-inch strip. In this example, the paper width w would be reported as 4.625 inches with respect to the paper-tube core 122. When using a typical continuous helical-winding process, the pitch angle θ of the one or more attenuation strips 124 matches the winding angle $\theta_w$ of the plies of core material. (If the pitch angle θ of an attenuation strip 124 were to differ from the winding angle $\theta_w$ of the plies of core material, then the helically-wound attenuation strip would advance along the mandrel at a rate differing from the rate of the helically-wound plies of core material. In addition, a mismatch between pitch angle θ of the one or more attenuation strips 124 and the winding angle $\theta_w$ of the plies of core material might lead to poor interfacial contact and/or poor bonding of the one or more attenuation strips to the core 122.) In accordance with the present disclosure, the winding angle $\theta_w$ of the plies of core material and the corresponding pitch angle θ of the one or more attenuation strips 124 may be chosen to modify the damping characteristics of the driveshaft damper 120 (e.g., to reduce or shift resonance frequencies) as installed in a particular propshaft, subject to the operating capabilities of a helical-winding machine.

In this regard, a desired pitch length L for the one or more attenuation strips 124 (e.g., the corresponding spacing between adjacent attenuation strips) may be selected based at least in part on resulting damping attenuation performance of the driveshaft damper 120. For example, a pitch length L that corresponds to a resulting pitch ratio P (i.e., core diameter D÷pitch length L) may be desired. In some embodiments, increasing pitch ratio P to increase the contact surfaces engaging the inner surface of the driveshaft may be desired. Accordingly, a driveshaft-damper configuration may start from a desired pitch length L (or pitch ratio P) of the one or more attenuation strips 124, and work backward to determine a corresponding pitch angle θ for the attenuation strips or winding angle $\theta_w$ of the plies of core material and, finally, the corresponding width for the strips of core material. The width of the core material and the corresponding winding angle $\theta_w$ are configured to avoid constraints associated with runnability, productivity, or practical limitations of the helical-winding machine, and/or structural requirements or other properties of the core 122 while meeting the desired pitch length L or pitch ratio P.

Consequently, when using a typical continuous helical-winding process, the pitch length L of the attenuation strips 124 and corresponding pitch angle θ or pitch ratio P tend to be limited by constraints associated with the helical-winding process and the required properties of the core 122. For example, in some embodiments, a pitch angle θ that would yield a desired damping or attenuation performance may be incompatible with constraints associated with runnability, productivity, or practical limitations of a helical-winding machine, and/or structural requirements or other properties of the core 122 or dimensional configurations required by the particular application in which the driveshaft damper 120 will be used.

In some representative embodiments, an additional attenuation strip 124 may be added (e.g., a two-start configuration) to achieve an effective pitch angle $\theta_e$ that exceeds the winding angle $\theta_w$ of the core material. However, the space available for additional attenuation strips 124 typically is limited by the width of the attenuation strips (e.g., the base's wider adhesion surface), because it is generally undesirable for attenuation strips to overlap one another or to overlap a seam gap. Such overlapping can cause an uneven surface that compromises the adhesion of attenuation strips 124 to the core 122, and/or interferes with proper fit of the driveshaft damper 120 inside a driveshaft. Moreover, if a narrow attenuation strip (e.g., less than 1 inch) is bonded to the core 122 at a seam, a weak bond results between the core and the attenuation strip, even with its adhesion flanges on either side of the protrusion. A weak bond can cause the attenuation strip to separate from the core, especially if the driveshaft damper is cut during manufacturing where the attenuation strip is positioned over a seam. (As discussed herein, a helically-wound paper tube is typically formed continuously during the manufacture of driveshaft dampers according to the present disclosure.) This can lead to delamination failure of the driveshaft damper when the driveshaft damper is inserted into a propshaft tube.

Figure 3:
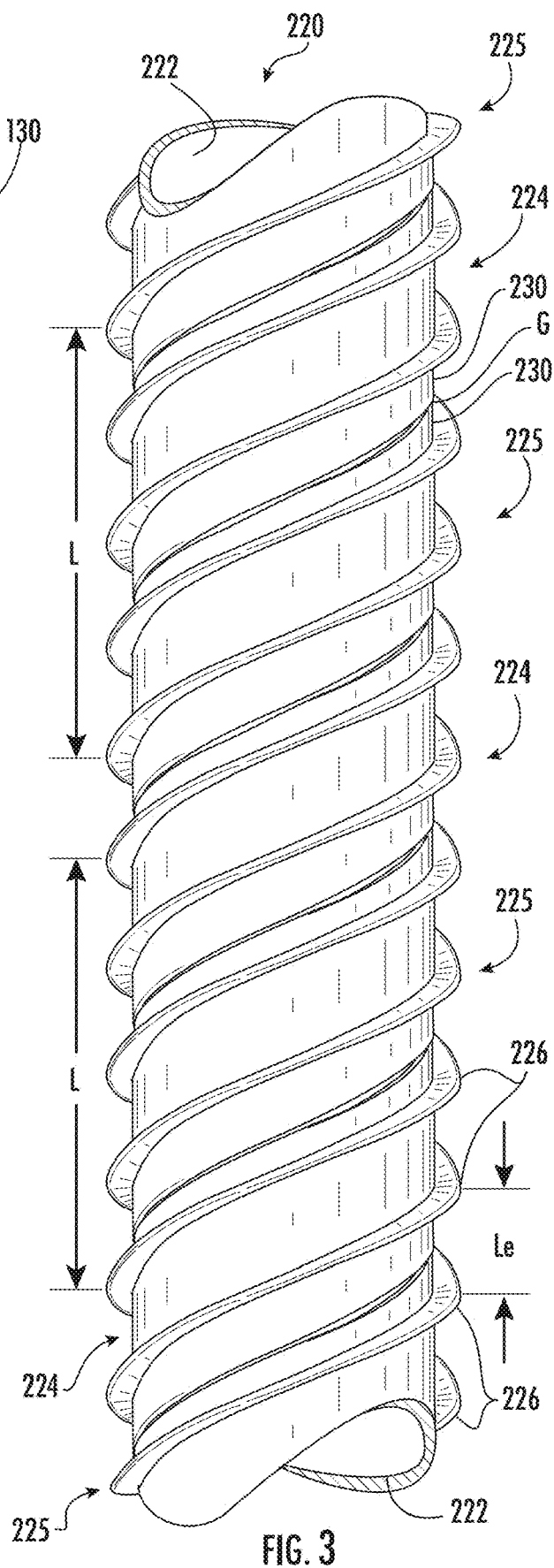
FIG. 3 depicts an exemplary helically-wound driveshaft damper that has two attenuation strips, each with two elongate protrusions helically wound about the circumference of a core.

FIG. 3 depicts a representative driveshaft damper 220 with two attenuation strips 224, 225 (i.e., a dual-start configuration of "double-ridge" attenuation strips), in accordance with another embodiment of this disclosure. The driveshaft damper 220 has a core 222 formed of a plurality of plies of core material and two attenuation strips 224, 225 helically wound about the circumference of the core. The two attenuation strips 224, 225 are offset from one another by 180 degrees around the perimeter (e.g., the circumference) of the core 222. Thus, the driveshaft damper 220 may include a first attenuation strip 224 starting at 0 degrees and a second attenuation strip 225 starting at 180 degrees. For each of the first and second attenuation strips 224, 225, the helical winding of the attenuation strip provides a pitch length L. Together, the first attenuation strip 224 and the second attenuation strip 225 provide an effective pitch length $L_e$, which may be characterized according to this equation:

$$L_e = \frac{\text{pitch length } L}{\text{number of elongate protrusions in damper}}. \quad (\text{eq. 5})$$

In determining effective pitch length $L_e$, only elongate protrusions 226 that are configured to provide significant interference fit within a driveshaft or a propshaft (e.g., 10-20 percent or more elongate-protrusion displacement) ought to be considered. Elongate protrusions 226 configured for forced frictional engagement within a driveshaft or a propshaft (see, e.g., shaft 10 of FIG. 1) effect better NVH reduction. Effective pitch length $L_e$ characterizes the length of attenuation strip (e.g., silicone or EPDM rubber), which helps provide the driveshaft damper 220 with substantial frictional fit within the driveshaft or propshaft.

The two helically-wound attenuation strips 224, 225 typically provide at least a narrow gap G, which may be measured longitudinally between adjacent lateral edges of the respective attenuation strips. When one or both attenuation strips 224, 225 have adhesion flanges 230, the gap G may be measured longitudinally as between respective adjacent lateral edges of the adhesion flanges or other lateral edges of the attenuation strips as configured.

The driveshaft damper 220 depicted in FIG. 3 includes adhesion flanges 230 on both attenuation strips, without a layer of core material, or the like, overlapping the adhesion flanges. Alternatively, the gap G may be wider, and a hold-down ply (see, e.g., hold-down ply 132 of FIG. 2), or the like, may be mounted to the core 222 and overlap the respective adhesion flanges 230 on respective sides of the attenuation strips 224, 225. The extent of the adhesion flanges 230 beneath any overlapping material (see, e.g., hold-down ply 132 of FIG. 2) may vary.

In some two-start damper embodiments, the overlapping hold-down material (see, e.g., hold-down ply 132 of FIG. 2), if present, may be an additional ply of core material (e.g., paper) or another kind of material selected from among the core materials discussed herein. The additional ply of core material (e.g., a paper "hold-down" ply) may be included to mechanically secure the attenuation strips 224, 225 to the core. In this regard, although the two dual-protrusion attenuation strips 224, 225 are bonded to the core 222, adhesive bonds can fail. If there is sufficient space between the adjacent attenuation strips 224, 225, an optional "hold-down" ply can provide an additional mechanism to secure the dual-protrusion attenuation strips to the core. Typically, a gap G of at least about 1 inch is necessary to include a "hold-down" ply while maintaining winding-machine runnability. Failure of the adhesive bonds between the attenuation strips 224, 225, even with the adhesion flanges 230 on either side of the respective protrusions 226, and the core 222 can lead to the attenuation strips separating from the core 222. Such delamination failure of the two-start driveshaft damper 220 could cause rattling within the propshaft or hinder the reduction of NVH (e.g., by changing the oscillation rate and/or shifting the resonance frequency of the driveshaft tube). As noted, such delamination failure seems to be less likely as the width of each attenuation strip 224, 225 increases, thereby providing more bonding area between the attenuation strip and the core 222.

In the two-start configuration depicted in FIG. 3, the two attenuation strips 224, 225 are offset from one another by 180 degrees. The width of any "hold-down" ply is selected to overlap adjacent adhesion flanges 230 of the dual-protrusion attenuation strips 224, 225 as helically wound around the core 222. In this regard, the width of any "hold-down" ply is necessarily slightly greater than the gap G, which exists between adjacent lateral edges of the respective attenuation strips 224, 225. When any "hold-down" ply is bonded to the core 222, the respective edge portions of the "hold-down" ply overlap the adjacent adhesion flanges 230 of two dual-protrusion attenuation strips 224, 225, thereby mechanically securing the dual-protrusion attenuation strips 224, 225 to the core 222 (i.e., the "hold-down" ply is typically not bonded to the top portions of the adhesion flanges). In effect, a "hold-down" ply, if present, provides an additional mechanism to ensure the attenuation strips 224, 225 are an integral part of the driveshaft damper 220.

As noted, helical-winding machines may exhibit runnability issues with core materials that are too narrow or too wide. For two-start damper embodiments (see, e.g., damper 220 depicted in FIG. 3), the respective attenuation strips typically have a pitch angle θ matching the winding angle $θ_w$ of the core material (e.g., the paper strips that form a helically-wound, paper-tube core). The spacing between adjacent attenuation strips is thus limited by manufacturing constraints (e.g., winding angles). Increasing the number of attenuation-strip starts (e.g., three-start at a 120-degree offset or four-start at a 90-degree offset) might seem to facilitate more attenuation-strip contact between the driveshaft damper and the inner surface of a propshaft. Driveshaft dampers with two or more attenuation strips are prone to delamination if poorly designed (e.g., attempting to bond a narrow attenuation strip to a seam gap on a helically-wound paperboard core). Moreover, if adjacent attenuation strips are placed too close, "hold-down" plies cannot be positioned by conventional helical-winding machines between adjacent attenuation strips. As noted, without the "hold-down" plies mechanically securing the attenuation strips to the core, the driveshaft damper may be susceptible to delamination failure.

In another embodiment, the overlapping material may include polyether foam or other damping material (e.g., a polymeric batting or a polymeric nonwoven, such as a 0.25-inch tufted polyester nonwoven). For example, additional overlapping material (e.g., foam, batting, or single-face corrugated paper) can be positioned upon a "hold-down" ply or used in lieu of a "hold-down" ply.

Figure 4:
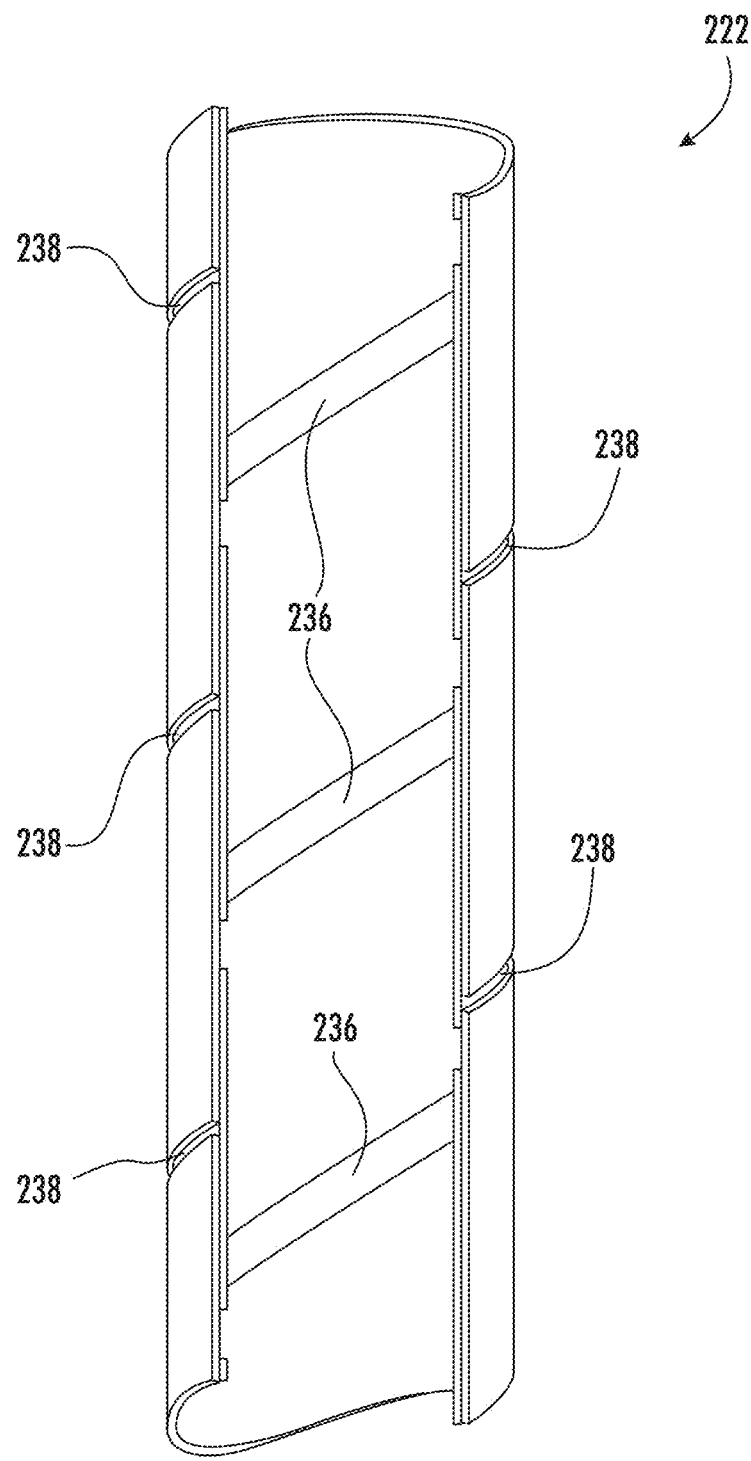
FIG. 4 is an isolated, cut-away view of an exemplary core.

In some embodiments, additional attenuation strips may be added within the limited space available between seam gaps. For example, multi-ply cores typically exhibit seam gap joints (e.g., near butt gap joints that yield gap joints) characterized by a narrow space between adjacent lateral edges of core material and an adjoining ply. FIG. 4 is an isolated, cut-away view of a portion of a representative helically-wound core, which, for ease of understanding, is described herein as the core 222 of the damper 220 of FIG. 3. In the example depicted in FIG. 4, the core 222 includes seam gap joints, including wider, internal seam gap joints 236 and narrower, external seam gap joints 238. Referring to FIGS. 3 and 4, in some embodiments, one or more attenuation strips 224, 225 wind helically around the core 222 approximately adjacent to and nearly abutting the external seam gap joint 238 with consecutive helical windings around the core. For example, a driveshaft damper 220 may include both a first attenuation strip 224 with a plurality of elongate protrusions 226 and a second attenuation strip 225 with a plurality of elongate protrusions 226. With consecutive helical windings around the core 222, the first attenuation strip 224 helically-winds with its left lateral edge approximately adjacent to and nearly abutting the external seam gap joint 238 and the second attenuation strip 225 helically-winds with its right lateral edge approximately adjacent to and nearly abutting the external seam gap joint 238. This might be facilitated using two attenuation strips of different widths.

Such seam gap joints 236, 238 are typically observable on the respective surface of the core 222 by an uneven surface and/or by exposed core adhesive and/or underlying ply material. In some embodiments, it may be difficult to adhere an attenuation strip 224, 225 overlapping an external seam gap 238 because of an uneven surface. Additionally, attenuation strips 224, 225 or adhesives used to adhere attenuation strips to the core 222 may be incompatible with adhesives used to laminate the plies of core material. As explained previously, the initial, inner plies of core-material strips (i.e., the inner plies) are narrower than the final, outer plies of core-material strips (i.e., the outer plies) to control seam-gap widening during core construction.

There is a need in the marketplace for driveshaft dampers providing more contact surface (e.g. an increase in the number of contact surfaces engaging the inner surface of the driveshaft). Various embodiments of the present disclosure address this need. Some of these exemplary embodiments may be characterized by attenuation strips having elongate protrusions that together yield an effective pitch angle being significantly greater than the winding angle of the core material and/or significantly greater than the winding angle typically feasible with conventional winding machines. Additional embodiments may be characterized by attenuation strips that exhibit an effective pitch length much greater than the pitch length typically feasible with conventional winding machines.

Without being bound to any theory, it is thought that this marketplace need can be addressed, overcoming the typical limitations of conventional helical-winding machines, by providing driveshaft dampers that have novel attenuation strips with a plurality of elongate protrusions. The plurality of elongate protrusions advantageously decouples effective pitch length $L_e$ from the winding angle $\theta_w$ of the core material. This allows the contact points for the attenuation strips (e.g., the configuration and effective pitch length of the elongate protrusions) to be selected to provide improved damping and attenuation properties, while maintaining the width and other properties of the plies of core material within a range sufficient to meet structural integrity or dimensional requirements for the core and/or limitations associated with conventional continuous helical-winding processes. In some embodiments, the desired improvements in damping and attenuation properties associated with increasing the number of contact points may not be feasible in view of considerations associated with conventional helical-winding machines and structural integrity or dimensional requirements for the core, without decoupling effective pitch length $L_e$ from the winding angle $\theta_w$ of the core material as disclosed herein. Various embodiments addressing this need may be characterized by an effective pitch angle $\theta_e$, an effective pitch length $L_e$, and/or an effective pitch ratio $P_e$ as discussed herein.

Figure 5:
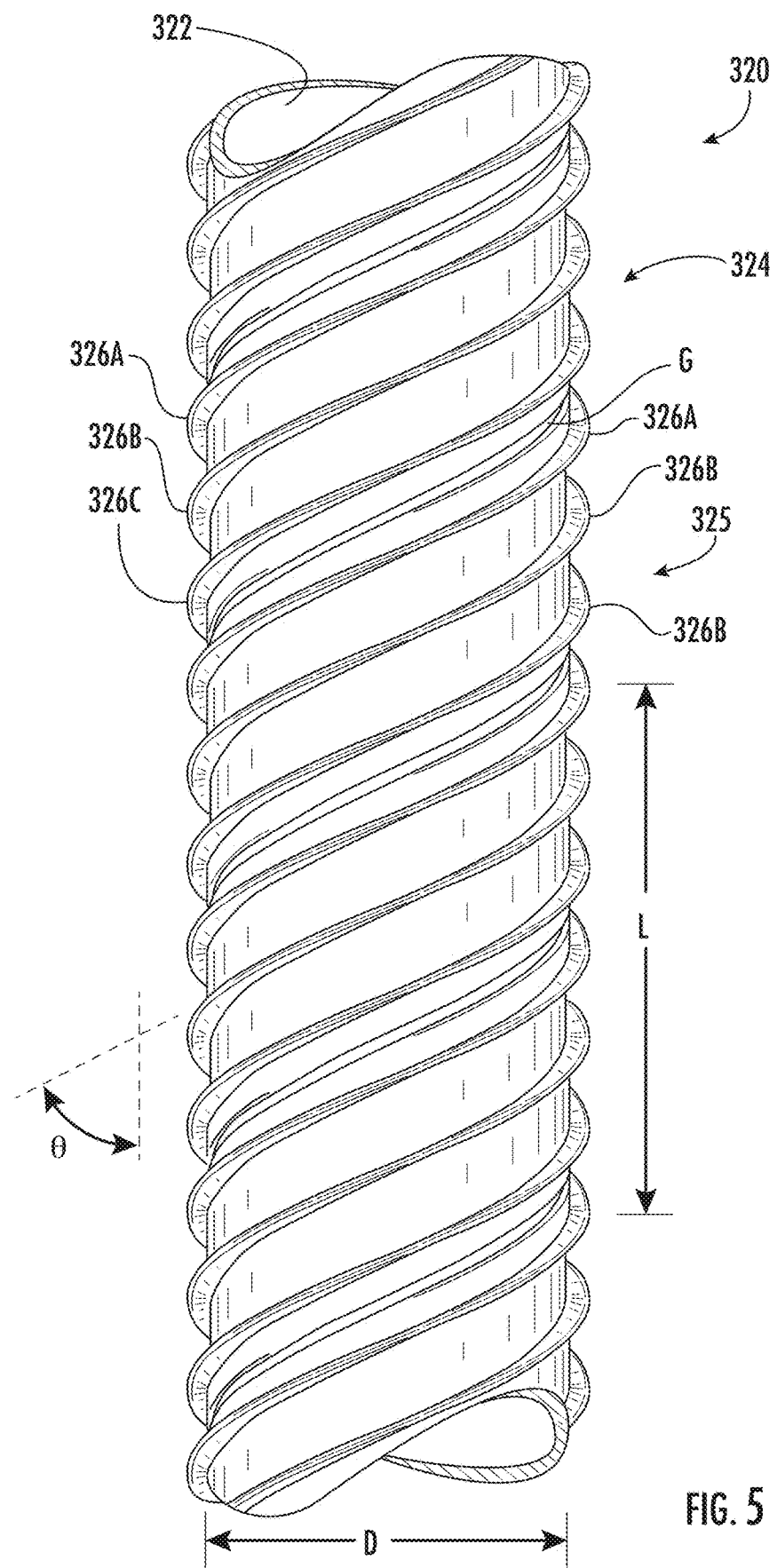
FIG. 5 depicts an exemplary helically-wound driveshaft damper with two attenuation strips, each having three elongate protrusions helically wound about the circumference of a core.

By way of example, FIG. 5 depicts an exemplary driveshaft damper 320 configured in accordance with various embodiments of the present disclosure to provide an increase in the number of contact surfaces engaging the inner surface of a driveshaft (see, e.g., driveshaft 10 of FIG. 1). The driveshaft damper 320 depicted in FIG. 5 includes a core 322 formed of multiple plies of a helically-wound core material laminated with an adhesive, and two attenuation strips 324, 325 winding helically about the circumference of the core (i.e., a two-start configuration). In some embodiments, helically-wound driveshaft dampers with more than two attenuation strips may be provided.

As depicted in FIG. 5, the core has a diameter D, and two attenuation strips 324, 325 helically wound around the circumference of the core at the pitch angle θ. Embodiments with one attenuation strip or with more than two attenuation strips are also within the spirit and scope of the present disclosure. The helical winding of the attenuation strips 324, 325 exhibits a pitch length L, which may be measured longitudinally from any selected position of each of the attenuation strips. Each of the attenuation strips 324, 325 has a plurality of elongate protrusions, such as a first elongate protrusion 326A, a second elongate protrusion 326B, and a third elongate protrusion 326C. The attenuation strips 324, 325 may be helically-wound at a pitch angle θ that provides adjacent and nearly abutting lateral edges of the attenuation strips 324, 325, so that a narrow gap G may be provided between the adjacent lateral edges of the attenuation strips 324, 325. Alternatively, in some embodiments, an attenuation strip or attenuation strips 324, 325 may be of a selected width and/or helically wound at a selected pitch angle to provide a relatively wider gap G (not shown) between adjacent lateral edges. In an exemplary embodiment, the driveshaft damper 320 of FIG. 5 may have a core 322 with an outside diameter of 3.02 inches and a pitch length L of 3.25 inches, which corresponds to a pitch angle θ of about 71 degrees.

Figure 6:
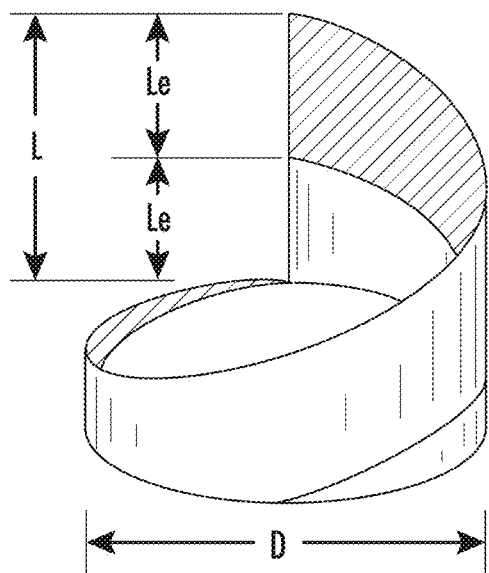
FIG. 6 schematically depicts a 360-degree portion of a helical winding including two abutting, helically-wound strips.
Figure 7:
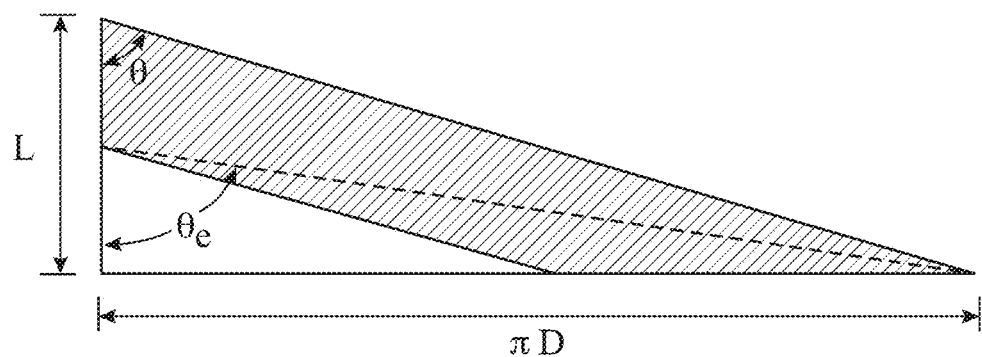
FIG. 7 schematically depicts the helical winding portion of FIG. 6 in an unwound, flat configuration.

As background for easing understanding of effective pitch angle $\theta_e$, FIG. 6 schematically depicts a 360-degree portion of a helical winding including two abutting, helically-wound strips and a diameter D, and FIG. 7 schematically depicts the helical winding portion of FIG. 6 in an unwound, flat configuration. In FIGS. 6 and 7, cross-hatching is included to help distinguish the two strips from one another. FIGS. 6 and 7 schematically depict that the helical winding portion generally exhibits a pitch length L and an effective pitch Length $L_e$. FIG. 7 schematically depicts that the helical winding portion generally exhibits a pitch angle $\theta$ and an effective pitch angle $\theta_e$. The effective pitch angle $\theta_e$ has a tangent equal to the ratio of the circumference of the core over the effective pitch length $L_e$.

An effective pitch angle $\theta_e$ can be calculated according to this equation:

$$\theta_e = \arctan\left(\frac{\pi D}{L_e}\right). \tag{eq. 6}$$

Equation (6) shows that the effective pitch angle $\theta_e$ increases as the effective pitch length $L_e$ decreases. Together, eq. 1, eq. 5, and eq. 6 indicate the tangent of the effective pitch angle $\theta_e$ equals the tangent of the pitch angle multiplied by the total number of elongate protrusions on the surface of the driveshaft damper (i.e., $\tan(\theta_e)$ $\tan(\theta)\times$total protrusions). In this regard and with reference, for example to the dampers 20, 120, 220, 320 of FIGS. 1-3 and 5, the effective pitch length $L_e$ decreases as the number of elongate protrusions increases. Accordingly, effective pitch angle $\theta_e$ increases as the number of elongate protrusions increases and decreases as the number of elongate protrusions decreases.

A dimensionless effective pitch ratio may be calculated according to this equation:

$$P_e = \frac{\text{core diameter}}{\text{effective pitch length}}. \tag{eq. 7}$$

Equation (7) similarly shows that the effective pitch ratio increases as the effective pitch length $L_e$ decreases. Effective pitch ratio $P_e$ also increases as the number of elongate protrusions increases, but in contrast with effective pitch angle $\theta_e$, effective pitch ratio $P_e$ increases without asymptotic limitation (i.e., 90 degrees) as the effective pitch length $L_e$ becomes increasingly smaller.

As noted, only elongate protrusions configured to provide significant interference fit within a driveshaft or a propshaft (e.g., at least 10 percent elongate-protrusion displacement) ought to be considered in determining effective pitch length $L_e$ and its derivatives, effective pitch angle $\theta_e$ and effective pitch ratio $P_e$.

The pitch angle $\theta$ of driveshaft dampers made using a conventional helical-winding process may have a limited operating range in view of considerations and limitations discussed herein. Typically, the operating range for pitch angle $\theta$ of conventional helical-winding machines falls between about 45 and 78 degrees (e.g., providing winding angles $\theta_w$ between 45 and 78, typically between 58 and 74 degrees, such as 58°, 59°, 60°, 61°, 62°, 63°, 64°, 65°, 66°, 67°, 68°, 69°, 70°, 71°, 72°, 73°, 74°, etc.). For example, in some embodiments, the driveshaft dampers 120, 220 in FIGS. 2 and 3 may have a core with an outside diameter D of 3 inches and a pitch length L of about 3.24 inches (e.g., using 3¹⁄₁₆-inch paper as the outer ply), which using equation (1) corresponds to a pitch angle $\theta$ of about 71 degrees.

When using attenuation strips with a single elongate protrusion, effective pitch angle $\theta_e$ and effective pitch ratio $P_e$ are similarly limited. Driveshaft dampers made using a conventional helical-winding process may exhibit an effective pitch angle of between about 45 and 78 degrees (e.g., between about 60 and 74 degrees). In a comparative driveshaft damper (e.g., 3-inch OD and a pitch angle $\theta$ of about 71 degrees), two attenuation strips each with one elongate protrusion (i.e., two "single-ridge" attenuation strips) may be installed on a core. Using equation (5), a two-start "single-ridge" driveshaft damper may exhibit an effective pitch length $L_e$ of about 1.6 inches (i.e., 3.24-inch pitch length÷two elongate protrusions). Accordingly, equation (6) shows that a two-start "single-ridge" driveshaft damper might have an effective pitch angle $\theta_e$ of about 80 degrees, and equation (7) indicates an effective pitch ratio of 1.85.

Conversely, the present disclosure provides for driveshaft dampers configured with attenuation strips that have two or more elongate protrusions. For example, attenuation strips may each be provided with two, three, four, five, six, seven, eight, nine, ten or more, or perhaps twenty or more elongate protrusions. These additional elongate protrusions allow the effective pitch angle $\theta_e$ to asymptotically approach 90 degrees. For example, with an outside diameter D of 3 inches and a pitch length L of 3.25 inches, the two-start driveshaft damper 320 of FIG. 5 may exhibit an effective pitch length $L_e$ of about 0.58 inch (i.e., a 3.25-inch pitch length÷six elongate protrusions) and an effective pitch angle $\theta_e$ of about 86.5 degrees. As further examples, if two attenuation strips with five elongate protrusions each were used in the driveshaft damper of FIG. 5, this would yield an effective pitch angle $\theta_e$ of about 88 degrees (i.e., a 3.25-inch pitch length÷ten elongate protrusions). Similarly, two attenuation strips with ten elongate protrusions each would provide an effective pitch angle $\theta_e$ of about 89 degrees (i.e., a 3.25-inch pitch length÷twenty elongate protrusions).

A desired effective pitch angle may be provided using any number of elongate protrusions. For example, if one attenuation strip that has ten elongate protrusions were provided in a driveshaft damper similar to the example in FIG. 5, such a driveshaft damper would exhibit an effective pitch length $L_e$ of about 0.35 inch (i.e., a 3.25-inch pitch length÷ten elongate protrusions) and an effective pitch angle $\theta_e$ of about 88 degrees. As another example, if such a driveshaft damper were to include two attenuation strips, each with five elongate protrusions, this would provide a similar effective pitch length $L_e$ of about 0.35 inch (i.e., a 3.25-inch pitch length÷ten elongate protrusions) and effective pitch angle $\theta_e$ of about 88 degrees. Even further embodiments are within the spirit and scope of the present disclosure.

Effective pitch ratio $P_e$ may similarly be limited when using a typical helical-winding process. A single attenuation strip with one elongate protrusion may have a pitch ratio P between 0.7 and 1.0 as discussed previously. Equation (7) shows that a comparative two-start "single-ridge" driveshaft damper (i.e., two "single-ridge" attenuation strips) may have an effective pitch $P_e$ ratio of about 1.8 or 1.9 (e.g., a 3-inch diameter D÷an effective pitch length $L_e$ of about 1.6 inches). By contrast, the present disclosure provides for driveshaft dampers configured with attenuation strips that have more "contacting" elongate protrusions, which yield far greater increases to the effective pitch ratio.

In various embodiments, a driveshaft damper with a plurality of elongate protrusions may exhibit an effective pitch ratio $P_e$ of at least 2.0 (e.g., at least 2.1, 2.2, 2.3, 2.4, 2.5, 2.6, 2.7, 2.8, 2.9, etc.), at least 3.0 (e.g., at least 3.1, 3.2, 3.3, 3.4, 3.5, etc.), at least 4.0 (e.g., at least 4.1, 4.2, 4.3, 4.4, 4.5, etc.), at least 5.0 (e.g., at least 5.1, 5.2, 5.3, 5.4, 5.5, etc.), at least 6.0 (e.g., at least 7.0, 8.0, 9.0, etc.), at least 10 (e.g., at least 11, 12, 13, etc.), at least 20, or even more. For example, the driveshaft damper 320 of FIG. 5, having an outside diameter D of 3.02 inches and a pitch length L of 3.24 inches, may exhibit an effective pitch ratio $P_e$ of about 5.6. As another example, if the two attenuation strips of the driveshaft damper of FIG. 5 have five elongate protrusions each, this would provide an effective pitch ratio $P_e$ of about 9.3. Further, if such attenuation strips have ten elongate protrusions each, this would provide an effective pitch ratio $P_e$ of about 18.7. Moreover, attenuation strips with twenty elongate protrusions each would provide an effective pitch ratio $P_e$ of about 37.3.

In some embodiments, a driveshaft damper may be provided with attenuation strips that have a plurality of elongate protrusions exhibiting an effective pitch angle $\theta_e$ that exceeds the pitch angle $\theta$ or winding angle $\theta_w$ of the core by a certain number of degrees. For example, the effective pitch angle $\theta_e$ may exceed the pitch angle $\theta$ or winding angle $\theta_w$ of the core by 6° (e.g., 6.1°, 6.2°, 6.3°, 6.4, etc.), 7° (e.g., 7.1°, 7.2°, 7.3°, 7.4, etc.), 8° (e.g., 8.1°, 8.2°, 8.3°, 8.4°, etc.), 9°, 100 or more (e.g., 10°, 110, 12°, 13°, 14°), 150 or more (e.g., 15°, 16°, etc.), or even 200 or more (e.g., 250 or more).

In accordance with the present disclosure, driveshaft dampers can be manufactured having effective pitch angles and effective pitch ratios that were previously unachievable via continuous helical-winding processes using conventional helical-winding machines (e.g., at winding angles between 450 and 80°). For example, Table 1 (below) provides exemplary effective pitch angles and effective pitch ratios achievable using attenuation strips according to the present disclosure (e.g., one or more attenuation strips having a total of three, four, or six elongate protrusions configured for significant interference fit (e.g., substantial frictional fit) within a driveshaft or propshaft.

TABLE 1

| "interference" elongate protrusions | winding angle $\theta_w$ (°) | effective pitch angle $\theta_e$ (°) | $\theta_e$-$\theta_w$ | effective pitch ratio ($P_e$) |
|---|---|---|---|---|
| 3 | 45 | 71.6 | 26.6 | 0.95 |
| 4 | 45 | 76.0 | 31.0 | 1.27 |
| 6 | 45 | 80.5 | 35.5 | 1.91 |
| 3 | 54 | 76.4 | 22.4 | 1.31 |
| 4 | 54 | 79.7 | 25.7 | 1.75 |
| 6 | 54 | 83.1 | 29.1 | 2.63 |
| 3 | 60 | 79.1 | 19.1 | 1.65 |
| 4 | 60 | 81.8 | 21.8 | 2.21 |
| 6 | 60 | 84.5 | 24.5 | 3.31 |
| 3 | 62 | 79.9 | 18.0 | 1.80 |
| 4 | 62 | 82.4 | 20.4 | 2.39 |
| 6 | 62 | 84.9 | 22.9 | 3.59 |
| 3 | 65 | 81.2 | 16.2 | 2.05 |
| 4 | 65 | 83.3 | 18.3 | 2.73 |
| 6 | 65 | 85.6 | 20.6 | 4.10 |
| 3 | 68 | 82.3 | 14.3 | 2.36 |
| 4 | 68 | 84.2 | 16.2 | 3.15 |
| 6 | 68 | 86.1 | 18.1 | 4.73 |
| 3 | 70 | 83.1 | 13.1 | 2.62 |
| 4 | 70 | 84.8 | 14.8 | 3.50 |
| 6 | 70 | 86.5 | 16.5 | 5.25 |
| 3 | 72 | 83.8 | 11.8 | 2.94 |
| 4 | 72 | 85.4 | 13.4 | 3.92 |
| 6 | 72 | 86.9 | 14.9 | 5.88 |
| 3 | 74 | 84.5 | 10.5 | 3.33 |
| 4 | 74 | 85.9 | 11.9 | 4.44 |
| 6 | 74 | 87.3 | 13.3 | 6.66 |

TABLE 1-continued

| "interference" elongate protrusions | winding angle $\theta_w$ (°) | effective pitch angle $\theta_e$ (°) | $\theta_e$-$\theta_w$ | effective pitch ratio ($P_e$) |
|---|---|---|---|---|
| 3 | 75 | 84.9 | 9.9 | 3.56 |
| 4 | 75 | 86.2 | 11.2 | 4.75 |
| 6 | 75 | 87.4 | 12.4 | 7.13 |
| 3 | 76 | 85.2 | 9.2 | 3.83 |
| 4 | 76 | 86.4 | 10.4 | 5.11 |
| 6 | 76 | 87.6 | 11.6 | 7.66 |
| 3 | 77 | 85.6 | 8.6 | 4.14 |
| 4 | 77 | 86.7 | 9.7 | 5.52 |
| 6 | 77 | 87.8 | 10.8 | 8.27 |
| 3 | 78 | 85.9 | 7.9 | 4.49 |
| 4 | 78 | 87.0 | 9.0 | 5.99 |
| 6 | 78 | 88.0 | 10.0 | 8.98 |

In some exemplary embodiments, a driveshaft damper may include at least two different kinds of attenuation strips having the same pitch angle θ but, measured individually, different effective pitch angles $\theta_e$. As one example, a first attenuation strip might include only one elongate protrusion (e.g., a "single-ridge" attenuation strip), and a second attenuation strip might include two or more elongate protrusions (e.g., a "triple-ridge" attenuation strip). As another example, a first attenuation strip might include multiple elongate protrusions (e.g., a "triple-ridge" attenuation strip) and a second attenuation strip might include a different number of elongate protrusions (e.g., two, four, five, or six elongate protrusions, etc.). As noted, attenuation strips are typically positioned on a driveshaft damper at the same pitch angle θ to match the winding angle of the core material (e.g., the paper strips that form a helically-wound, paper-tube core). In any such embodiments using two or more different kinds of attenuation strips, the attenuation strips may be formed of the same kind of material having different durometers (e.g., a 50-durometer attenuation strip and a 70-durometer attenuation strip) or different materials (e.g., EPDM rubber and heat-resistant silicone rubber) having similar or different durometers.

In addition to the exemplary embodiments discussed (above), attenuation strips may be configured in various different ways, all of which are within the spirit and scope of the present disclosure. For example, additional exemplary attenuation strips are discussed (below).

Figure 8:
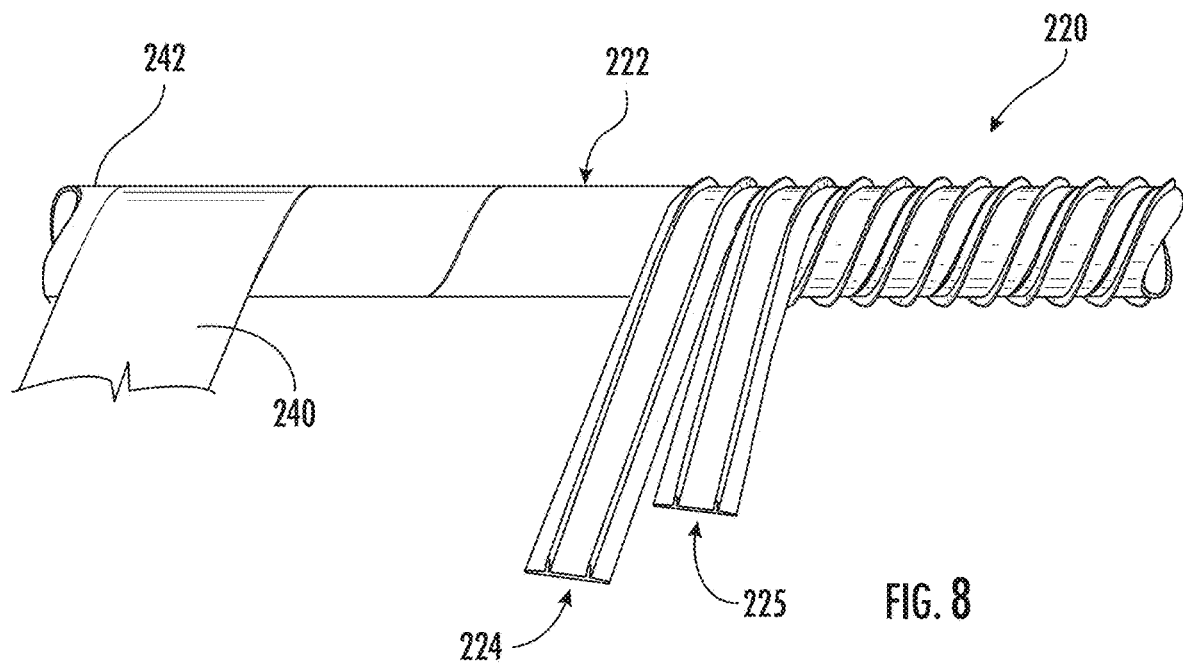
FIGS. 8 and 9 depict exemplary continuous helical-winding processes in which a plurality of plies of a core material and one or more attenuation strips are wound concurrently around a mandrel.
Figure 9:
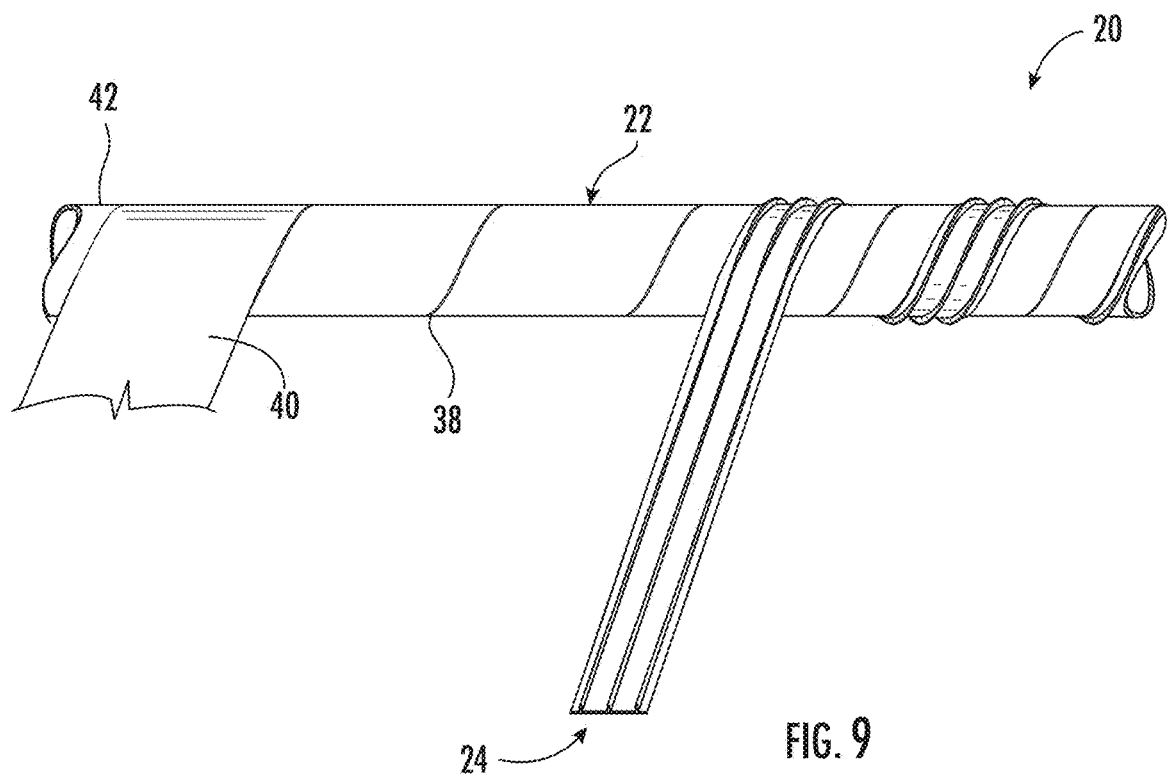

FIGS. 8 and 9 each depict examples of continuous helical-winding processes in which multiple plies of core material and one or more attenuation strips are wound concurrently around a mandrel. As depicted in FIG. 8, the two-start driveshaft damper 220 of FIG. 3 may be formed using a continuous helical-winding process. One or more plies of core material 240 (e.g., strips of paper, paperboard, or other core material) followed by one or more attenuation strips 224, 225 are helically wound around a mandrel 242. As shown, a first "double-ridge" attenuation strip 224 and a second "double-ridge" attenuation strip 225 are provided. The attenuation strips 224, 225 are configured and arranged to avoid overlapping a seam gap joint 38.

In another embodiment, FIG. 9 depicts the driveshaft damper 20 of FIG. 1 formed using a similar continuous helical-winding process that advantageously overcomes the aforementioned limitations. As depicted in FIG. 9, one or more plies of core material 40 followed by a "triple-ridge" attenuation strip 24 are helically wound around a mandrel 42. The attenuation strip 24 may similarly be configured and arranged to avoid overlapping a seam gap joint 38. In some embodiments, however, a wider attenuation strip may be permitted to overlap a seam gap joint 38 if the added surface area of the attenuation strip's base facilitates sufficient bonding to the core material (i.e., without the seam gap joint unsuitably interfering with adhesion by way of an uneven surface and/or incompatibility with core adhesive and/or underlying ply material).

A driveshaft damper also may be formed using a two-step process, including helically winding a core from a desired core material and then helically winding one or more attenuation strips around the already-formed core. With a two-step process, various embodiments of driveshaft dampers may be produced in accordance with the present disclosure to achieve differing winding angle and pitch angles for the core material and the attenuation strips, respectively. Typically, however, it is advantageous to produce driveshaft dampers using a one-step process configured to helically wind the plies of core material and the one or more attenuation strips concurrently. Such a continuous helical-winding process may yield a greater production efficiency as compared with a two-step process, such as a faster production time and a lower cost of production FIGS. 10-12 depict exemplary helical-winding machines that may be used to make helically-wound driveshaft dampers of this disclosure.

Figure 10:
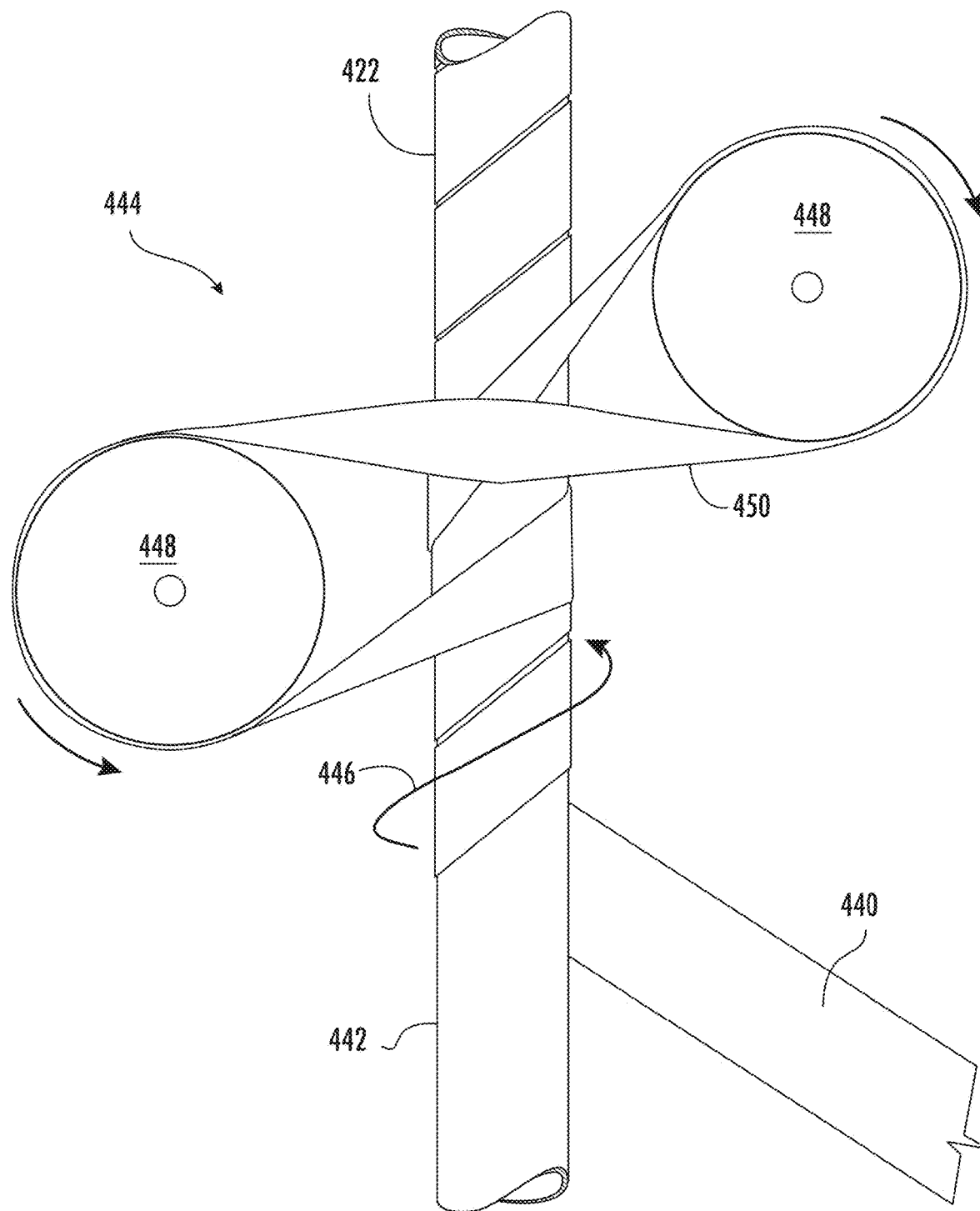
FIG. 10 is a top plan view of a winding machine that may be used to make a helically-wound driveshaft damper.

FIG. 10 is a top plan view of a winding machine 444. The winding machine supplies a driving force configured both to wind (as indicated by helical arrow 446) core material 440 around a mandrel 442 and to advance the resulting core 422 longitudinally along the mandrel. As shown, the driving force may be supplied by a pair of rollers 448 and a serpentine belt 450. One or both rollers 448 may be driven by a suitable motor (not shown). The mandrel 442 typically remains stationary. The helical arrow 446 indicates the direction of winding for the core material and other arrows indicate the direction of rotation of the rollers 448 and the direction of travel of the serpentine belt 450. The serpentine belt 450 follows a path around a first roller 448, then around the mandrel 442 and winding core material 440 at a nip point, then around a second roller 448, turning over and then returning to the first roller 448. For simplicity, one ply of core material 440 is shown. It is to be understood, however, that such a process may be used for any number of plies of core material 440.

Figure 11:
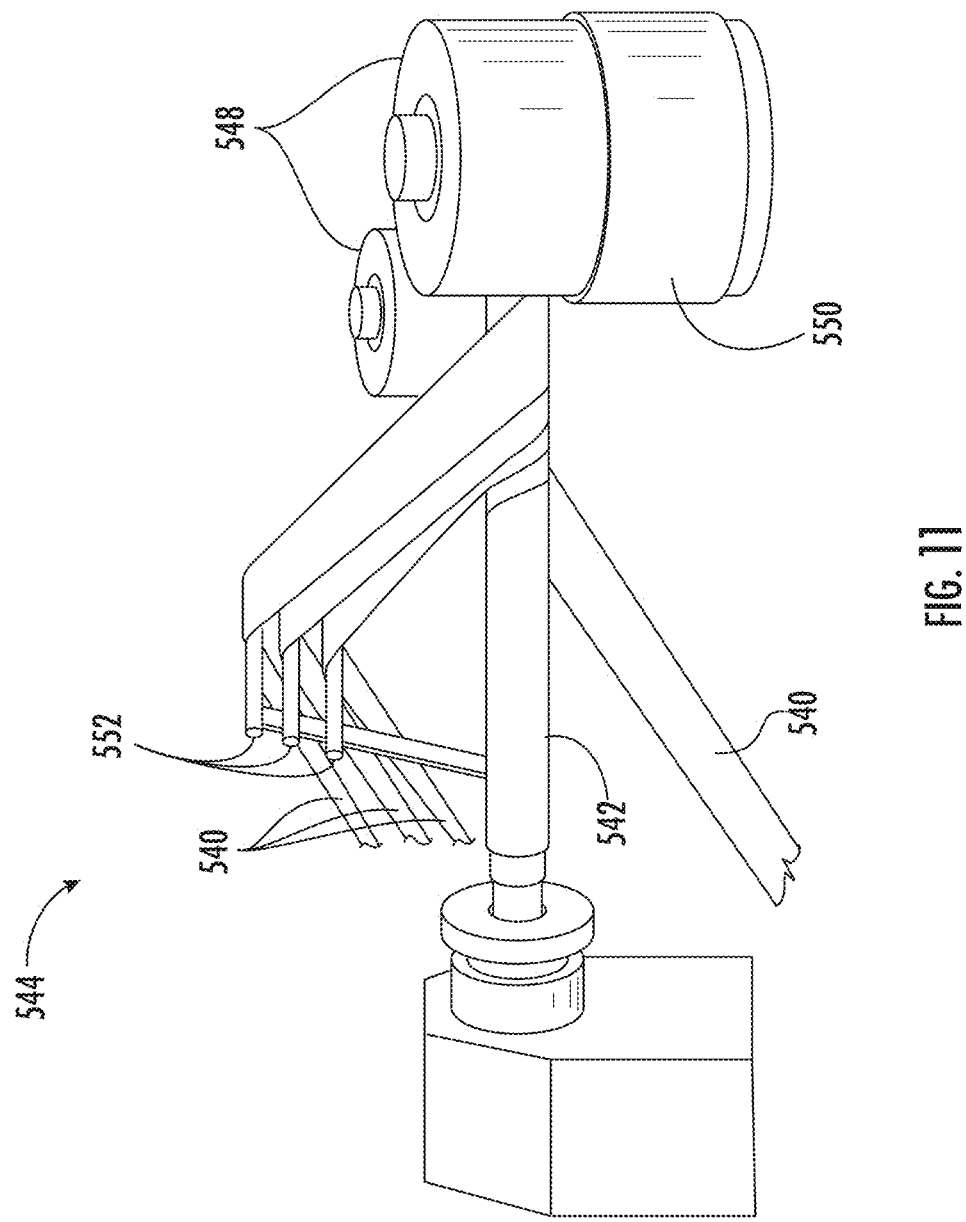
FIG. 11 is a perspective view of a winding machine that may be used to make a helically-wound driveshaft damper.

FIG. 11 is a perspective view of another winding machine 544 that may be used to make a helically-wound driveshaft damper. This winding machine 544 may be configured and arranged similarly to the winding machine depicted in FIG. 10. As depicted in FIG. 11, a plurality of plies of core material 540 are provided and supported by respective hangers 552 of a feeding assembly, so that first, second, and third plies of core material 540 are respectively supported by first, second, and third hangers 552. The winding machine 544 supplies a driving force configured both to wind core material 540 around a mandrel 542 and to advance the resulting core longitudinally along the mandrel. As shown, the driving force may be supplied by a pair of rollers 548 and a serpentine belt 550. As explained with respect to FIG. 10, one or both rollers 548 may be driven by a suitable motor (not shown), and the mandrel 542 typically remains stationary.

Figure 12:
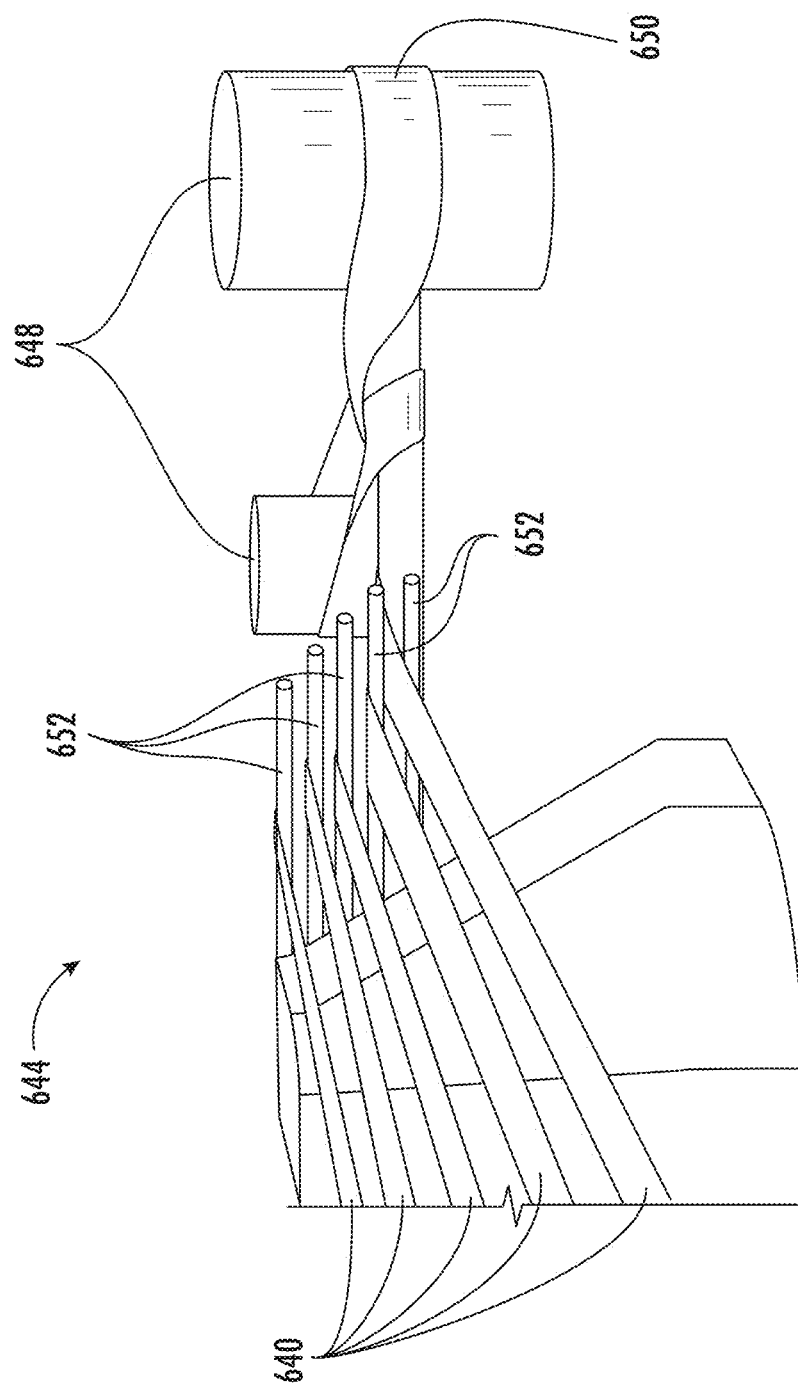
FIG. 12 is a perspective view of another winding machine that may be used to make a helically-wound driveshaft damper.

FIG. 12 depicts another winding machine 644 that may be used to make a helically-wound driveshaft damper. This winding machine 644 is configurable similarly to the winding machine in FIG. 11. As depicted in FIG. 12, five plies of core material 640 are respectively supported by hangers 652 of a feeding assembly. The winding machine 644 supplies a driving force configured both to wind core material 640 around the mandrel and to advance the resulting core longitudinally along the mandrel. As shown, the driving force may be supplied by a pair of rollers 648 and a serpentine belt 650. The winding machine 644 is typically configured so that one or both of the rollers 648 may be driven by a suitable motor (not shown), and the mandrel typically remains stationary.

As noted, when employing a continuous helical-winding process using conventional helical-winding machines, the winding angle θ, needs to fall within a range that will facilitate both proper helical winding of the core material around the mandrel and advancement of the resulting core along the mandrel. Stated otherwise, winding angle $\theta_w$ is limited by factors associated with both manufacturing conditions and structural requirements of the core. The winding-angle $\theta_w$ operating range for conventional helical-winding machines falls between about 45 and 78 degrees, and so the resulting helically-wound core typically exhibits a corresponding pitch angle θ of about 45 to 78 degrees (e.g., typically less than about 74 degrees to ensure good manufacturing runnability and productivity). Concurrently forming a core (e.g., using paper strips) and mounting of an attenuation strip requires substantially the same pitch angle. For example, the winding angle $\theta_w$ of paper strips that form a helically-wound, paper-tube core and the pitch angle θ of the mounted attenuation strips are substantially the same (e.g., within 2 degrees or so, such as within 1 degree or less) to ensure the helical-winding machine yields satisfactory driveshaft-damper quality (e.g., the attenuation strips and the core material are helically wound at the same pitch angle). Maintaining the same pitch angle helps prevent attenuation strips from overlapping either one another or a seam gap at the core's surface. Overlapping is undesirable, because it can cause an uneven surface that compromises the adhesion of attenuation strips to the core, and/or interferes with proper fit of the driveshaft damper inside a propshaft.

While one, three, and five plies of core material 440, 540, 640 are respectively depicted in FIGS. 10-12, it is to be understood these numbers of plies are shown for convenience only and that any suitable number of plies of core material (e.g., strips of paper, paperboard, or other core materials) may be provided. Those having ordinary skill in the art will appreciate that the initial ply, which may be narrower, will typically form a seam gap so that the last ply, which may be wider, does not overlap upon itself during the formation of the helically-wound, paper-tube core (i.e., the diameter of the paper-tube core increases during the winding process). This also provides for a manufacturing tolerance to accommodate variation in the paper strips (e.g., +/−0.25-inch variance in a representative 4.5-inch paper strip) and the corresponding changes to pitch length. As noted, if the ply width remains constant, the seam gap will widen as the diameter of the resulting core increases with successive plies of core material, and so to offset seam-gap widening during core construction, the inner plies of core-material strips are typically narrower than the outer plies of core-material strips.

In the embodiments depicted in FIGS. 10-12, the one or more attenuation strips are omitted for simplicity. As depicted in FIGS. 8 and 9, however, the one or more attenuation strips may be introduced at any suitable point along the mandrel and concurrently wound around the resulting core.

Summarizing an exemplary method for forming a helically-wound driveshaft damper, the method includes helically winding one or more plies of core material around a mandrel and, concurrently, helically winding one or more attenuation strips around the resulting core. In the exemplary method, a driving force may be provided to helically wind the plies of core material. In the exemplary method, at least some of the driving force is transferred to the helically-wound plies of core material, advancing the core material longitudinally along the mandrel. In the exemplary method, the plies of core material may be laminated using an adhesive to form a core. In the exemplary method, the one or more attenuation strips are bonded or otherwise secured to the core using an adhesive in a manner that ensures durability during driveshaft manufacture and subsequent use, and such mounted attenuation strips advance longitudinally along the mandrel together with the core. The attenuation strips may have one or more elongate protrusions, flanges, or other protuberant features. The one or more attenuation strips may be introduced at any suitable location along the mandrel and/or winding core. In some embodiments, the one or more attenuation strips may be introduced after the resulting core is formed, winding concurrently with the advancing core. Alternatively, one or more attenuation strips may be introduced concurrently with the plies of core material, for example, in advance of a serpentine belt or other driving force appropriately configured to interface with the one or more attenuation strips.

In one exemplary process embodiment, the method of making a driveshaft damper includes helically winding plies of core material around a mandrel at a winding angle $\theta_w$ to form a core, and concurrently helically winding one or more attenuation strips (e.g., a "triple-ridge" attenuation strip) around the core as the core advances longitudinally along the mandrel and securing the one or more attenuation strips to the core at a pitch angle $\theta$. In one particular method embodiment, the concurrent helical windings achieve (i) an effective pitch angle $\theta_e$ that exceeds both the winding angle $\theta_w$ and the pitch angle $\theta$ by at least 10 degrees (e.g., at least 11 degrees, such as 12 degrees or more) and (ii) an effective pitch ratio $P_e$ of at least 1.75 (e.g., at least 1.8 or 1.9, such as 2.0 or more). In another particular method embodiment, the concurrent helical windings achieve (i) an effective pitch angle $\theta_e$ that exceeds both the winding angle $\theta_w$ and the pitch angle $\theta$ by at least 6.5 degrees (e.g., at least 7 or 8 degrees, such as 10 degrees or more) and (ii) an effective pitch ratio $P_e$ of at least 3.0 (e.g., at least 3.5, such as at least 4.0). In yet another particular method embodiment, the concurrent helical windings achieve (i) an effective pitch angle $\theta_e$ that exceeds both the winding angle $\theta_w$ and the pitch angle $\theta$ by at least 16 degrees (e.g., at least 18 or 20 degrees, such as 24 degrees or more) and (ii) an effective pitch ratio $P_e$ of at least 0.9 (e.g., at least 0.95, 1.0, 1.1, or 1.2, such as at least 1.3 or 1.5). In yet another particular method embodiment, the concurrent helical windings achieve (i) an effective pitch angle $\theta_e$ that exceeds both the winding angle $\theta_w$ and the pitch angle $\theta$ by at least 7 degrees (e.g., at least 7.5 or 8 degrees, such as 9 degrees or more) and (ii) an effective pitch ratio $P_e$ of at least 2.6 (e.g., at least 2.75 or 2.9, such as at least 3.25 or 3.5). In yet another particular method embodiment, the concurrent helical windings achieve (i) an effective pitch angle $\theta_e$ that exceeds both the winding angle $\theta_w$ and the pitch angle $\theta$ by at least 12 degrees (e.g., at least 13 or 14 degrees, such as 16 degrees or more) and (ii) an effective pitch ratio $P_e$ of at least 1.5 (e.g., at least 1.8 or 2.0, such as at least 2.3). In yet another particular method embodiment, the concurrent helical windings achieve (i) an effective pitch angle $\theta_e$ that exceeds both the winding angle $\theta_w$ and the pitch angle $\theta$ by at least 13 degrees (e.g., at least 14 or 17 degrees) and (ii) an effective pitch ratio $P_e$ of at least 1.3 (e.g., at least 1.6, such as at least 2.1). In yet another particular method embodiment, the concurrent helical windings achieve (i) an effective pitch angle $\theta_e$ that exceeds both the winding angle $\theta_w$ and the pitch angle $\theta$ by at least 14 degrees (e.g., at least 15 or 18 degrees, such as 20 degrees or more) and (ii) an effective pitch ratio $P_e$ of at least 1.2 (e.g., at least 1.4, such as at least 1.9). These parameters may be achieved, for example, by helically winding an attenuation strip having at least three elongate protrusions of the same height (e.g., substantially uniform dimensions) or by winding two or more attenuation strips each having at least two elongate protrusions of uniform height (e.g., substantially uniform dimensions).

In another exemplary process embodiment, the method of making a driveshaft damper includes helically winding plies of core material around a mandrel at a winding angle $\theta_w$ (e.g., less than 80 degrees, such as 74 degrees or less) to form a core, and concurrently helically winding one or more attenuation strips around the core as the core advances longitudinally along the mandrel and securing the one or more attenuation strips to the core at a pitch angle $\theta$ (e.g., less than 80 degrees, such as 74 degrees or less). In one particular method embodiment, the concurrent helical windings achieve (i) an effective pitch angle $\theta_e$ that exceeds both the winding angle $\theta_w$ and the pitch angle $\theta$ (e.g., each 78 degrees or less) by more than 6.0 degrees (e.g., 7 degrees or more) and (ii) an effective pitch ratio $P_e$ of at least 3.0 (e.g., 4 or more). In another particular method embodiment, the concurrent helical windings achieve (i) an effective pitch angle $\theta_e$ that exceeds both the winding angle $\theta_w$ and the pitch angle $\theta$ (e.g., each about 77 degrees or less) by at least 7 degrees (e.g., 8 degrees or more) and (ii) an effective pitch ratio $P_e$ of at least 3 (e.g., 3.5 or more). In yet another particular method embodiment, the concurrent helical windings achieve (i) an effective pitch angle $\theta_e$ that exceeds both the winding angle $\theta_w$ and the pitch angle $\theta$ (e.g., each about 76 degrees or less) by at least 7 degrees (e.g., 9 degrees or more) and (ii) an effective pitch ratio $P_e$ of at least 2.75 (e.g., 3.25 or more). In yet another particular method embodiment, the concurrent helical windings achieve (i) an effective pitch angle $\theta_e$ that exceeds both the winding angle $\theta_w$ and the pitch angle $\theta$ (e.g., each about 75 degrees or less) by at least 8 degrees (e.g., 9 degrees or more) and (ii) an effective pitch ratio $P_e$ of at least 2.5 (e.g., 3 or more). In yet another particular method embodiment, the concurrent helical windings achieve (i) an effective pitch angle $\theta_e$ that exceeds both the winding angle $\theta_w$ and the pitch angle $\theta$ (e.g., each about 74 degrees or less) by at least 8 degrees (e.g., 10 degrees or more) and (ii) an effective pitch ratio $P_e$ of at least 2.3 (e.g., 2.8 or more). In yet another particular method embodiment, the concurrent helical windings achieve (i) an effective pitch angle $\theta_e$ that exceeds both the winding angle $\theta_w$ and the pitch angle $\theta$ (e.g., each about 72 degrees or less) by at least 9 degrees (e.g., 11 degrees or more) and (ii) an effective pitch ratio $P_e$ of at least 2.2 (e.g., 2.5 or more). In yet another particular method embodiment, the concurrent helical windings achieve (i) an effective pitch angle $\theta_e$ that exceeds both the winding angle $\theta_w$ and the pitch angle $\theta$ (e.g., each about 70 degrees or less) by at least 10 degrees (e.g., 12 degrees or more) and (ii) an effective pitch ratio $P_e$ of at least 1.9 (e.g., 2.25 or more). In yet another particular method embodiment, the concurrent helical windings achieve (i) an effective pitch angle $\theta_e$ that exceeds both the winding angle $\theta_w$ and the pitch angle $\theta$ (e.g., each about 68 degrees or less) by at least 11 degrees (e.g., 13 degrees or more) and (ii) an effective pitch ratio $P_e$ of at least 1.7 (e.g., 2.2 or more). In yet another particular method embodiment, the concurrent helical windings achieve (i) an effective pitch angle $\theta_e$ that exceeds both the winding angle $\theta_w$ and the pitch angle $\theta$ (e.g., each about 65 degrees or less) by at least 12 degrees (e.g., 14 degrees or more) and (ii) an effective pitch ratio $P_e$ of at least 1.5 (e.g., 1.75 or more). In yet another particular method embodiment, the concurrent helical windings achieve (i) an effective pitch angle $\theta_e$ that exceeds both the winding angle $\theta_w$ and the pitch angle $\theta$ (e.g., each about 62 degrees or less) by at least 14 degrees (e.g., 16 degrees or more) and (ii) an effective pitch ratio $P_e$ of at least 1.3 (e.g., 1.6 or more). In yet another particular method embodiment, the concurrent helical windings achieve (i) an effective pitch angle $\theta_e$ that exceeds both the winding angle $\theta_w$ and the pitch angle $\theta$ (e.g., each about 60 degrees or less) by at least 15 degrees (e.g., 18 degrees or more) and (ii) an effective pitch ratio $P_e$ of at least 1.2 (e.g., 1.4 or more). In yet another particular method embodiment, the concurrent helical windings achieve (i) an effective pitch angle $\theta_e$ that exceeds both the winding angle $\theta_w$ and the pitch angle $\theta$ (e.g., each about 54 degrees or less) by at least 18 degrees (e.g., 21 degrees or more) and (ii) an effective pitch ratio $P_e$ of at least 1.0 (e.g., 1.2 or more). In yet another particular method embodiment, the concurrent helical windings achieve (i) an effective pitch angle $\theta_e$ that exceeds both the winding angle $\theta_w$ and the pitch angle $\theta$ (e.g., each about 45 degrees) by at least 20 degrees (e.g., 25 degrees or more) and (ii) an effective pitch ratio $P_e$ of at least 0.9 (e.g., 1.25 or more). Typically, the winding angle $\theta_w$ and the pitch angle $\theta$ are substantially the same (e.g., within 1 degree or less, such as 0.5 degree or less) to ensure the helical-winding machine yields satisfactory driveshaft-damper quality.

Attenuation strips may be configured and arranged in different ways in accordance with the present disclosure. In this regard, during the assembly process an attenuation strip may be under sufficient tension to stretch. For example, helically winding an EPDM rubber attenuation strip or a silicone rubber attenuation strip onto a paperboard core may cause the rubber attenuation strip to stretch less than about 20 percent (e.g., less than about 10 percent). Typically, the dimensions of the stretched attenuation strip will reduce proportionally.

Figure 13:
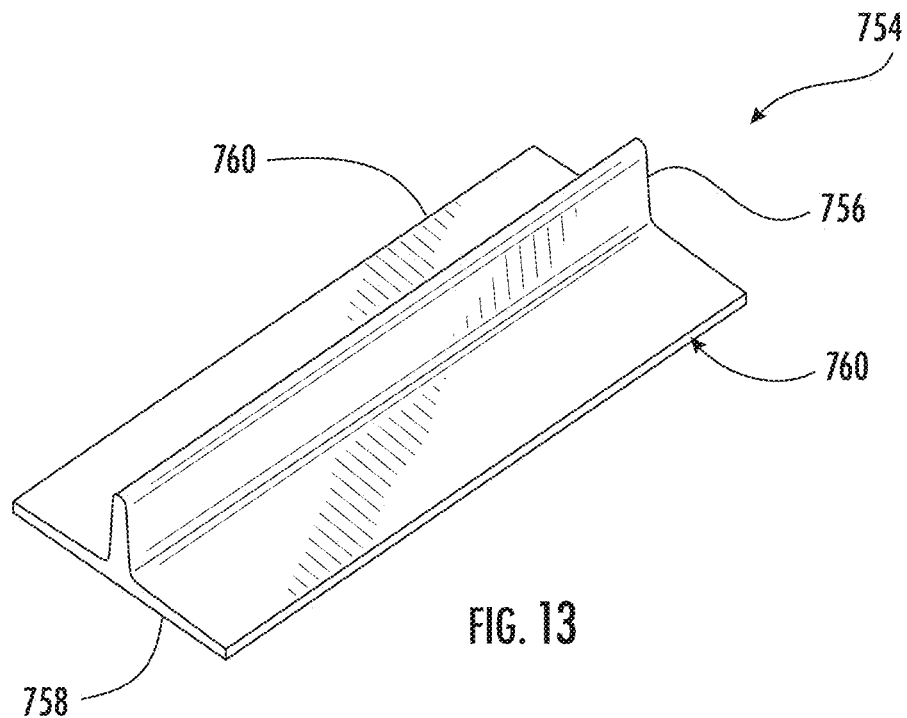
FIG. 13 is a perspective view of a representative lengthwise portion of a comparative attenuation strip with one elongate protrusion (i.e., a "single-ridge" attenuation strip).
Figure 14:
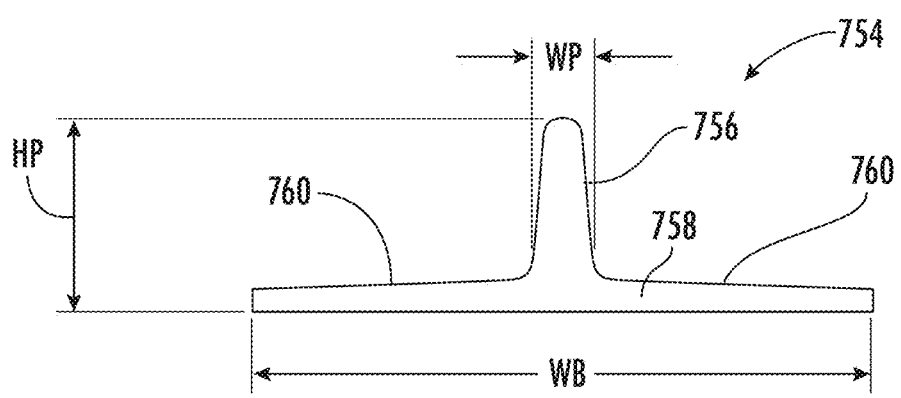
FIG. 14 is an end elevation view of the comparative, single-ridge attenuation strip of FIG. 13.
Figure 15:
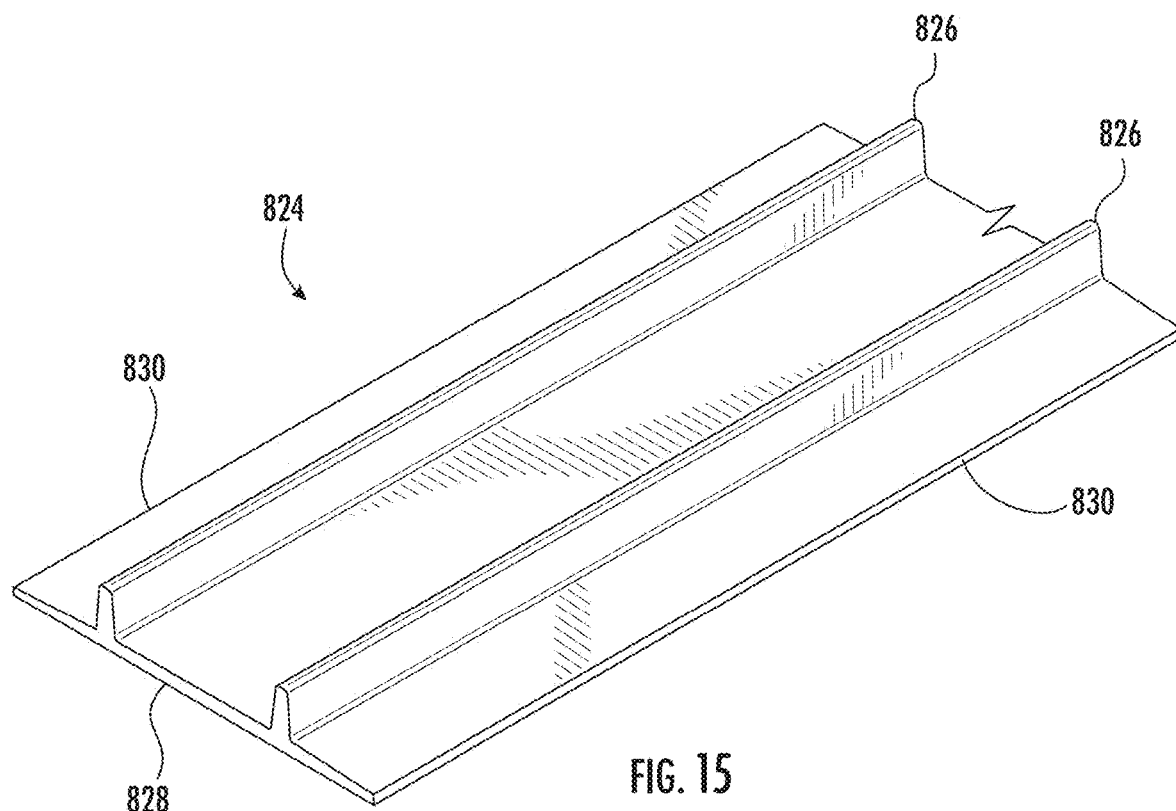
FIG. 15 is a perspective view of a representative lengthwise portion of an exemplary attenuation strip with two elongate protrusions (i.e., a "double-ridge" attenuation strip).

FIGS. 13 and 14 depict a comparative "single-ridge" attenuation strip 754 with one elongate protrusion 756. The elongate protrusion 756 is configured to provide a contact surface with the inside surface of a driveshaft. The comparative attenuation strip 754 also includes a substantially flat base 758 having opposite, lengthwise adhesion flanges 760 configured to assist with bonding the comparative attenuation strip to a core. Referring to FIG. 14, the comparative attenuation strip 754 has a relatively narrow base 758 with a width WB of about 0.820±0.035 inch. The height HP of the single elongate protrusion 756 is 0.250±0.012 inch as measured from the bottom of the base 758. The lower, widest portion of the elongate protrusion 756 has a width WP of 0.080±0.014 inch.

Figure 16A:
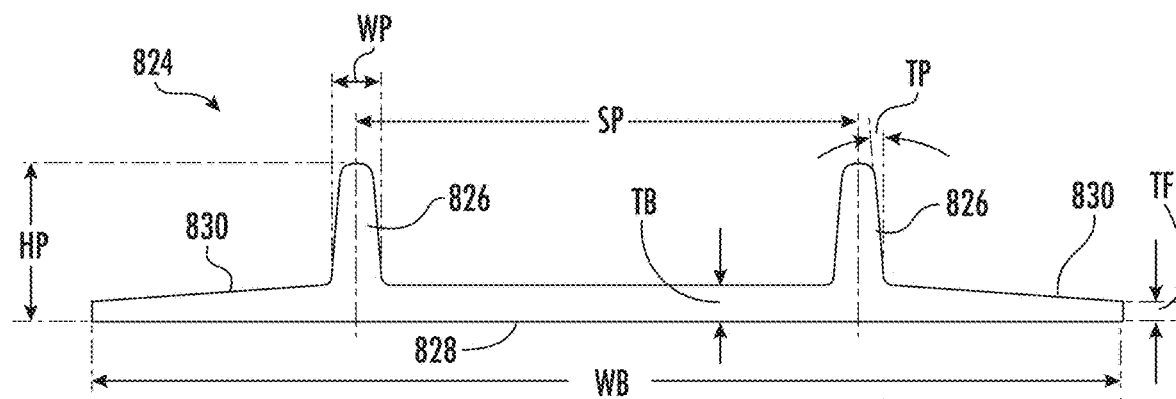
FIG. 16A is an end elevation view of the attenuation strip of FIG. 15.
Figure 16B:
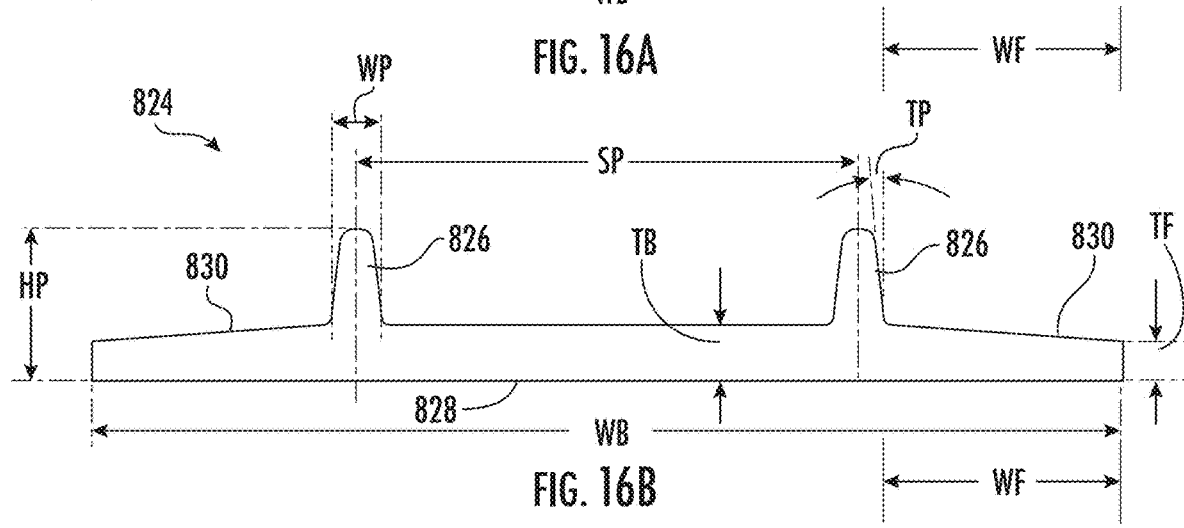
FIGS. 16B and 16C are alternative, exemplary embodiments an attenuation strip with two elongate protrusions (i.e., a "double-ridge" attenuation strip).
Figure 16C:
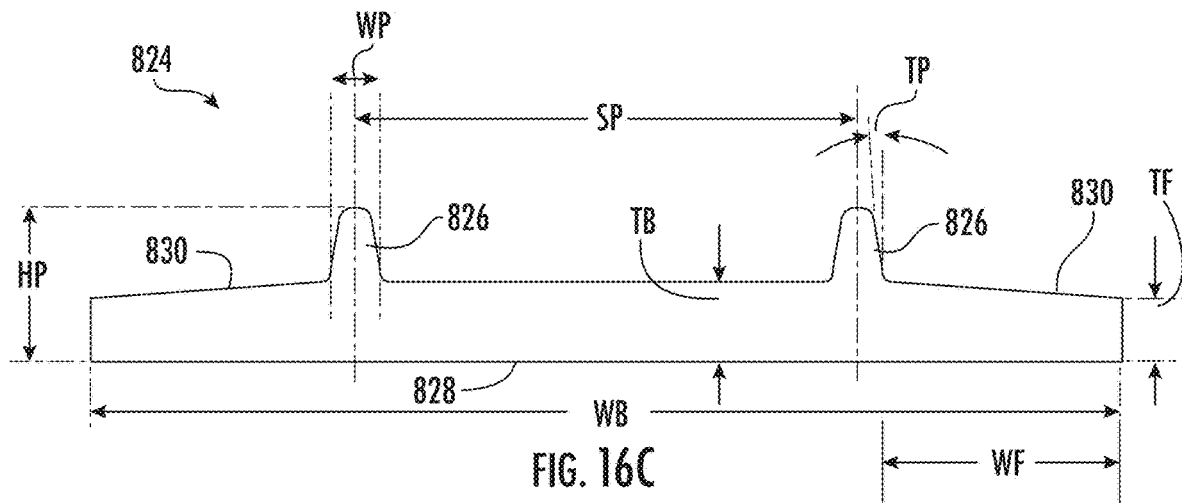
Figure 17:
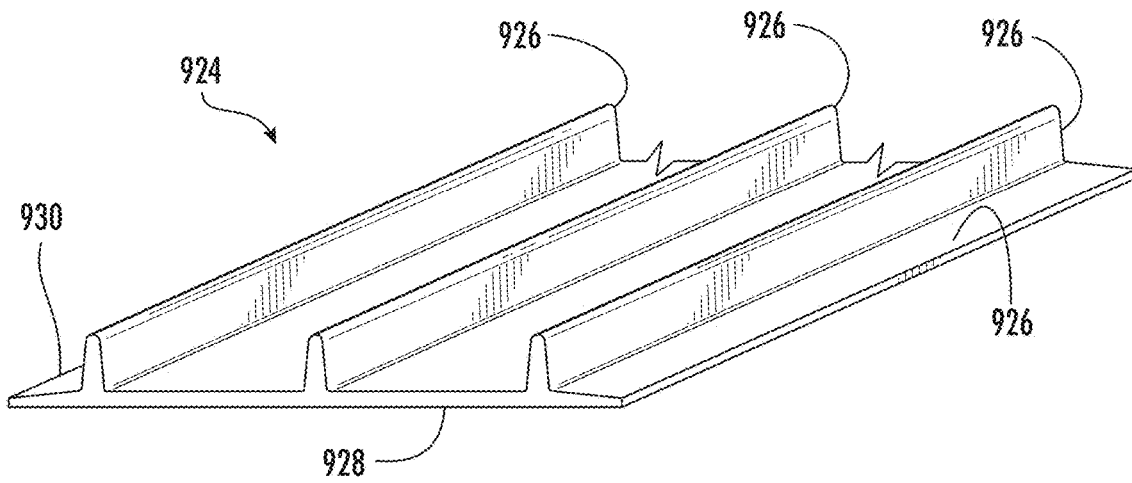
FIG. 17 is a perspective view of a representative lengthwise portion of an exemplary attenuation strip with three elongate protrusions (i.e., a "triple-ridge" attenuation strip).
Figure 18:
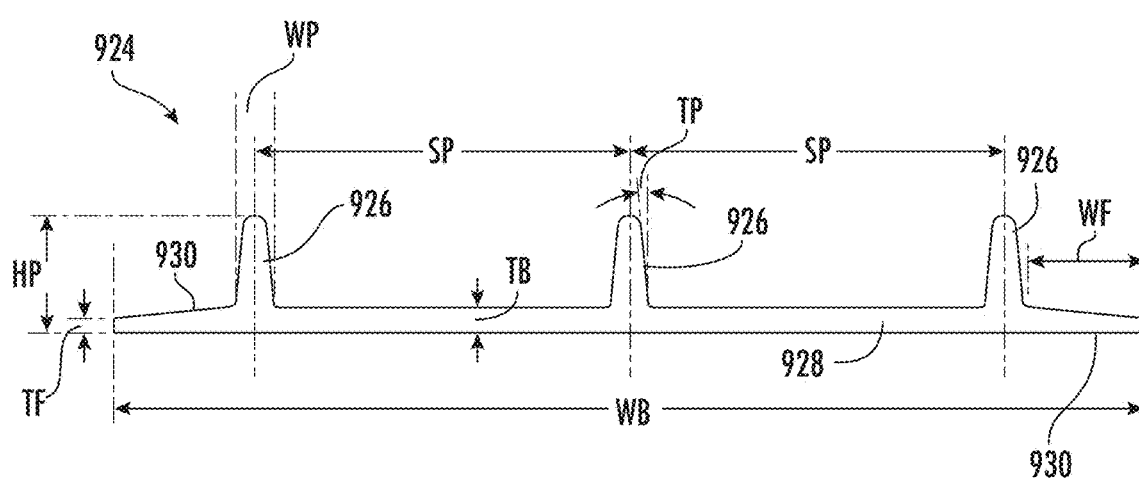
FIG. 18 is an end elevation view of the attenuation strip of FIG. 17.

FIGS. 15-18 respectively depict exemplary attenuation strips 824, 924 that include a plurality of elongate protrusions 826, 926, each of which is configured to provide a contact surface (e.g., an interference fit) with the inside surface of a driveshaft. As depicted in FIG. 15 and FIGS. 16A, 16B, and 16C, an exemplary "double-ridge" attenuation strip 824 includes a first elongate protrusion 826 configured to provide a first contact surface with the inside surface of a driveshaft and a second elongate protrusion 826 configured to provide a second contact surface with the inside surface of a driveshaft. As depicted in FIGS. 17 and 18, the exemplary "triple-ridge" attenuation strip 924 includes a first elongate protrusion 926 configured to provide a first contact surface with the inside surface of a driveshaft, a second elongate protrusion 926 configured to provide a second contact surface with the inside surface of a driveshaft, and a third elongate protrusion 926 configured to provide a third contact surface with the inside surface of a driveshaft.

Both the exemplary "double-ridge" attenuation strip 824 and the exemplary "triple-ridge" attenuation strip 924 respectively include adhesion flanges 830, 930 configured to assist with bonding each exemplary attenuation strip to a core (e.g., each attenuation-strip embodiment 824, 924 respectively includes a substantially flat base 828, 928 respectively having lengthwise adhesion flanges 830, 930 on opposite sides of the elongate protrusions). The attenuation strips 824, 924 may be configured with any suitable dimensions, and with any suitable number of elongate protrusions 826, 926, flanges 830, 930, or other protuberant features. For example, an attenuation strip may have between two and ten (e.g., three, four, five six, etc.) or even more elongate protrusions (e.g., 20 or more protrusions) provided sufficient spacing is available. In exemplary embodiments, the attenuation strips (e.g., attenuation strips 824, 924) may be formed of EPDM (e.g., 55+/−5 Shore A durometer) and/or silicone rubber (e.g., 24-44 Shore A durometer).

As examples, the double-ridge attenuation strip 824 of FIG. 15 and FIGS. 16A, 16B, and 16C can be representative of the above-discussed attenuation strips 124 (FIG. 2), 224 (FIGS. 3 and 8), 225 (FIGS. 3 and 8). Each of the attenuation strips 124, 224, 225 may be like the attenuation strip 824, except for variations noted and variations that will be apparent to those of ordinary skill in the art. Similarly, and as further examples, the exemplary triple-ridge attenuation strip 924 depicted in FIGS. 17 and 18 can be representative of the above-discussed attenuation strips 24 (FIGS. 1 and 9), 324 (FIG. 5), 325 (FIG. 5). Each of the attenuation strips 24, 324, 325 may be like the attenuation strip 924, except for variations noted and variations that will be apparent to those of ordinary skill in the art.

Figure 19:
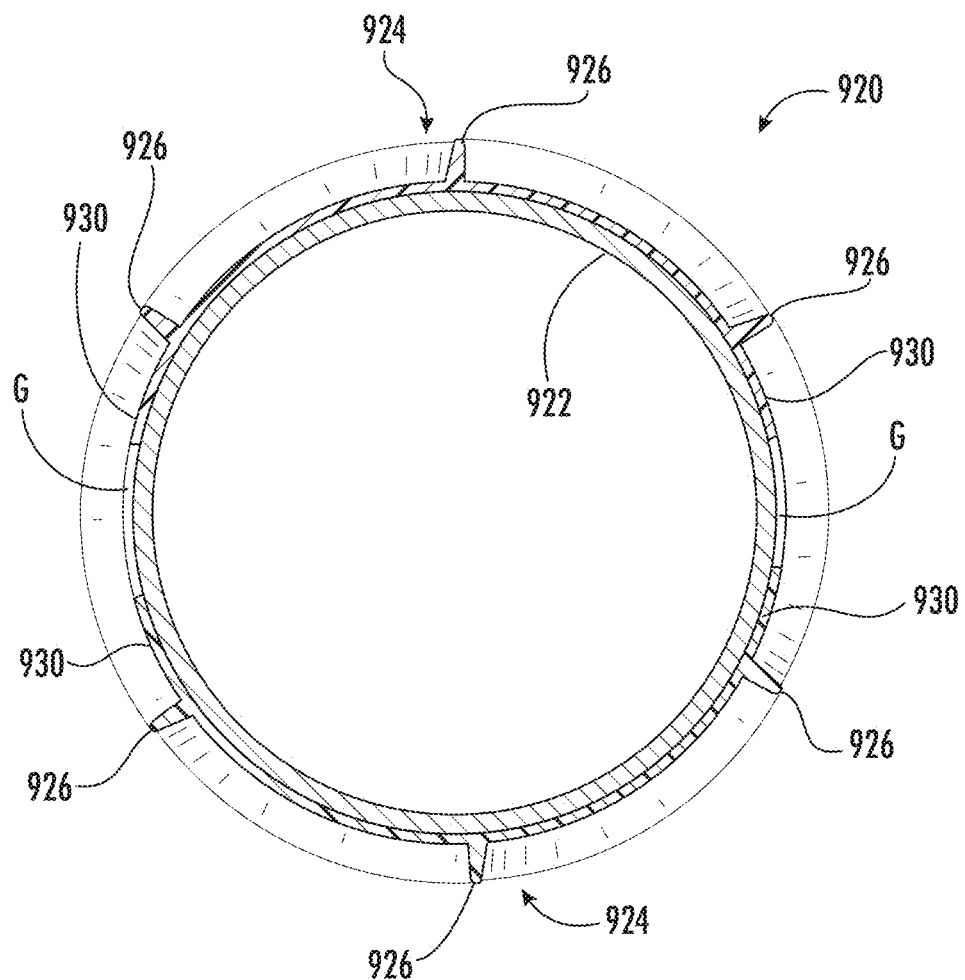
FIG. 19 is a cross-sectional view of an exemplary driveshaft damper with two attenuation strips each having a plurality of elongate protrusions helically wound about the circumference of a core.

Each of the double-ridge attenuation strip 824 (FIG. 15 and FIGS. 16A, 16B, and 16C) and the triple-ridge attenuation strip 924 (FIGS. 17 and 18) can be incorporated into various differently configured driveshaft dampers. For example, FIG. 19 is a cross-sectional view of an exemplary driveshaft damper 920 with the cross section taken perpendicular the length of the damper. The driveshaft damper 920 has a core 922 and two attenuation strips 924 helically wound around the core. The triple-ridge attenuation strips 924 each have three elongate protrusions 926. The attenuation strips 924 wind helically around the core 922 at a pitch angle that provides adjacent, spaced apart lateral edges of the attenuation strips, as indicated by relatively wide gaps G between the lateral edges (e.g., the adjacent adhesion flanges 930). Alternatively, a wider pitch angle may be selected to provide a somewhat narrower gap G.

Referring to FIGS. 16A, 16B, and 16C and FIG. 18, in some embodiments, an attenuation strip with a plurality of elongate protrusions may have a base with a width WB ranging from 0.5 to 12 inches wide (e.g., 2.20 inches or 2.44 inches wide for a "triple-ridge" attenuation strip). The height HP of each of the plurality of elongate protrusions may range from 0.1 to 0.5 inch (e.g., 0.125 inch or 0.375 inch). As noted, the height HP of each elongate protrusion is measured from the bottom of the attenuation strip's base to the peak of the elongate protrusion. The elongate protrusions may have a width WP ranging from 0.05 to 0.25 inch (e.g., about 0.10 inch), and, in some embodiments, the elongate protrusions may have a taper TP on one or both sides (e.g., between about 1 and 10 degrees, such as about 3 to 8 degrees). The elongate protrusions may be spaced SP laterally along the attenuation strip between 0.1 inch to 4 inches apart, measured center-to-center. The elongate protrusions may be spaced equally from one another, or at varying distances, as may be suitable for various applications. In some embodiments, an attenuation strip may have a flat-base thickness TB between about 0.025 and 0.25 inch between the elongate protrusions (i.e., toward the middle of the "triple-ridge" attenuation strip). The adhesion flanges may have a width WF of between about 0.2 and 0.5 inch (e.g., 0.25 inch to 0.4 inch) and a thickness TF ranging from 0.01 to 0.2 inch (e.g., an edge thickness of 0.02 inch to 0.15 inch). In exemplary embodiments, an adhesion flange may have a taper on the top surface extending from the adjacent elongate protrusion. The dimensions and other characteristics of the attenuation strips, such as the thickness of the attenuation strips and the protrusion heights, may be adjusted to change the mass of the attenuation strip, for example to tune the driveshaft damper (e.g., to effect broad-band tuning).

Referring to FIG. 16A, a first version of the double-ridge attenuation strip 824 may have a maximum height (e.g., protrusion height HP) of 0.250±0.012 inch and a width (e.g., base width WB) of 1.640±0.063 inches. The maximum height (e.g., protrusion height HP) of the first version attenuation strip 824 is typically the vertical distance to the peak of the tallest elongate protrusions from the lower surface of the attenuation strip's base. The first version attenuation strip 824 has two uniform elongate protrusions, which may be spaced 0.800 inch apart measured center-to-center. The elongate protrusions may have a width (e.g., protrusion width WP) of 0.080±0.014 inch at the protrusion base with a taper TP of 5.0 degrees on each side extending from the base of the first version attenuation strip 824 (i.e., the upper surface of the attenuation-strip base). An exemplary ratio of the maximum height of the attenuation strip (e.g., at an elongate-protrusion peak) to the maximum width of the elongate protrusion is between 2 and 4 (e.g., between about 2.5 and 3.5). The outer adhesion flanges 830 of the first version attenuation strip 824 may have a width WF of about 0.38 inch and a thickness TF of 0.030±0.010 inch at their respective ends, which reflect a taper of about 2 degrees on the top side of the adhesion flange extending from the adjacent elongate protrusion. The first version attenuation strip 824 may have a thickness (e.g., base thickness TB) of 0.054±0.010 inch between the elongate protrusions (i.e., toward the middle of the "double-ridge" first version attenuation strip 824), whereby the height of the elongate protrusions is between about 0.174 inch and 0.218 inch (e.g., 0.196 inch) as measured from the upper surface of the attenuation-strip base.

Referring to FIG. 16B, a second version of the double-ridge attenuation strip 824 has a thicker base (e.g., about 1 millimeter thicker). This provides more stiffness and mass to the driveshaft damper. The second version of the double-ridge attenuation strip 824 is otherwise similar to the thinner, first version of the double-ridge attenuation strip 824. The second version of the double-ridge attenuation strip 824 may have a maximum height (e.g., protrusion height HP) of 0.250±0.012 inch and a width (e.g., base width WB) of 1.640±0.063 inches. As noted, the maximum height of the attenuation strip is typically the vertical distance to the peak of the tallest elongate protrusions from the lower surface of the attenuation strip's base. The two uniform elongate protrusions of the second version of the double-ridge attenuation strip 824 may be spaced 0.800 inch measured center-to-center. The elongate protrusions of the second version of the double-ridge attenuation strip 824 may have a width (e.g., protrusion width WP) of 0.080±0.014 inch at the protrusion base with a taper TP of 6.0 degrees on each side extending from the base of the attenuation strip (i.e., the upper surface of the attenuation-strip base). The outer adhesion flanges 830 of the second version of the double-ridge attenuation strip 824 may have a width WF of about 0.38 inch and an increased thickness TF of 0.069±0.010 inch at their respective ends, which reflects a taper on the top side of the adhesion flange extending from the adjacent elongate protrusion. The second version of the double-ridge attenuation strip 824 may have an increased thickness TB of 0.093±0.010 inch between the elongate protrusions (i.e., toward the middle of the "double-ridge" attenuation strip), whereby the height of the elongate protrusions is between about 0.179 inch and 0.135 inch (e.g., 0.157 inch) as measured from the upper surface of the attenuation-strip base.

Referring to FIG. 16C, a third version of the double-ridge attenuation strip 824 has an even thicker base (e.g., about 2 millimeters thicker). This provides even more stiffness and mass to the driveshaft damper. The third version of the double-ridge attenuation strip 824 is otherwise similar to the first and second versions of the double-ridge attenuation strip 824. The third version of the double-ridge attenuation strip 824 may have a maximum height (e.g., protrusion height HP) of 0.250±0.012 inch and a width (e.g., base width WB) of 1.640±0.063 inches. As noted, the maximum height of the attenuation strip is typically the vertical distance to the peak of the tallest elongate protrusions from the lower surface of the attenuation strip's base. The two uniform elongate protrusions of the third version of the double-ridge attenuation strip 824 may be spaced 0.800 inch apart measured center-to-center. The elongate protrusions of the third version of the double-ridge attenuation strip 824 may have a width (e.g., protrusion width WP) of 0.080±0.014 inch at the protrusion base with a taper TP of 6.3 degrees on each side extending from the base of the attenuation strip (i.e., the upper surface of the attenuation-strip base). The outer adhesion flanges 830 may have a width WF of about 0.38 inch and an increased thickness TF of 0.108±0.010 inch at their respective ends, which reflects a taper on the top side of the adhesion flange extending from the adjacent elongate protrusion. The third version of the double-ridge attenuation strip 824 may have an increased thickness TB of 0.132±0.010 inch between the elongate protrusions (i.e., toward the middle of the "double-ridge" attenuation strip), whereby the height of the elongate protrusions is between about 0.140 inch and 0.96 inch (e.g., 0.118 inch) as measured from the upper surface of the attenuation-strip base.

Referring to FIGS. 17 and 18, a first version of the triple-ridge attenuation strip 924 may have a maximum height (e.g., protrusion height HP) of 0.250±0.012 inch and a width (e.g., base width WB) of 2.440±0.063 inches. The first version of the triple-ridge attenuation strip 924 has three uniform elongate protrusions, each of which may be spaced SP 0.800 inch apart measured center-to-center. The elongate protrusions of the first version of the triple-ridge attenuation strip 924 may have a width (e.g., protrusion width WP) of 0.080±0.014 inch at the protrusion base with a taper TP of 5.0 degrees on each side extending from the base of the attenuation strip (i.e., the upper surface of the attenuation-strip base). The adhesion flanges 930 of the first version of the triple-ridge attenuation strip 924 may have a width WF of about 0.38 inch and a thickness TF of 0.030±0.010 inch at their outer ends, which reflect a taper of 2.0 degrees on the top side of the adhesion flange extending from the adjacent elongate protrusion. The first version of the triple-ridge attenuation strip 924 may have a base thickness TB of 0.054±0.010 between the elongate protrusions (i.e., toward the middle of the "triple-ridge" attenuation strip), whereby the height the elongate protrusions is between about 0.174 inch and 0.218 inch (e.g., 0.196 inch) as measured from the upper surface of the attenuation-strip base.

Referring to FIGS. 17 and 18, a second version of the triple-ridge attenuation strip 924 may have a maximum height (e.g., protrusion height HP) of 0.250±0.012 inch and a width (e.g., base width WB) of about 2.20 inches. The second version of the triple-ridge attenuation strip 924 has three uniform elongate protrusions spaced 0.800 inch apart from the adjacent protrusion as measured center-to-center. The elongate protrusions of the second version of the triple-ridge attenuation strip 924 are between about 0.08 inch and 0.10 inch wide at the protrusion base and include a taper TP of 5.0 degrees on each side extending from the base of the attenuation strip (i.e., the upper surface of the attenuation-strip base). The adhesion flanges of the second version of the triple-ridge attenuation strip 924 are about 0.25 inch wide and about 0.030 inch thick at their outermost ends. Each adhesion flange of the second version of the triple-ridge attenuation strip 924 is slightly tapered (e.g., 2 degrees or so) at the top side of the attenuation-strip base. The second version of the triple-ridge attenuation strip 924 may have a base thickness TB of 0.054±0.010 between the elongate protrusions (i.e., toward the middle of the "triple-ridge" attenuation strip), whereby the height of the elongate protrusions is between about 0.174 inch and 0.218 inch (e.g., 0.196 inch) as measured from the upper surface of the attenuation-strip base. U.S. Patent Application No. 62/748,204 for Driveshaft Dampers and Systems and Methods for Making and Using the Same (filed Oct. 19, 2018), which is incorporated by reference in its entirety, includes exemplary engineering specifications and measurements for these "triple-ridge" attenuation strips, as well as photographs of a "triple-ridge" attenuation strip prototype.

Attenuation strips may be characterized by a dimensionless base-to-protrusion ratio (BPR) using this equation:

$$BPR = \frac{\text{width of base}}{\text{maximum height of elongated protrusions}}. \quad (eq. 8)$$

Typical attenuation strips with a single elongate protrusion may exhibit a base-to-protrusion ratio BPR ranging from 1 to 5. For example, the attenuation strip depicted in FIGS. 13 and 14 may have a base-to-protrusion ratio BPR of about 3.3 (i.e., 0.82-inch base width÷0.25-inch protrusion height).

By comparison, exemplary attenuation strips with a plurality of elongate protrusions may exhibit a base-to-protrusion ratio BPR 1 to 100, or greater. Exemplary attenuation strips with two or three elongate protrusions have a BPR of greater than 5 (e.g., 6 to 12). For example, the "triple-ridge" attenuation strip depicted in FIGS. 17 and 18 has a base-to-protrusion ratio BPR between about 8 and 10 (e.g., 2.20-inch or 2.44-inch base width÷0.25-inch protrusion height). In some embodiments, exemplary attenuation strips with a plurality of elongate protrusions may exhibit a base-to-protrusion BPR of at least 10, at least 15, at least 20, at least 25, or at least 50 or more. Attenuation strips with multiple elongate protrusions are typically designed so the protrusions are uniform in at least height (e.g., dimensions within manufacturing tolerances of less than 5 percent variation, such as less than 3 percent variation). If an attenuation strip has multiple elongate protrusions of differing heights, the height of the tallest elongate protrusion as measured from the bottom of the attenuation strip's base should determine base-to-protrusion ratio (BPR).

Moreover, attenuation strips may be characterized by a dimensionless protrusion-spacing ratio (PSR) using this equation:

$$PSR = \frac{\text{mean spacing between adjacent protrusions}}{\text{maximum height of elongated protrusions}}. \quad (eq. 9)$$

As noted, spacing between adjacent elongate protrusions is laterally measured center-to-center as illustrated in FIGS. 17 and 18. Typical attenuation strips with two or more elongate protrusions may exhibit a protrusion-spacing ratio PSR ranging between 1 and 5, such as between 2 and 4 (e.g., about 3). For example, the attenuation strip depicted in FIGS. 17 and 18 has a protrusion-spacing ratio PSR of about 3.2 (i.e., 0.80-inch mean protrusion spacing÷0.25-inch protrusion height). A 4.25-inch attenuation strip having sixteen (16) 0.25-inch elongate protrusions equally spaced at 0.25-inch increments would have a protrusion-spacing ratio PSR of 1 (i.e., 0.25-inch mean protrusion spacing÷0.25-inch protrusion height). It is thought that, for a given number of protrusions on an attenuation strip, a protrusion-spacing ratio PSR of at least 1 will provide better damping across the driveshaft damper (i.e., the elongate protrusions are greater spaced from one another.) If an attenuation strip has multiple elongate protrusions of differing heights, the height of the tallest elongate protrusion as measured from the bottom of the attenuation strip's base should determine protrusion-spacing ratio (PSR).

As noted, attenuation strips with multiple elongate protrusions are typically designed so the protrusions are uniform, because this achieves effective NVH damping. Unless otherwise stated, the standard protrusion-spacing ratio (PSR) is reported using all elongate protrusions. Alternatively, the protrusion-spacing ratio (PSR) may be characterized for an attenuation strip with multiple elongate protrusions of differing heights by disregarding elongate protrusions that are significantly shorter than the tallest elongate protrusion. In this regard, protrusion-spacing ratio (PSR) may be determined by disregarding elongate protrusions (e.g., outboard ribs) that are not configured for significant interference fit within a driveshaft or a propshaft. For example, protrusion-spacing ratio (PSR) may be calculated by disregarding protrusions that are less than 70 percent ($PSR_{70}$), less than 80 percent ($PSR_{80}$), or even less than 90 percent ($PSR_{90}$) of the tallest elongate protrusion. In these alternative PSR calculations for non-uniform elongate protrusions, the mean protrusion spacing may increase, and the reported alternative protrusion-spacing ratio (e.g., $PSR_{70}$, $PSR_{80}$, or $PSR_{90}$) may increase relative to standard PSR.

Both the base-to-protrusion ratio (BPR) and the protrusion-spacing ratio (PSR) are reported herein in a free state (i.e., unstretched). That said, the dimensions of a stretched attenuation strip should reduce proportionally during assembly, and so the base-to-protrusion ratio (BPR) and the protrusion-spacing ratio (PSR) ought to be consistent in either a relaxed or a stretched state. Moreover, either the base-to-protrusion ratio (BPR) or the protrusion-spacing ratio (PSR) may be designed to modify the damping characteristics of the driveshaft damper (e.g., to reduce or shift resonance frequencies) as installed in a particular propshaft.

In this regard, a tensioned attenuation strip might stretch during the assembly process. For example, helically winding an EPDM rubber attenuation strip or a silicone rubber attenuation strip onto a paperboard core may cause a rubber attenuation strip to stretch less than about 20 percent. Typically, the dimensions of the stretched attenuation strip will reduce proportionally.

Figure 20:
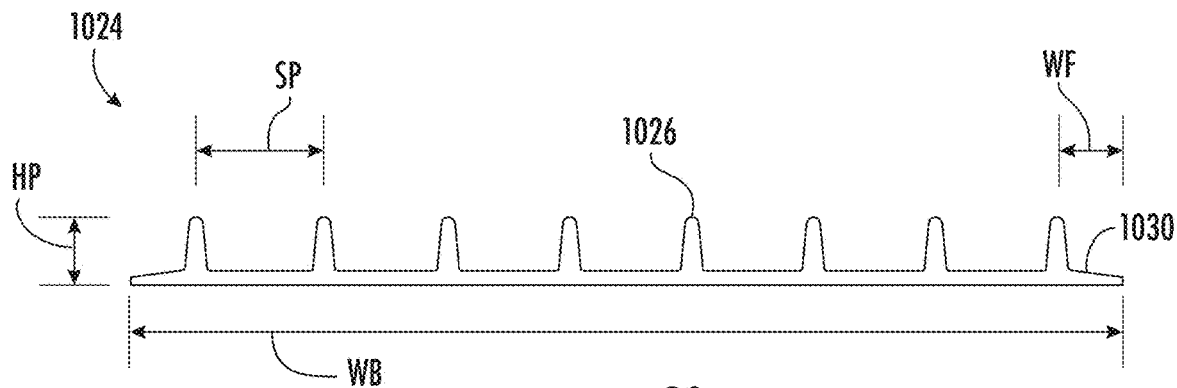
FIGS. 20-22 are isolated, end elevational views of additional exemplary attenuation strips, each in a flat configuration.

Additional examples of attenuation strips are depicted in FIGS. 20-25, wherein each is depicted in isolation in its flat configuration. As depicted in FIG. 20, an attenuation strip 1024 may include several (e.g., eight) elongate protrusions 1026. The attenuation strip 1024 may have a suitable width WB of, for example, about 4 inches. For example, the elongate protrusions 1026 may be spaced from one another with a spacing SP of, for example, about 0.5 inch, and the attenuation strip 1024 may have adhesion flanges 1030 that have a width WF of, for example, about 0.25 inch.

Figure 21:
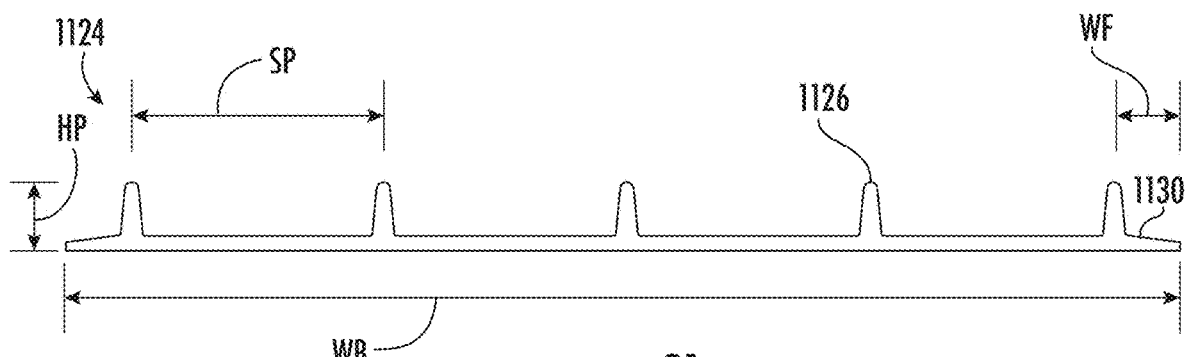

As depicted in FIG. 21, an attenuation strip 1124 may include several (e.g., five) elongate protrusions 1126. The attenuation strip 1124 may have a suitable width WB of, for example, about 4.5 inches. For example, the elongate protrusions 1126 may be spaced from one another with a spacing SP of, for example, about 1.0 inch, and the attenuation strip 1124 may have adhesion flanges 1130 that have a width WF of, for example, about 0.25 inch.

Figure 22:
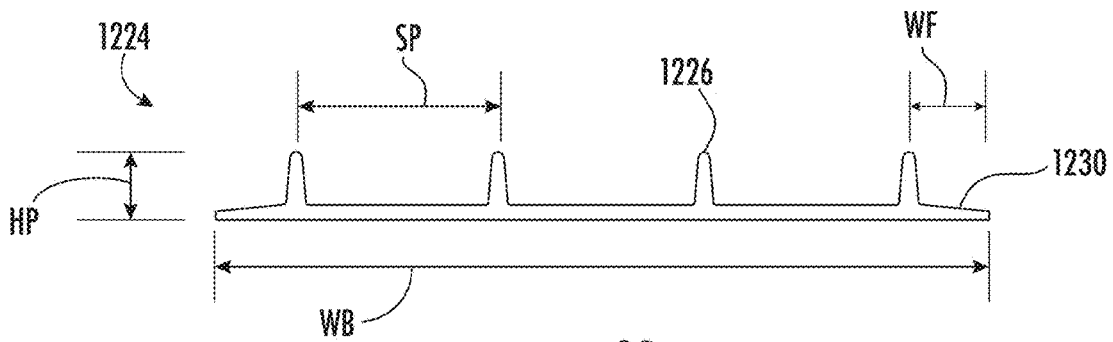

As depicted in FIG. 22, an attenuation strip 1224 may include several (e.g., four) elongate protrusions 1226. The attenuation strip 1224 may have a suitable width WB of, for example, about 3 inches. For example, the elongate protrusions 1226 may be spaced from one another with a spacing SP of, for example, about 0.8 inch, and the attenuation strip 1224 may have adhesion flanges 1230 that have a width WF of, for example, about 0.3 inch.

Figure 23:
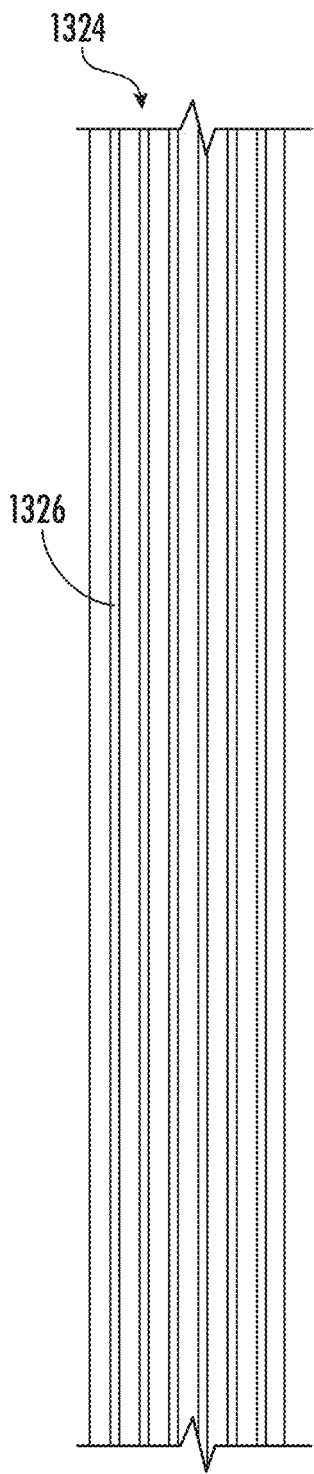
FIGS. 23-25 are isolated, top plan views of additional exemplary attenuation strips, each in a flat configuration.
Figure 24:
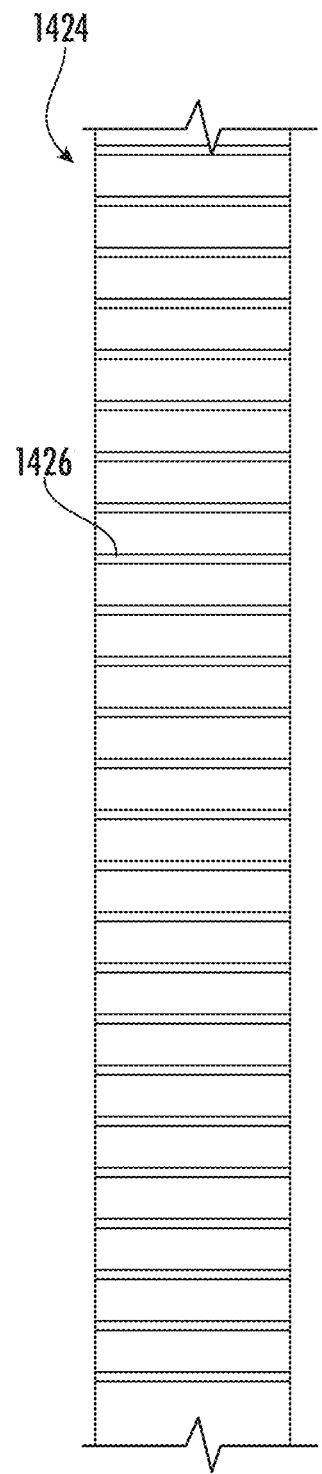
Figure 25:
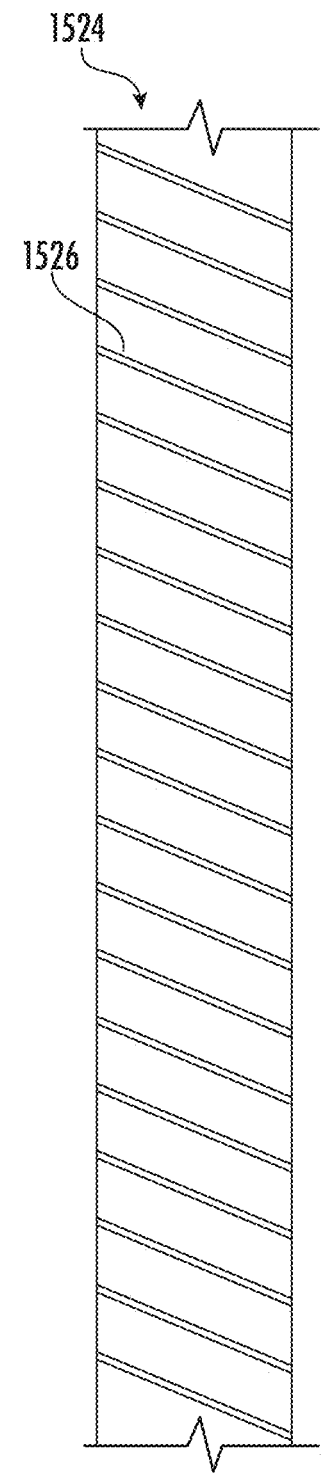

FIGS. 23-25 depict additional exemplary attenuation strips. Attenuation strips may be wound helically or convolutely around a core. As depicted in FIG. 23, an attenuation strip 1324 may have elongate protrusions 1326 oriented substantially parallel to the length of the attenuation strip. With the attenuation strip 1324 helically wound around a core, the elongate protrusions 1326 typically follow a helical path around the core. Alternatively, with the attenuation strip 1324 wound convolutely around the core, the elongate protrusions 1326 may follow a path substantially parallel to the longitudinal axis of the driveshaft damper.

As depicted in FIG. 24, an attenuation strip 1424 may have elongate protrusions 1426 oriented perpendicular to the length of the attenuation strip. The perpendicular elongate protrusions 1426 may be configured so that when helically wound around a core, various elongate protrusions (e.g., adjacent protrusions) substantially align with one another. In some embodiments (e.g., an attenuation strip placed with abutting lateral edges), substantially aligned elongate protrusions 1426 may combine to form a contact surface that appears to wind around the core (e.g., helically at a complementary angle), at least for a portion of the length of the driveshaft damper. Alternatively, the perpendicular elongate protrusions 1426 may be configured to be staggered from one another when helically wound around the core. In yet another embodiment, with a convolute configuration of the attenuation strip 1424, the elongate protrusions 1426 may form concentric rings around the perimeter of the core.

As depicted in FIG. 25, an attenuation strip 1524 may have elongate protrusions 1526 oriented at an oblique angle with respect to the length of the attenuation strip. The oblique angle may be selected to obtain a desired configuration with the attenuation strip wound around the core. For example, the oblique angle of the elongate protrusions 1526 may be configured so that when helically wound around a core, various elongate protrusions (e.g., adjacent protrusions) substantially align with one another. In some embodiments, opposite sides of an elongate protrusion 1526 may substantially align with one another. In some embodiments, different elongate protrusions 1526 may substantially align with one another, for example, forming a helical path that differs from the pitch angle θ of the attenuation strip (e.g., the complement of pitch angle θ). Alternatively, substantially aligned elongate protrusions 1526 may combine to form a contact surface that runs parallel to the longitudinal axis of the driveshaft damper, at least for a portion of the length of the driveshaft damper. In yet another embodiment, with the attenuation strip 1524 wound convolutely around the core, the elongate protrusions 1526 may form a helical path around the perimeter of the core. For example, a lateral edge of one elongate protrusion 1526 may substantially align with a corresponding lateral edge of another elongate protrusion 1526 to form a helical path from a convolutely wrapped attenuation strip.

In some embodiments, a driveshaft damper may be configured to include, in addition to one or more attenuation strips, a second damping material, such as foam, textile acoustic insulation (e.g., sound-absorbing textiles), or other damping material (e.g., a polymeric batting, such as polyester batting, a polymeric nonwoven, such as a tufted polyester nonwoven, or single-face corrugated paper) configured to engage or otherwise contact the inner surface of the driveshaft. The second damping material may be positioned between attenuation strips or between protrusions of attenuation strips. The NVH-reducing attenuation strips are typically secured to the exterior surface of the core or other substantially cylindrical structure (e.g., a substantially cylindrical substrate tube). The foam or other second damping material may be secured to one or both surfaces of the substantially cylindrical core (i.e., the interior surface and/or exterior surface).

Figure 26:
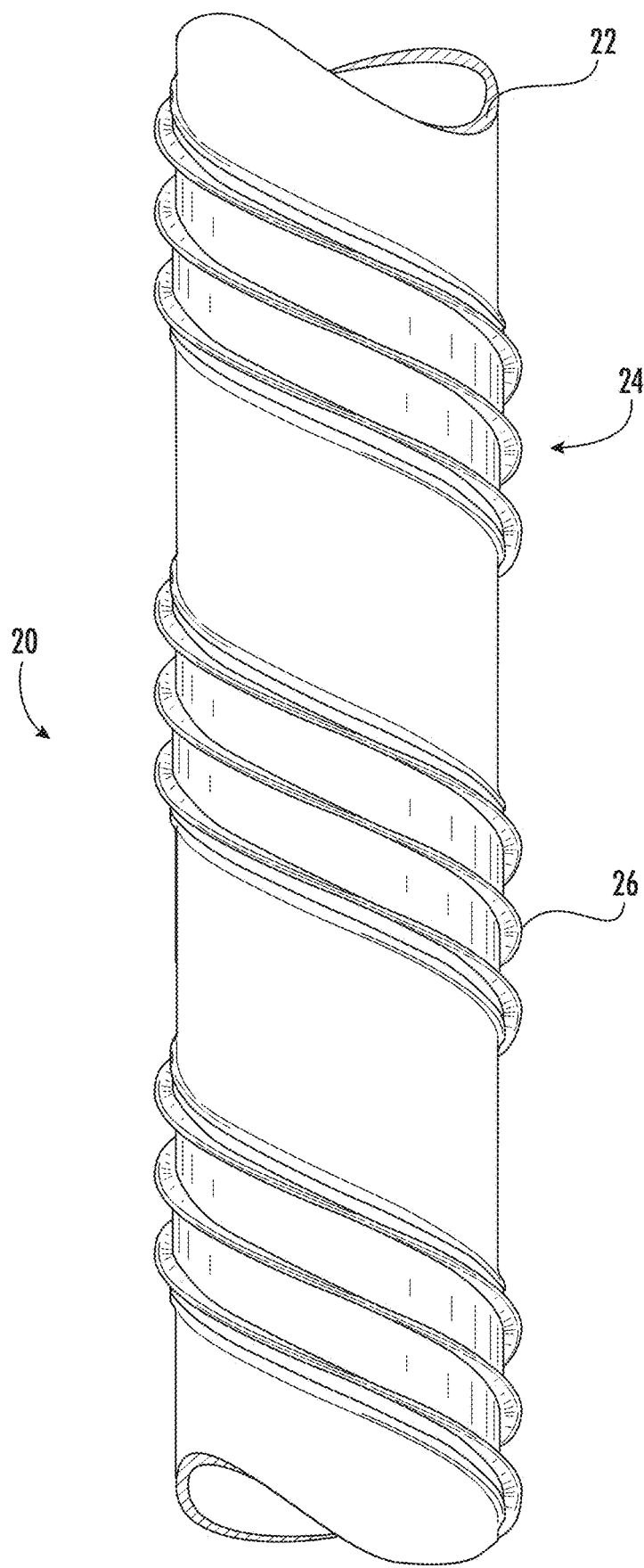
FIGS. 26 and 27 are isolated views of the exemplary driveshaft damper of FIG. 1, which includes a single-start "triple-ridge" attenuation strip.
Figure 27:
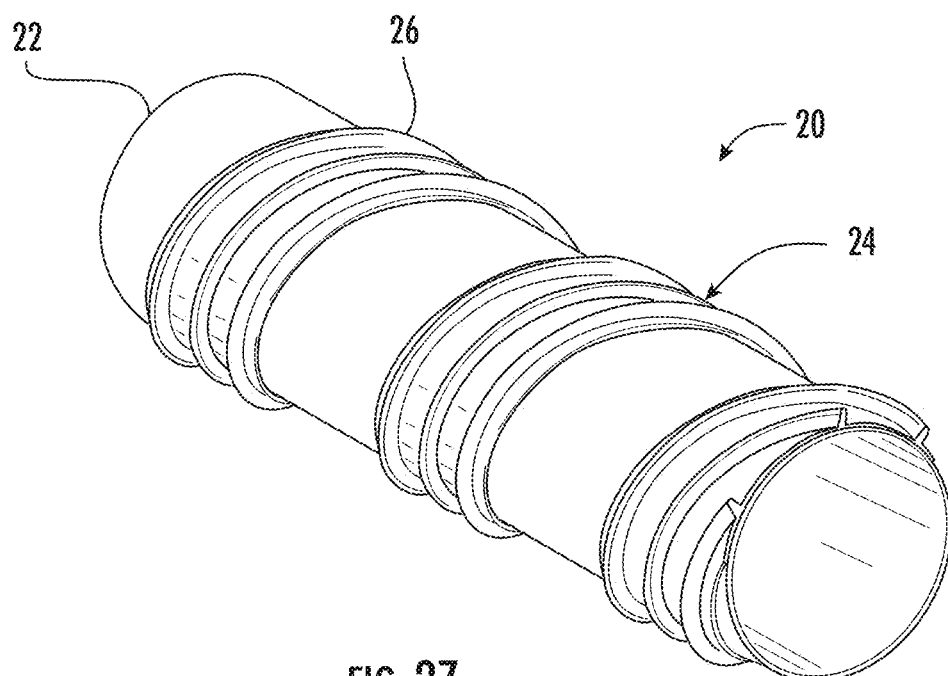
Figure 29:
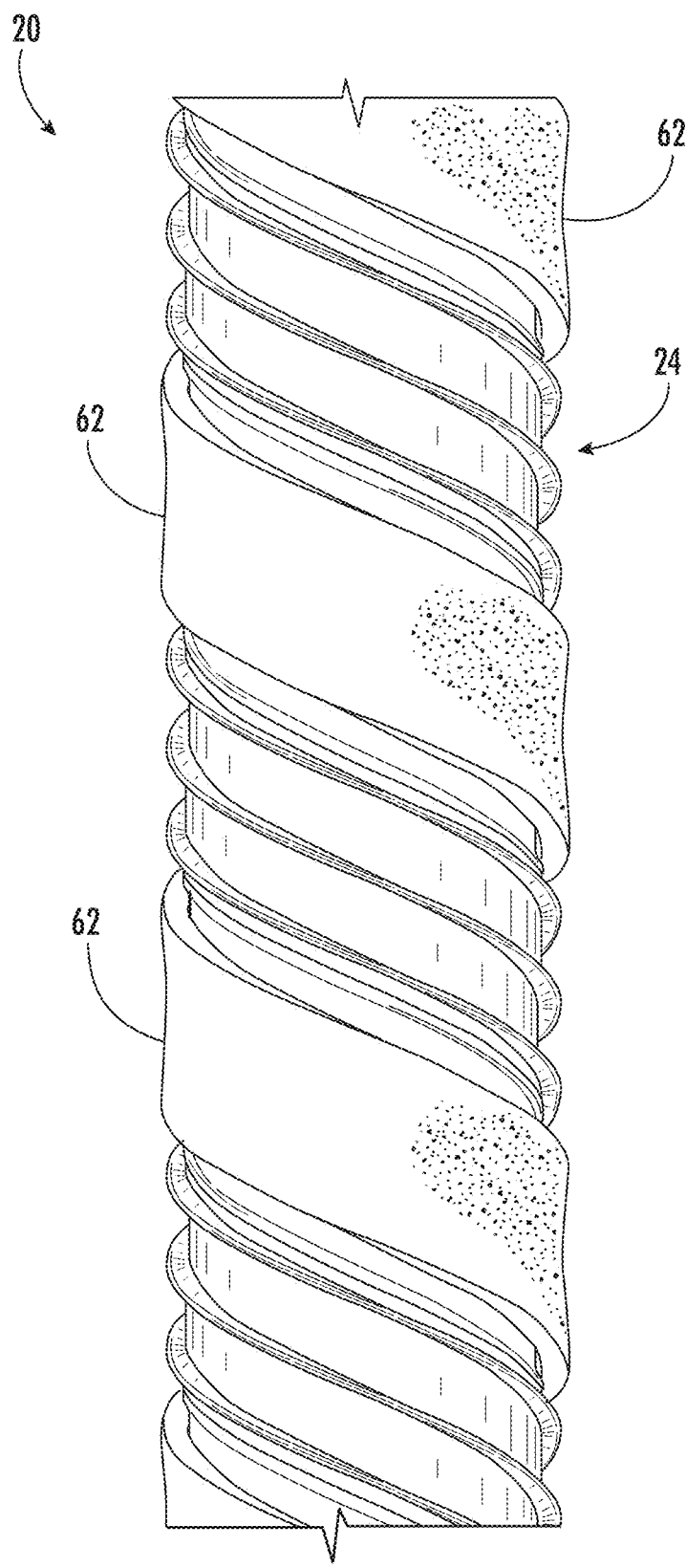
FIG. 29 depicts an exemplary driveshaft damper having a single-start "triple-ridge" attenuation strip with outer surficial foam.
Figure 30:
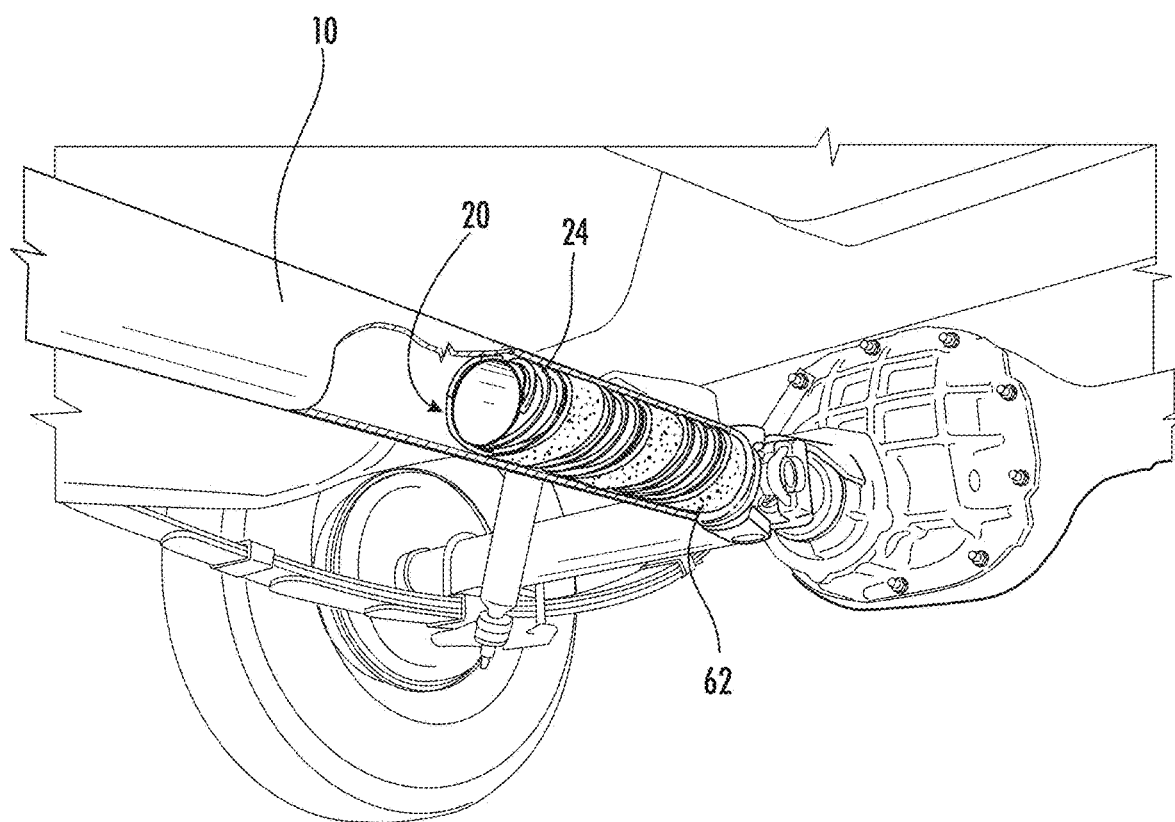
FIGS. 30 and 31 depict the damper of FIG. 29 installed in a driveshaft.
Figure 31:
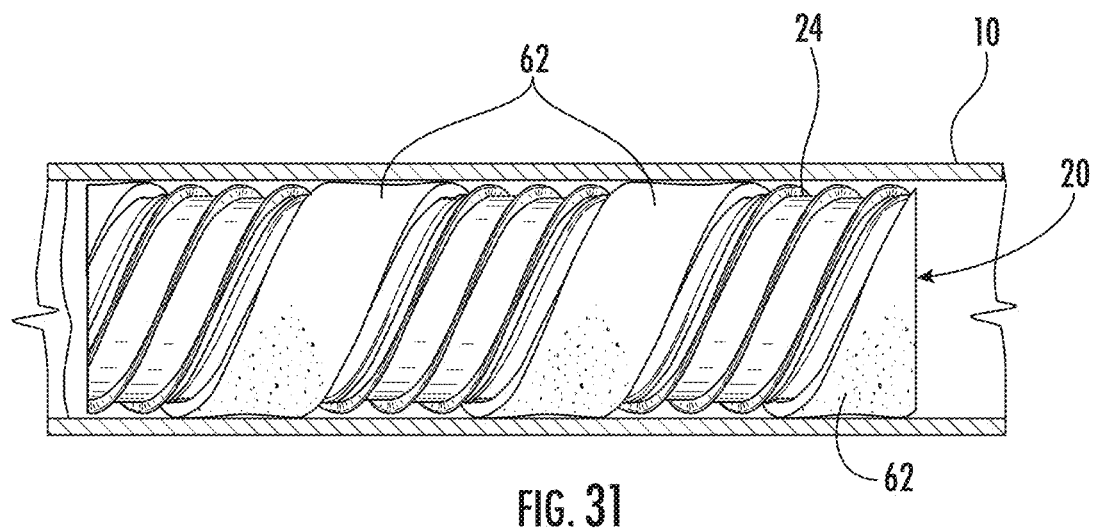

For example, foam may be adhesively bonded or otherwise secured in a helical strip to the outer surface of the substantially cylindrical core (e.g., a paperboard tube). Alternatively, foam can be extruded (e.g., as one or more beads) onto the outer surface of the substantially cylindrical core in areas not already covered by an attenuation strip or between protrusions of the attenuation strips. As an example of an embodiment with foam mounted to the outer surface of the core, FIG. 29 depicts a version of the driveshaft damper 20 (FIGS. 1, 9, 26, and 27) that further includes a helically configured strip of foam 62 (e.g., surficial foam, such as polyether foam) mounted (e.g., via adhesive material) to the outer surface of the core 22 (FIGS. 9, 26, and 27). FIGS. 30 and 31 depict the version of the driveshaft damper 20 including the foam strip 62 installed in a driveshaft 10.

Figure 32:
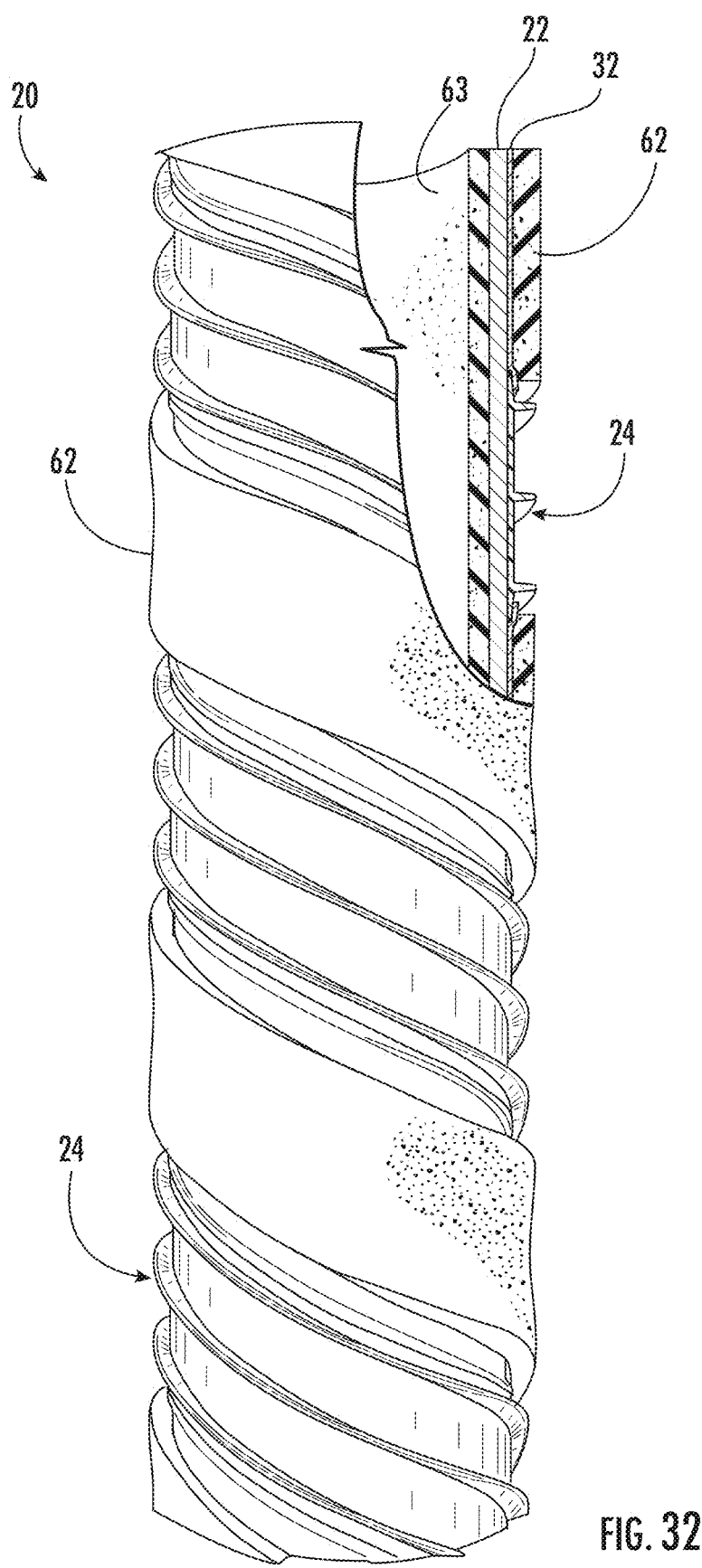
FIGS. 32 and 33 depict an exemplary driveshaft dampers with internal surficial foam.
Figure 33:
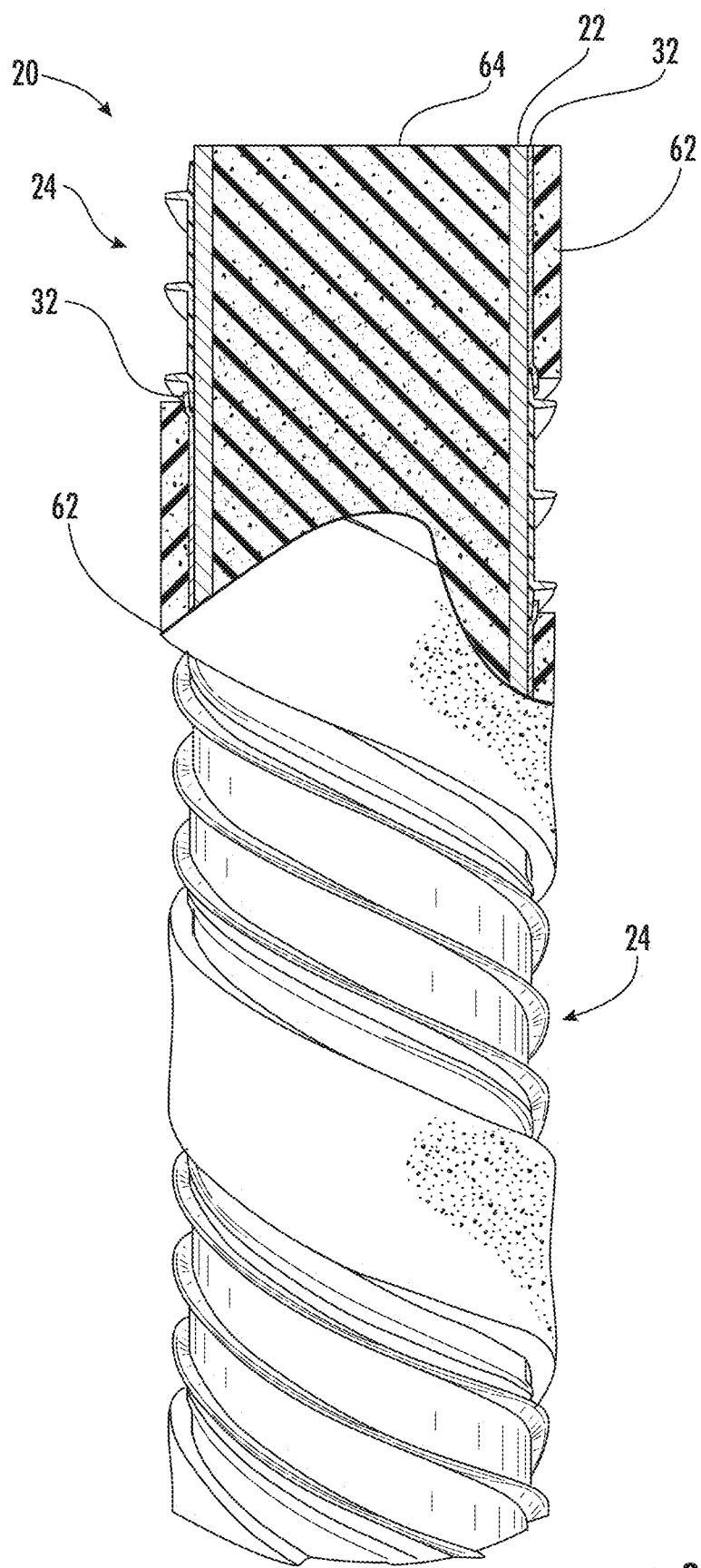

Moreover, it is within the scope of the present disclosure to adhesively bond or otherwise secure foam or other second damping material to the inner surface of the substantially cylindrical core, either with or without the presence of exterior, surficial foam or exterior, second damping material. In this regard, substantially the entire annular space formed by the core or other substantially cylindrical structure may be filled with foam or other second damping material. As an example of an embodiment with a second dampening material in the interior of the core, FIG. 32 depicts a version of the driveshaft damper 20 that includes a sheet or strip of foam 63 (e.g., surficial foam, such as polyether foam) mounted to the inner surface of the core 22. FIG. 33 depicts another version of the driveshaft damper 20 that includes a cylindrical plug of foam 64 (e.g., polyether foam) substantially filling the interior of the core 22. The versions of the driveshaft damper 20 depicted in FIGS. 32 and 33 may further include a helically configured hold-down ply 32 mounted (e.g., via adhesive material) to the outer surface of the core 22, and the helically configured strip of foam 62 (e.g., surficial foam, such as polyether foam) mounted (e.g., via adhesive material) to the outer surface of the core 22.

It is further within the scope of the present disclosure to tune the driveshaft damper to provide improved NVH reduction by reducing problematic NVH for a particular driveshaft as installed in a particular vehicle. For example, the second damping material's density, thickness, resilience, and durometer can be selected so as to dampen a particularly problematic resonance frequency (i.e., to provide a tuned driveshaft damper). Likewise, the attenuation strip's density, thickness, resilience, durometer, and length can be selected so as to dampen a particularly problematic resonance frequency. Similarly, the density, wall thickness, and length of the substantially cylindrical structure (e.g., a paperboard core or tube) can be selected so as to dampen a particularly problematic resonance frequency.

In this regard, the driveshaft damper may employ second damping material (e.g., foam) in a constant or variable thickness. For example, the thickness of the second damping material might be varied along the substantially cylindrical core (e.g., the foam thickness is not constant by applying foam strips or beads of differing thickness) in order to selectively dampen multiple (i.e., more than one) NVH-causing frequencies.

By way of non-limiting illustration, the second damping material (e.g., foam or textile acoustic insulation) and the substantially cylindrical core operate as a spring-mass system. Those having ordinary skill in the art will appreciate that a spring-mass system can be used to dampen vibration by moving the mass out of phase with the vibration source.

By way of further explanation, the second damping material may represent the spring, and the substantially cylindrical core (e.g., a paperboard core) may represent the mass in this spring-mass system. Because the density of the second damping material and the wall thickness of the substantially cylindrical core can be varied to dampen specific resonance frequencies, the driveshaft damper may serve as a tuned mass damper (e.g., an active mass damper or harmonic absorber).

Those having ordinary skill in the art will recognize that, in any of these configurations, the second damping material (e.g., foam or textile acoustic insulation) will bond or otherwise adhere to the substantially cylindrical core such that the second damping material will remain in place while the driveshaft damper is placed inside a propshaft (e.g., bonded to ensure durability during driveshaft manufacture and subsequent use).

Exemplary foam may be an elastomeric foam, such as polyurethane and/or polyether foam. For heat resistance, the foam may be formed of a foamed silicone that has high-temperature resistance. A suitable silicone for forming heat-resistant foam is Dow Corning's 3-8186 Thixotropic Foam. In this regard and as noted, this application incorporates entirely by reference commonly assigned U.S. Pat. No. 8,801,526 and commonly assigned U.S. Pat. No. 9,599,147.

Polyether foam (e.g., charcoal polyether foam) provides enhanced damping characteristics. Alternative foam materials (e.g., for forming an open-cell foam) include polyester foam, polyurethane foam, and silicone foam. With respect to the present composite driveshaft dampers enhanced with a second damping material, suitable foams (e.g., polyether foam) typically have (i) a density of between about 1.0 lb/ft$^3$ and 3.5 lbs/ft$^3$ (e.g., between about 1.05 lbs/ft$^3$ and 1.15 lbs/ft$^3$), typically at least about 1.5 lbs/ft$^3$ (e.g., between about 1.75 lbs/ft$^3$ and 3.0 lbs/ft$^3$), (ii) an indent-force deflection at 25 percent of between about 28 psi and 36 psi, (iii) a tensile strength of at least about 10 psi, (iv) a tear strength of at least about 1.0 psi, and (v) a minimum elongation of at least about 100 percent.

When installed on a substantially cylindrical core (e.g., a paper-tube core), the foam typically has a thickness of between about 0.1 inch and 2.0 inches (e.g., 0.25 inch to 0.5 inch). By way of illustration, a suitable cylindrical structure may be a paperboard tube having (i) a length of between about 8 inches and 52 inches (e.g., between about 8 inches and 16 inches), (ii) a paper density of between about 3.3 lbs/1000 ft$^2$ and 3.7 lbs/1000 ft$^2$, and (iii) a tube wall thickness of between about 0.04 inch and 0.25 inch (e.g., 0.1 inch to 0.2 inch).

Figure 34:
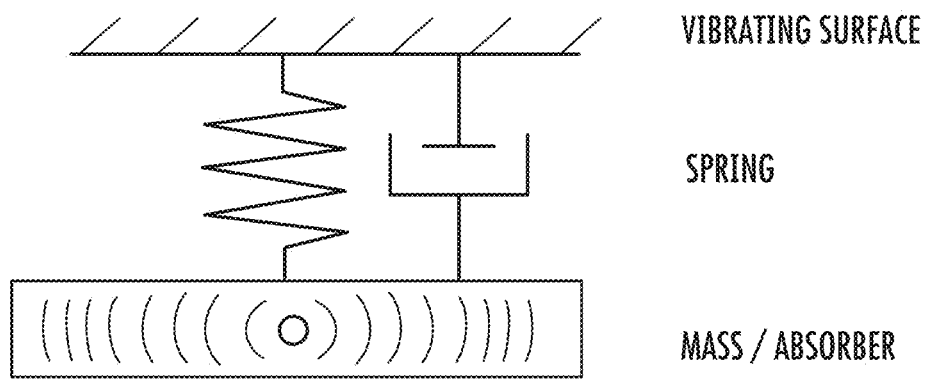
FIGS. 34-36 depict dampening mechanisms provided by exemplary driveshaft dampers.
Figure 35:
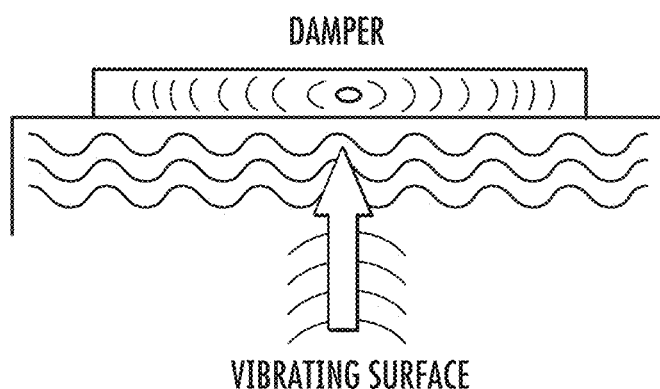
Figure 36:
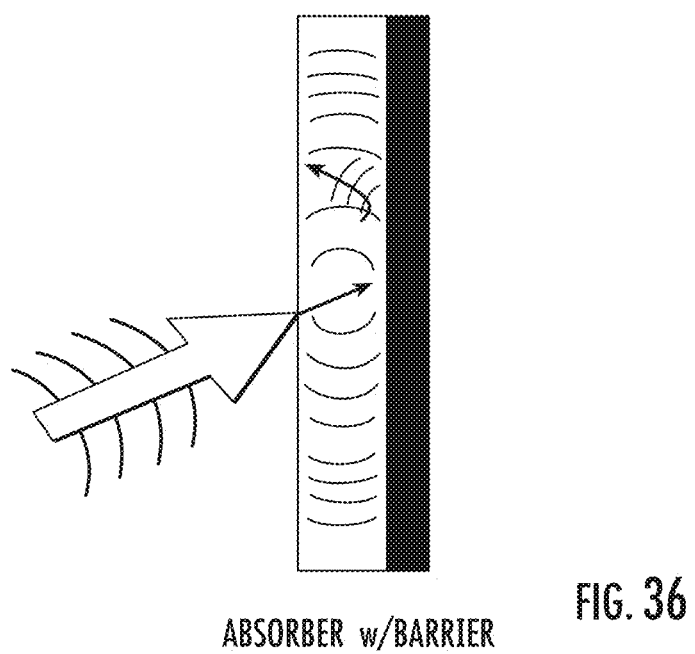

FIGS. 34-36 depict the damping mechanisms provided by an exemplary driveshaft damper having NVH-reducing materials covering one or more of its surfaces (e.g., the outer surface, or both the inner and outer surfaces). Exemplary driveshaft dampers according to the present disclosure are depicted in at least FIGS. 1-3, 5, 19, and 26-32. For example, the combination of surficial foam (e.g., polyether foam) and surficial non-foamed attenuation strip(s) (e.g., EPDM or silicone rubber retaining members) covering a cylindrical carrier structure (e.g., a paperboard tube) provides both active and passive dampening. See, e.g., FIGS. 29-33 (depicting exemplary driveshaft dampers having a single-start "triple-ridge" attenuation strip with surficial foam). As depicted in FIG. 34, the driveshaft damper provides a spring-mass system whose oscillations quickly decay (e.g., due to spring rate and/or hysteresis damping) after being deflected because of contact between a vibrating driveshaft and the driveshaft damper. Although the surface foam (e.g., interior and/or exterior foam) and non-foamed attenuation strip(s) (e.g., retaining members) transmit and absorb much of the vibrational energy, the cylindrical carrier structure also functions to transmit and absorb vibrational energy, as well as to provide mass for the spring-mass system. The main spring rates or spring-force constants of the spring-mass system are thought to be primarily a function of the configurations (e.g., compressive elasticity) of the elongate protrusions of the driveshaft damper's one or more attenuation strips. With respect to damper tuning, the configuration of the one or more attenuation strips (e.g., the compressive elasticity of the elongate protrusions) can be selected and/or adjusted to change the spring rates or force constants of the spring-mass system. As depicted in FIG. 35, vibrational energy transmitted into the driveshaft damper is converted into heat energy (e.g., due to the flexing of the damper materials). As depicted in FIG. 36, vibrations within the driveshaft damper are continuously reflected until converted into heat energy.

As noted, other damping materials may be used in addition to or in lieu of foam. For example, the exemplary driveshaft damper having a single-start "triple-ridge" attenuation strip with surficial foam as depicted in FIGS. 29-33 could be constructed using alternatives to foam, such as corrugated paper or paperboard, polymeric batting, or textiles having thicknesses between about $\frac{1}{16}$ inch and 2 inches. For example, an exemplary textile acoustic insulation (e.g., sound-absorbing textile) includes a nonwoven having rayon and polyester (e.g., polyethylene terephthalate), such as a 7-millimeter (0.275-inch) thick nonwoven having a basis weight of about 805 g/m$^2$. The polyester can be selected to function either as a low-temperature binder (e.g., having a melt temperature of about 110° C.) or, for heat-treatment applications such as swaging, a high-temperature binder (e.g., having a melt temperature of about 180° C.).

Other damping materials include fiberglass mats, carbon-fiber mats, and textile nonwovens (including rayon and polyester). Exemplary textile nonwovens may be needle-punched and thermally bonded. Damping materials also include felts, including polyester felts and wool felts (e.g., needle-punched felts or pressed felts). Exemplary felts might have basis weights between about 0.5 lb/yd$^2$ and 10 lbs/yd$^2$ (e.g., between about 1.3 g/m$^2$ and 26 g/m$^2$). Damping materials also include recycled yarns, knit fabrics, woven fabrics, and other high-loft textiles (e.g., cotton or shoddy). Exemplary nonwovens might have basis weights between about 0.5 oz/ft$^2$ and 100 oz/ft$^2$ (e.g., between about 1.3 g/m$^2$ and 260 g/m$^2$). Any of these damping materials can include binders to provide improved thermal properties in order to limit thermal degradation (e.g., loss of resilience or rebound).

Figure 37:
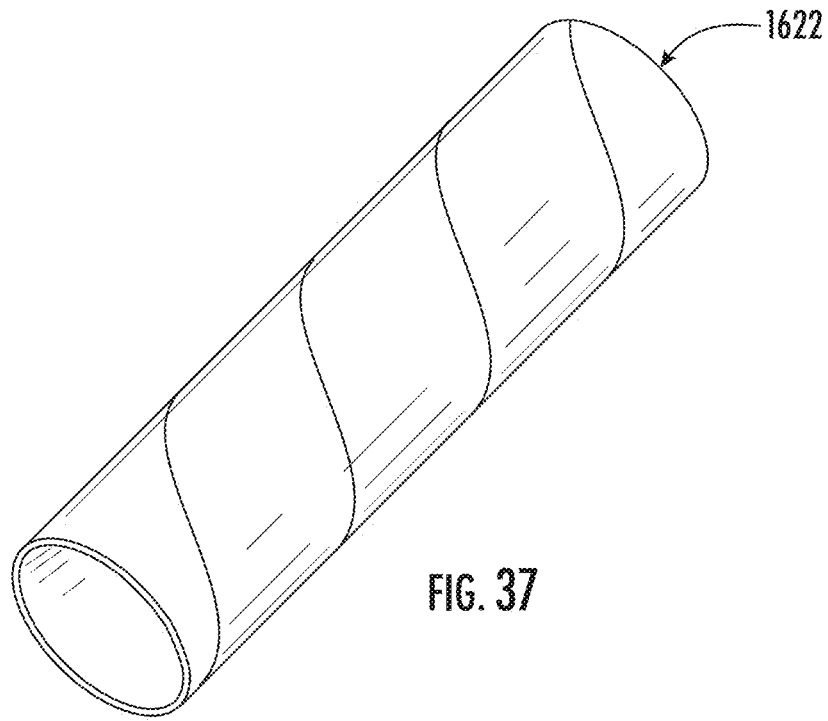
FIGS. 37-41 are isolated views of cores (e.g., paper or paperboard cores).
Figure 38:
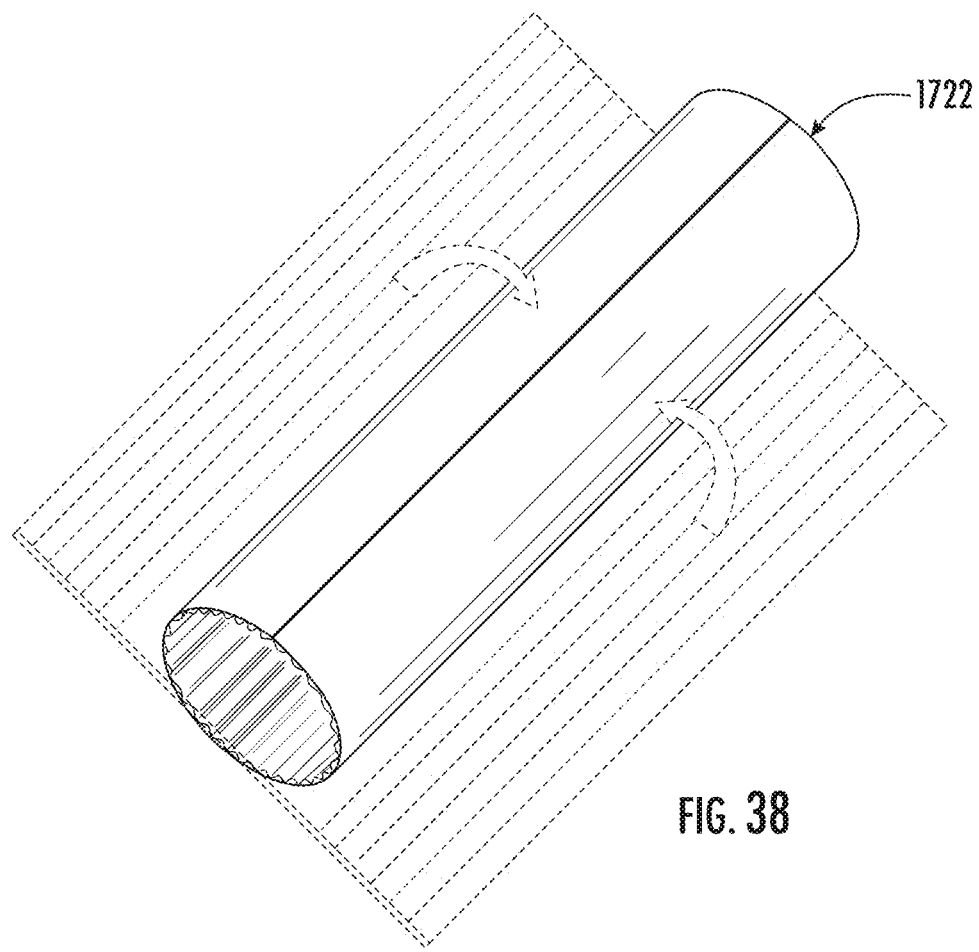
Figure 39:
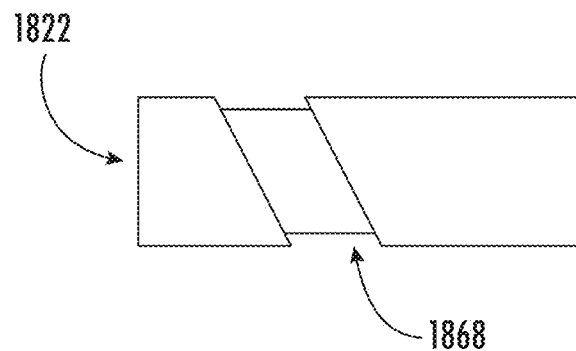
Figure 40:
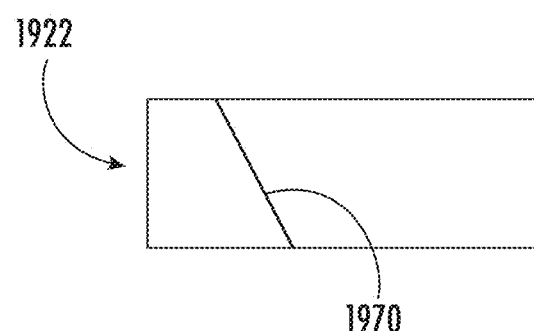
Figure 41:
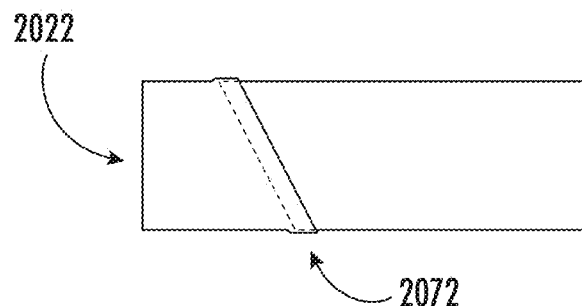

As noted, the present disclosure embraces helically-wound driveshaft dampers and convolute driveshaft dampers, whereby the core may be formed from multiple plies of core material (smooth and/or single-face corrugated paper) wound or wrapped around a mandrel in a helical or convolute manner. For example, FIG. 37 is an isolated view of a helical core 1622 formed from smooth paper. As another example, the solid lines in FIG. 38 depict a convolute core 1722 formed from single-face corrugated paperboard. The dashed lines in FIG. 38 schematically depict that the convolute core 1722 may be formed by wrapping the sheet of paperboard from which the convolute core 1722 may be formed. The cores may include any suitable joints. As schematic examples, FIG. 39 depicts a helical core 1822 with a seam gap joint 1868, FIG. 40 depicts a helical core 1922 with a butt joint 1970, and FIG. 41 depicts a helical core 2022 with an overlap joint 2072.

Figure 42:
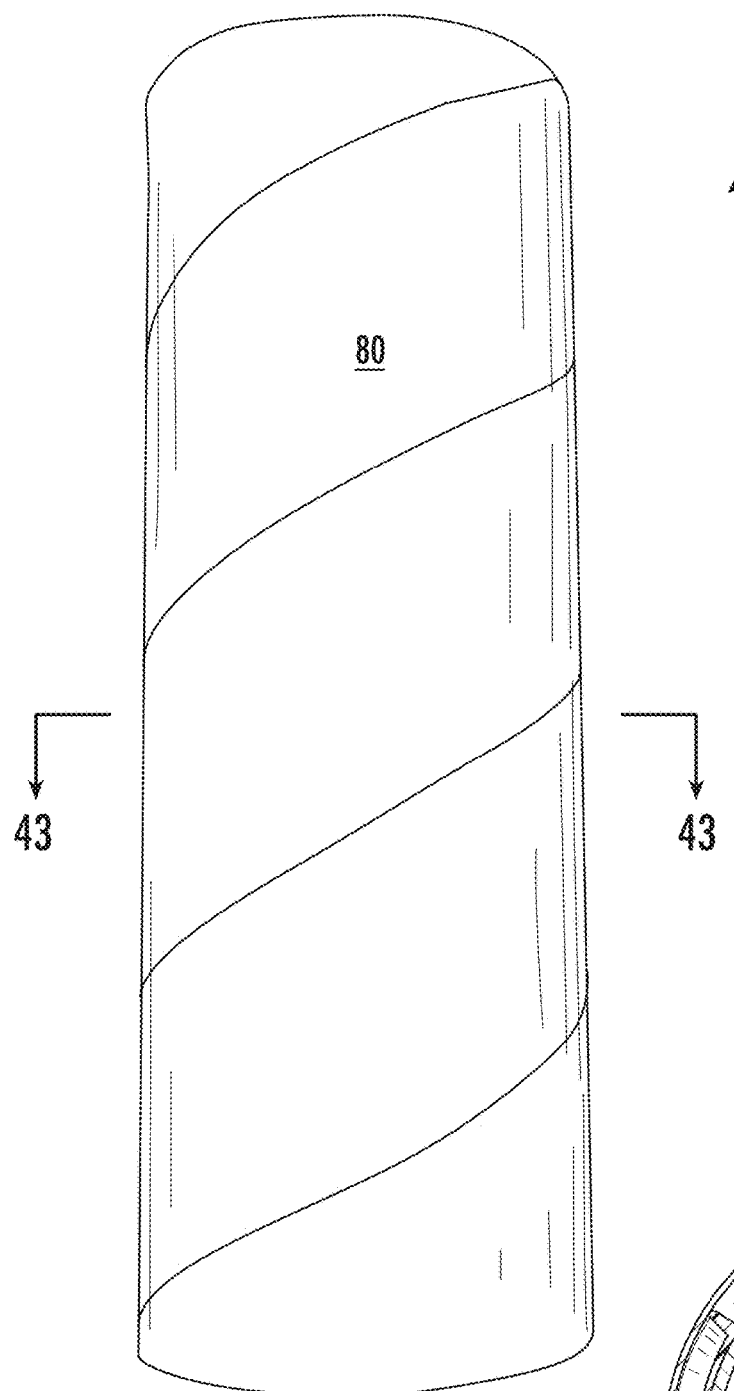
FIG. 42 depicts an exemplary driveshaft damper including an outer wrapping layer.
Figure 43:
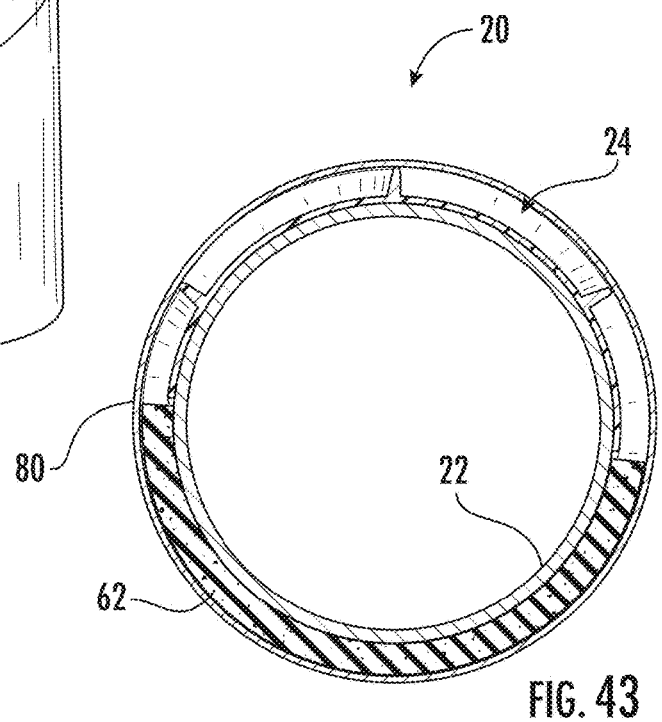
FIG. 43 is a cross-sectional view taken along line 43-43 of FIG. 42.

The foregoing embodiments of the driveshaft damper can optionally include one or more wrapping layers securely positioned atop the exterior attenuation strips and/or any exterior second damping material (e.g., foam or textile acoustic insulation). For example, the attenuation strips and any exterior second damping material are effectively sandwiched between the outer surface of the substantially cylindrical core and the wrapping layer(s). Such wrapping layer(s) may be spirally wound plies or convolute plies of fibrous material (e.g., paper or paperboard). Spirally wound plies may be configured to form seam gap joints, butt joints, and/or overlap joints. For example, FIGS. 42 and 43 depict a version of the driveshaft damper 20 that includes such an outer wrapping layer 80 and an optional strip of surficial foam 62. The wrapping layer(s) may include one or more moisture-resistant layers (e.g., parchment paper, or polymeric film or sheet). In an embodiment that excludes any exterior second damping material, the attenuation strip(s) are sandwiched between the outer surface of the substantially cylindrical core and the wrapping layer(s).

Working Examples (Driveshaft Dampers)

In the following Tables 2-7, the designation "SAS" refers to a driveshaft damper having a single-start attenuation strip and the designation "DAS" refers to a driveshaft damper having dual-start attenuation strips. The "EP" designation refers to the number of elongate protrusions on each attenuation strip.

Table 2 (below) provides exemplary technical specifications for prototype driveshaft dampers. For the sake of comparison, these exemplary driveshaft dampers are configured for a 30-inch aluminum driveshaft (e.g., a representative propshaft) having an outer diameter of 4.5 inches, a wall thickness of 0.83 inch, and an inner diameter of 4.334 inches (i.e., outer diameter less double the wall thickness).

TABLE 2

|  | SAS-1EP (4.625") | DAS-1EP (4.625") | SAS-3EP (4.625") | DAS-3EP (4.625") | SAS-3EP (6.0") |
|---|---|---|---|---|---|
| driveshaft |  |  |  |  |  |
| outer diameter (inch) | 4.5 | 4.5 | 4.5 | 4.5 | 4.5 |
| wall thickness (inch) | 0.083 | 0.083 | 0.083 | 0.083 | 0.083 |
| inner diameter (inch) | 4.334 | 4.334 | 4.334 | 4.334 | 4.334 |
| damper |  |  |  |  |  |
| outer diameter (inch) | 4.484 | 4.484 | 4.484 | 4.484 | 4.484 |
| length (inch) | 13.75 | 13.75 | 13.75 | 13.75 | 13.75 |
| interference fit (inch) | 0.15 | 0.15 | 0.15 | 0.15 | 0.15 |
| paper-tube core |  |  |  |  |  |
| outer diameter D (inch) | 4.03 | 4.03 | 4.03 | 4.03 | 4.03 |
| paper width w (inch) | 4.625 | 4.625 | 4.625 | 4.625 | 6.0 |
| winding angle $\theta_w$ (°) | 68.6 | 68.6 | 68.6 | 68.6 | 61.7 |
| paper pitch length $L_w$ (inch) | 4.97 | 4.97 | 4.97 | 4.97 | 6.81 |
| attenuation strips |  |  |  |  |  |
| rubber composition | silicone | silicone | silicone | silicone | silicone |
| protrusions per strip | 1 | 1 | 3 | 3 | 3 |
| number of strips | 1 | 2 | 1 | 2 | 1 |
| strip base width (inch) | 0.82 | 0.82 | 2.20 | 2.20 | 2.20 |
| BPR | 3.3 | 3.3 | 8.8 | 8.8 | 8.8 |
| PSR | — | — | 3.2 | 3.2 | 3.2 |
| pitch length L (inch) | 4.97 | 4.97 | 4.97 | 4.97 | 6.81 |
| effective pitch $L_e$ (inch) | 4.97 | 2.49 | 1.66 | 0.83 | 2.27 |
| effective pitch ratio ($P_e$) | 0.81 | 1.62 | 2.43 | 4.87 | 1.77 |
| pitch angle θ (°) | 68.6 | 68.6 | 68.6 | 68.6 | 61.7 |
| effective pitch angle $\theta_e$ (°) | 68.6 | 78.9 | 82.5 | 86.3 | 79.8 |

Figure 28:
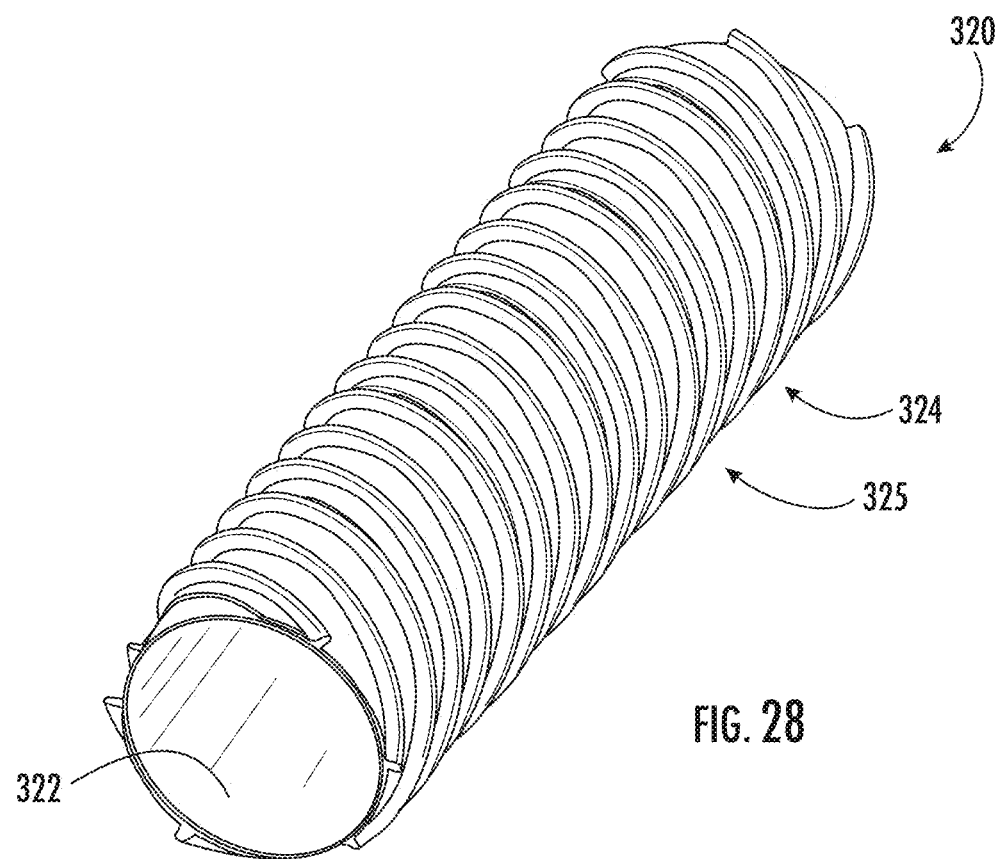
FIG. 28 depicts the exemplary driveshaft damper of FIG. 5, which includes dual-start "triple-ridge" attenuation strips.

Table 3 (below) provides exemplary technical specifications for prototype driveshaft dampers 20 depicted in FIGS. 1, 26, and 27 (single-start "triple-ridge" attenuation strip), prototype driveshaft dampers 320 depicted in FIGS. 5 and 28 (dual-start "triple-ridge" attenuation strips), and the prototype driveshaft dampers depicted FIGS. 29-31 (single-start "triple-ridge" attenuation strip with 0.25-inch surficial polyether foam). U.S. Patent Application No. 62/748,204 for Driveshaft Dampers and Systems and Methods for Making and Using the Same (filed Oct. 19, 2018), which is incorporated by reference in its entirety, includes as Appendix I photographs of the respective prototype driveshaft dampers illustrated in FIGS. 1, 5, and 26-31. For the sake of comparison, these exemplary driveshaft dampers are configured for a 30-inch aluminum driveshaft having an outer diameter of 4.5 inches, a wall thickness of 0.83 inch, and an inner diameter of 4.334 inches (i.e., outer diameter less double the wall thickness). Table 3 compares the technical specifications for prototype "thick-walled" driveshaft dampers formed using 4.625-inch paper and prototype "thin-walled" driveshaft dampers formed using 4.75-inch paper.

TABLE 3

|  | SAS-3EP (4.625") | SAS-3EP (4.75") | DAS-3EP (4.625") | DAS-3EP (4.75") |
|---|---|---|---|---|
| driveshaft |  |  |  |  |
| outer diameter (inch) | 4.5 | 4.5 | 4.5 | 4.5 |
| wall thickness (inch) | 0.083 | 0.083 | 0.083 | 0.083 |
| inner diameter (inch) | 4.334 | 4.334 | 4.334 | 4.334 |
| damper |  |  |  |  |
| outer diameter (inch) | 4.484 | 4.484 | 4.484 | 4.484 |
| length (inch) | 13.75 | 13.75 | 13.75 | 13.75 |
| interference fit (inch) | 0.15 | 0.15 | 0.15 | 0.15 |
| paper-tube core |  |  |  |  |
| outer diameter D (inch) | 4.03 | 4.03 | 4.03 | 4.03 |
| inner diameter (inch) | 3.61 | 3.83 | 3.61 | 3.83 |
| wall thickness (inch) | 0.21 | 0.10 | 0.21 | 0.1 |
| paper width w (inch) | 4.625 | 4.75 | 4.625 | 4.75 |
| winding angle $\theta_w$ (°) | 68.6 | 68.0 | 68.6 | 68.0 |
| paper pitch length $L_w$ (inch) | 4.97 | 5.12 | 4.97 | 5.12 |
| attenuation strips |  |  |  |  |
| rubber composition | EPDM or silicone | EPDM or silicone | EPDM or silicone | EPDM or silicone |
| protrusions per strip | 3 | 3 | 3 | 3 |
| number of strips | 1 | 1 | 2 | 2 |
| strip base width (inch) | 2.20 | 2.20 | 2.20 | 2.20 |
| BPR | 8.8 | 8.8 | 8.8 | 8.8 |
| PSR | 3.2 | 3.2 | 3.2 | 3.2 |
| pitch length L (inch) | 4.97 | 5.12 | 4.97 | 5.12 |
| effective pitch $L_e$ (inch) | 1.66 | 1.71 | 0.83 | 0.85 |
| effective pitch ratio ($P_e$) | 2.43 | 2.36 | 4.87 | 4.72 |
| pitch angle $\theta$ (°) | 68.6 | 68.0 | 68.6 | 68.0 |
| effective pitch angle $\theta_e$ (°) | 82.6 | 82.3 | 86.3 | 86.1 |

Table 4 (below) provides prophetic technical specifications for prototype driveshaft dampers. For the sake of comparison, these exemplary driveshaft dampers are configured for a driveshaft having an outer diameter of 4.5 inches, a wall thickness of 0.83 inch, and an inner diameter of 4.334 inches (i.e., outer diameter less double the wall thickness). The first two comparative examples (below), namely "SAS-1EP (0.828")" and "DAS-1EP (1.65")," cannot be manufactured on conventional helical-winding machines because the winding angle is too extreme using paper strips that are too narrow for the target diameter of the paper-tube core. The other exemplary driveshaft dampers vary the number and width of the attenuation strips (e.g., 2.2-inch attenuation strip and 4.4-inch attenuation strip).

TABLE 4

|  | SAS-1EP (0.828") | DAS-1EP (1.65") | SAS-6EP (4.625") | SAS-6EP* (4.625") | DAS-6EP (4.625") |
|---|---|---|---|---|---|
| damper |  |  |  |  |  |
| outer diameter (inch) | 4.484 | 4.484 | 4.484 | 4.484 | 4.484 |
| length (inch) | 13.75 | 13.75 | 13.75 | 13.75 | 13.75 |
| interference fit (inch) | 0.15 | 0.15 | 0.15 | 0.15 | 0.15 |

TABLE 4-continued

|  | SAS-1EP (0.828") | DAS-1EP (1.65") | SAS-6EP (4.625") | SAS-6EP* (4.625") | DAS-6EP (4.625") |
|---|---|---|---|---|---|
| paper-tube core |  |  |  |  |  |
| outer diameter D (inch) | 4.03 | 4.03 | 4.03 | 4.03 | 4.03 |
| paper width w (inch) | 0.828 | 1.65 | 4.625 | 4.625 | 4.625 |
| winding angle $\theta_w$ (°) | 86.3 | 82.5 | 68.6 | 68.6 | 68.6 |
| paper pitch length $L_w$ (inch) | 0.83 | 1.66 | 4.97 | 4.97 | 4.97 |
| attenuation strips |  |  |  |  |  |
| protrusions per strip | 1 | 1 | 6 | 6 | 6 |
| number of strips | 1 | 2 | 1 | 1 | 2 |
| strip base width (inch) | 0.82 | 0.82 | 2.2 | 4.4 | 2.2 |
| BPR | 3.3 | 3.3 | 8.8 | 17.6 | 8.8 |
| PSR | — | — | 1.3 | 3.0 | 1.3 |
| pitch length L (inch) | 0.83 | 1.66 | 4.97 | 4.97 | 4.97 |
| effective pitch $L_e$ (inch) | 0.83 | 0.83 | 0.83 | 0.83 | 0.41 |
| effective pitch ratio ($P_e$) | 4.86 | 4.84 | 4.87 | 4.87 | 9.73 |
| pitch angle θ (°) | 86.3 | 82.5 | 68.6 | 68.6 | 68.6 |
| effective pitch angle $\theta_e$ (°) | 86.3 | 86.2 | 86.3 | 86.3 | 88.1 |

Table 5 (below) provides additional prophetic technical specifications for prototype driveshaft dampers. For the sake of comparison, these exemplary driveshaft dampers are configured for a driveshaft having an outer diameter of 4.5 inches, a wall thickness of 0.83 inch, and an inner diameter of 4.334 inches (i.e., outer diameter less double the wall thickness).

TABLE 5

|  | SAS-4EP (4.625") | DAS-4EP (4.625") | SAS-5EP (4.625") | DAS-5EP (4.625") | SAS-16EP (4.625") |
|---|---|---|---|---|---|
| damper |  |  |  |  |  |
| outer diameter (inch) | 4.484 | 4.484 | 4.484 | 4.484 | 4.484 |
| length (inch) | 13.75 | 13.75 | 13.75 | 13.75 | 13.75 |
| interference fit (inch) | 0.15 | 0.15 | 0.15 | 0.15 | 0.15 |
| paper-tube core |  |  |  |  |  |
| outer diameter D (inch) | 4.03 | 4.03 | 4.03 | 4.03 | 4.03 |
| paper width w (inch) | 4.625 | 4.625 | 4.625 | 4.625 | 4.625 |
| winding angle $\theta_w$ (°) | 68.6 | 68.6 | 68.6 | 68.6 | 68.6 |
| paper pitch length $L_w$ (inch) | 4.97 | 4.97 | 4.97 | 4.97 | 4.97 |
| attenuation strips |  |  |  |  |  |
| protrusions per strip | 4 | 4 | 5 | 5 | 16 |
| number of strips | 1 | 2 | 1 | 2 | 1 |
| strip base width (inch) | 2.2 | 2.2 | 2.2 | 2.2 | 4.0 |
| BPR | 8.8 | 8.8 | 8.8 | 8.8 | 16 |
| PSR | 2.1 | 2.1 | 1.6 | 1.6 | 0.91 |
| pitch length L (inch) | 4.97 | 4.97 | 4.97 | 4.97 | 4.97 |
| effective pitch $L_e$ (inch) | 1.24 | 0.62 | 0.99 | 0.50 | 0.31 |
| effective pitch ratio ($P_e$) | 3.24 | 6.49 | 4.06 | 8.11 | 13.0 |
| pitch angle θ (°) | 68.6 | 68.6 | 68.6 | 68.6 | 68.6 |
| effective pitch angle $\theta_e$ (°) | 84.4 | 87.2 | 85.5 | 87.8 | 88.6 |

Table 6 (below) provides exemplary technical specifications for prototype driveshaft dampers having "double-ridge" attenuation strips (i.e., "single-start" or "dual-start" embodiments). The "double-ridge" attenuation strips measured about 1 5/16-inch wide with the elongate protrusions spaced 0.8 inch from one another. The prototype driveshaft dampers include light-wall paperboard cores constructed using 4.625-inch paper strips, 6-inch paper strips, or 4-inch paper strips ("DAS-2EP-4.0" is a prophetic example.) These exemplary driveshaft dampers are configured for a 30-inch aluminum driveshaft (e.g., a representative propshaft) having an outer diameter of 4.5 inches, a wall thickness of 0.83 inch, and an inner diameter of 4.334 inches (i.e., outer diameter less double the wall thickness).

TABLE 6

| | SAS-2EP (4.625") | DAS-2EP (4.625") | SAS-2EP (6.0") | DAS-2EP (6.0") | SAS-2EP (4.0") | DAS-2EP (4.0") |
|---|---|---|---|---|---|---|
| driveshaft | | | | | | |
| outer diameter (inch) | 4.5 | 4.5 | 4.5 | 4.5 | 4.5 | 4.5 |
| wall thickness (inch) | 0.083 | 0.083 | 0.083 | 0.083 | 0.083 | 0.083 |
| inner diameter (inch) | 4.334 | 4.334 | 4.334 | 4.334 | 4.334 | 4.334 |
| damper | | | | | | |
| outer diameter (inch) | 4.484 | 4.484 | 4.484 | 4.484 | 4.484 | 4.484 |
| length (inch) | 13.75 | 13.75 | 13.75 | 13.75 | 13.75 | 13.75 |
| interference fit (inch) | 0.15 | 0.15 | 0.15 | 0.15 | 0.15 | 0.15 |
| damper weight (lb) | 0.594 | 0.746 | 0.556 | 0.670 | 0.614 | 0.786 |
| paper-tube core | | | | | | |
| outer diameter D (inch) | 4.03 | 4.03 | 4.03 | 4.03 | 4.03 | 4.03 |
| paper width w (inch) | 4.625 | 4.625 | 6.0 | 6.0 | 4.0 | 4.0 |
| winding angle $\theta_w$ (°) | 68.6 | 68.6 | 61.7 | 61.7 | 71.6 | 71.6 |
| paper pitch length $L_w$ (inch) | 4.97 | 4.97 | 6.81 | 6.81 | 4.22 | 4.22 |
| core weight (lb) | 0.442 | 0.442 | 0.442 | 0.442 | 0.442 | 0.442 |
| attenuation strips | | | | | | |
| rubber composition | EPDM | EPDM | EPDM | EPDM | EPDM | EPDM |
| protrusions per strip | 2 | 2 | 2 | 2 | 2 | 2 |
| number of strips | 1 | 2 | 1 | 2 | 1 | 2 |
| strip base width (inch) | 1.31 | 1.31 | 1.31 | 1.31 | 1.31 | 1.31 |
| strip weight (lb) | 0.152 | 0.304 | 0.114 | 0.228 | 0.172 | 0.344 |
| BPR | 5.25 | 5.25 | 5.25 | 5.25 | 5.25 | 5.25 |
| PSR | 3.2 | 3.2 | 3.2 | 3.2 | 3.2 | 3.2 |
| pitch length L (inch) | 4.97 | 4.97 | 6.81 | 6.81 | 4.22 | 4.22 |
| effective pitch $L_e$ (inch) | 2.49 | 1.24 | 3.41 | 1.70 | 2.11 | 1.06 |
| effective pitch ratio ($P_e$) | 1.62 | 3.24 | 1.18 | 2.37 | 1.91 | 3.82 |
| pitch angle θ (°) | 68.6 | 68.6 | 61.7 | 61.7 | 71.6 | 71.6 |
| effective pitch angle $\theta_e$ (°) | 78.9 | 84.4 | 74.9 | 82.3 | 80.6 | 85.2 |

Table 7 (below) provides exemplary technical specifications for prototype driveshaft dampers formed using 4 5/16-inch paper as the outer ply. For the sake of comparison, these exemplary driveshaft dampers are configured for a 30-inch steel driveshaft (e.g., a representative propshaft) having an outer diameter of 3.15 inches, a wall thickness of 0.062 inch, and an inner diameter of 3.026 inches (i.e., outer diameter less double the wall thickness).

TABLE 7

| | SAS-3EP (4.3125") | DAS-3EP (4.3125") |
|---|---|---|
| driveshaft | | |
| outer diameter (inch) | 3.15 | 3.15 |
| wall thickness (inch) | 0.062 | 0.062 |
| inner diameter (inch) | 3.026 | 3.026 |
| damper | | |
| outer diameter (inch) | 3.175 | 3.175 |
| length (inch) | 9.75 | 9.75 |
| interference fit (inch) | 0.15 | 0.15 |
| paper-tube core | | |
| outer diameter D (inch) | 2.701 | 2.701 |
| paper width w (inch) | 4.3125 | 4.3125 |
| winding angle $\theta_w$ (°) | 59.5 | 59.5 |
| paper pitch length $L_w$ (inch) | 5.01 | 5.01 |
| attenuation strips | | |
| rubber composition | silicone | EPDM |
| protrusions per strip | 3 | 3 |
| number of strips | 1 | 2 |
| strip base width (inch) | 2.20 | 2.20 |
| BPR | 8.8 | 8.8 |
| PSR | 3.2 | 3.2 |
| pitch length L (inch) | 5.01 | 5.01 |
| effective pitch $L_e$ (inch) | 1.67 | 0.83 |

TABLE 7-continued

| | SAS-3EP (4.3125") | DAS-3EP (4.3125") |
|---|---|---|
| effective pitch ratio ($P_e$) | 1.62 | 3.24 |
| pitch angle θ (°) | 59.5 | 59.5 |
| effective pitch angle $\theta_e$ (°) | 78.9 | 84.4 |

Bench Testing

Bench testing measured frequency response function (FRY) for exemplary dampened driveshafts. For each of the following bench tests, frequency response function (FRF) was measured at the midpoint of the freely positioned aluminum propshaft (FIGS. 44-61) or steel propshaft (FIGS. 62-66). For example, a damper is positioned approximately in the center of the aluminum propshaft tube to provide a tube-damper test assembly. The tube-damper test assembly is suspended in a free-free state (i.e., no external forces are damping the assembly). FRY testing is performed using a data acquisition system (i.e., sound-analysis equipment including a hammer and an accelerometer). The accelerometer is longitudinally positioned at the midpoint of the propshaft tube, and the excitation point (i.e., the testing device's strike point) is approximately 180 degrees from the accelerometer at the same longitudinal midpoint.

In accordance with the present disclosure, the length and interference fit of the driveshaft damper may be chosen to modify the damping characteristics of the driveshaft damper (e.g., to reduce or shift resonance frequencies) as installed in a particular propshaft. Similarly, the composition or durometer of the elastomeric material that forms an attenuation strip or the wall thickness and outside diameter of the paper-tube core may be chosen to modify the damping characteristics of the driveshaft damper (e.g., to reduce or shift resonance frequencies) as installed in a particular propshaft.

Figure 44:
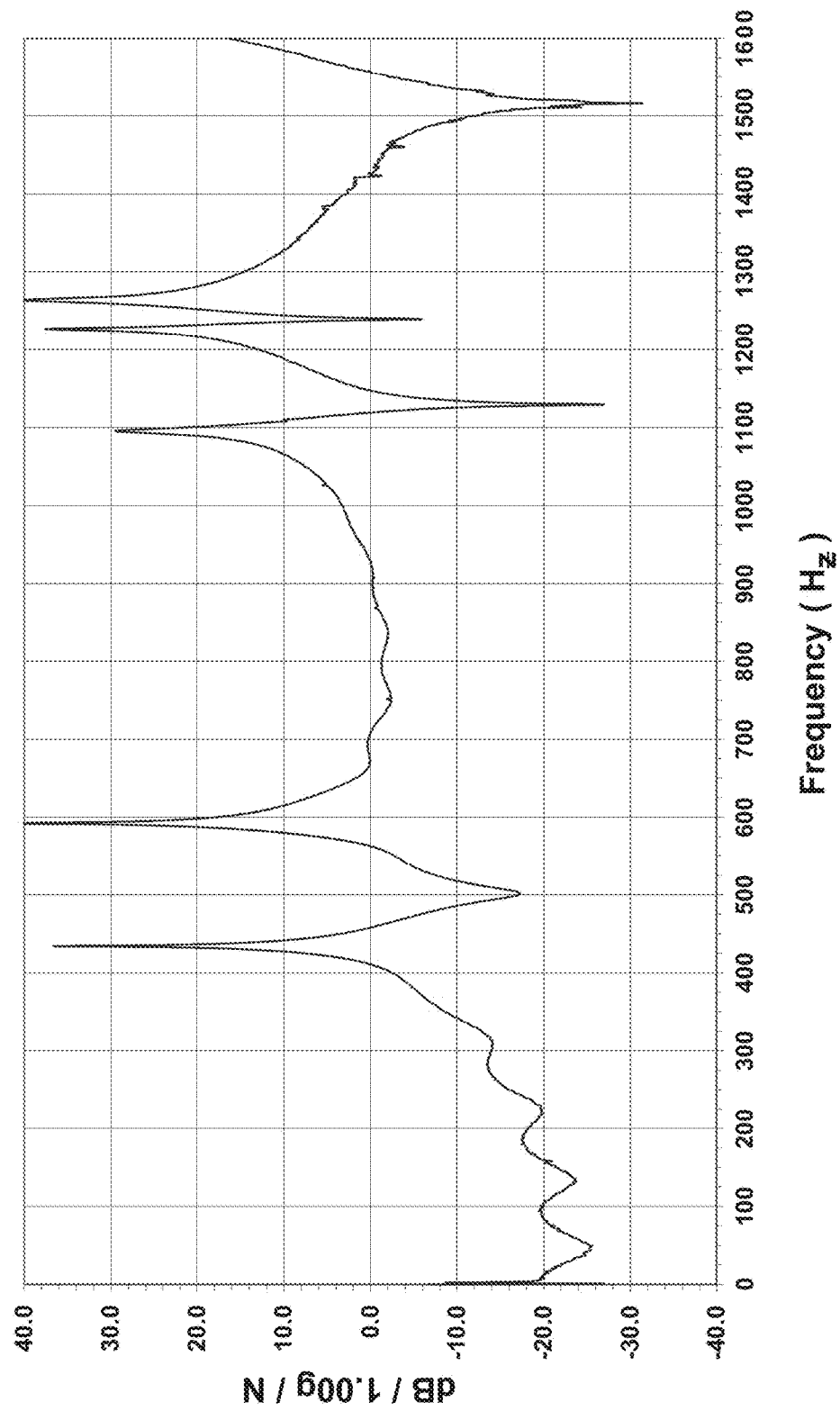
FIG. 44 depicts a frequency-response plot for an empty aluminum propshaft tube.

FIG. 44—Empty Aluminum Propshaft Tube

As a baseline, frequency response was established for an empty, 30-inch aluminum propshaft tube having an outer diameter of 4.5 inches, a wall thickness of 0.083 inch, and an inner diameter of 4.334 inches (i.e., outer diameter less double the wall thickness). This representative propshaft, which is described in the working examples of Tables 2-6 (above), is the aluminum propshaft used in each of the following bench tests for frequency response function (FRF). FIG. 44 demonstrates the empty aluminum tube has natural resonance frequencies at 434 Hz (36.6 dB), 592 Hz (43.5 dB), and 1096 Hz (29.4 dB). NVH frequencies between about 390 and 410 Hz (e.g., about 400 Hz) and particularly between about 600 Hz and 625 Hz are especially problematic in the automotive industry.

Figure 45:
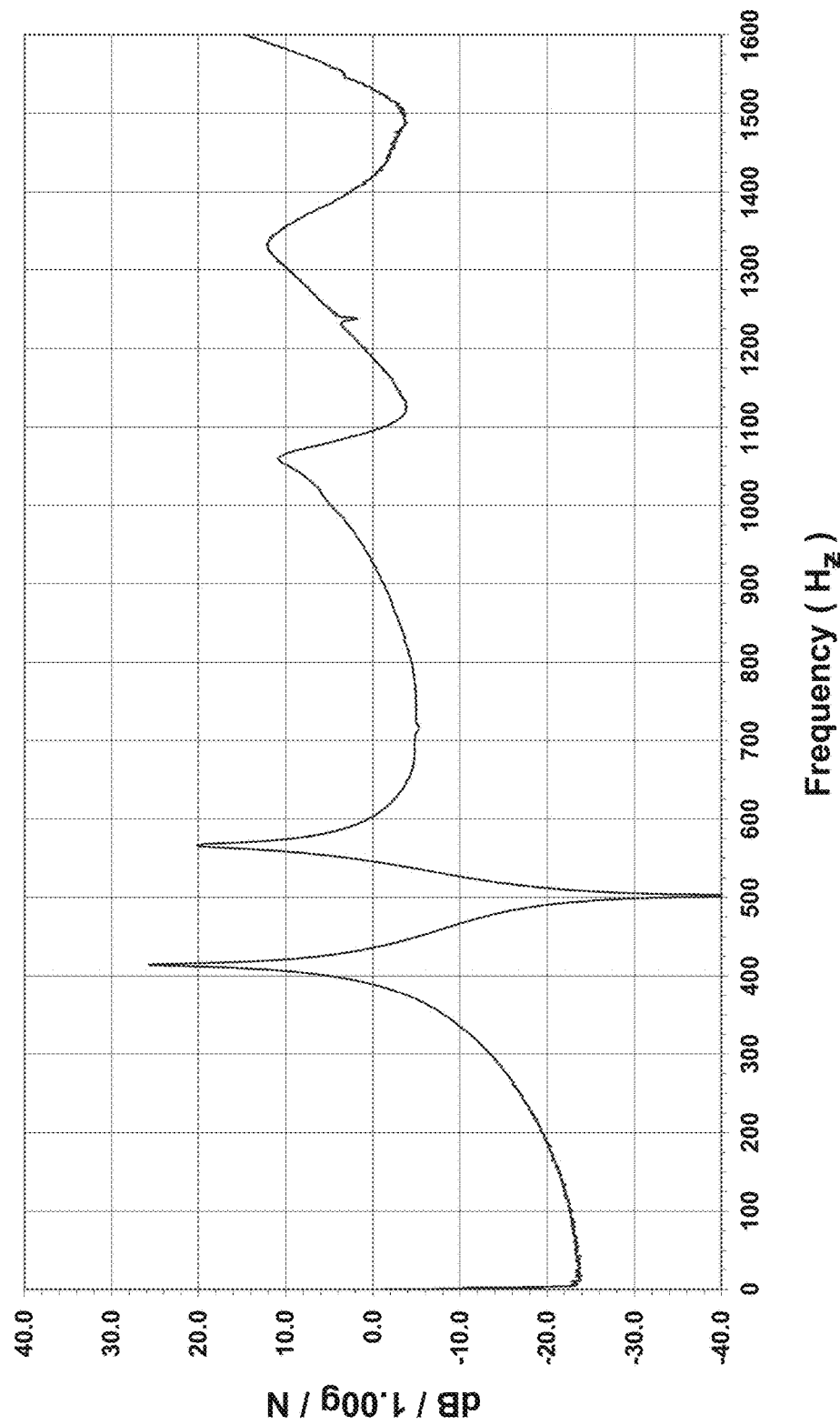
FIG. 45 is a frequency-response plot for a comparative driveshaft damper.

FIG. 45—Comparative Driveshaft Damper

FIG. 45 depicts the frequency response function (FRF) for the 30-inch aluminum propshaft tube dampened with a centrally positioned, 14-inch paperboard driveshaft damper having one EPDM rubber attenuation strip with a single protrusion (i.e., SAS-1EP). The driveshaft damper's outer diameter of 4.424 inches provides an interference fit of 0.09 inch. FIG. 45 demonstrates the dampened driveshaft has peak resonance frequencies at 414 Hz (25.7 dB), 566 Hz (20.1 dB), and 1060 Hz (10.8 dB). FIG. 45 shows this kind of driveshaft damper effectively dampens NVH.

Figure 46:
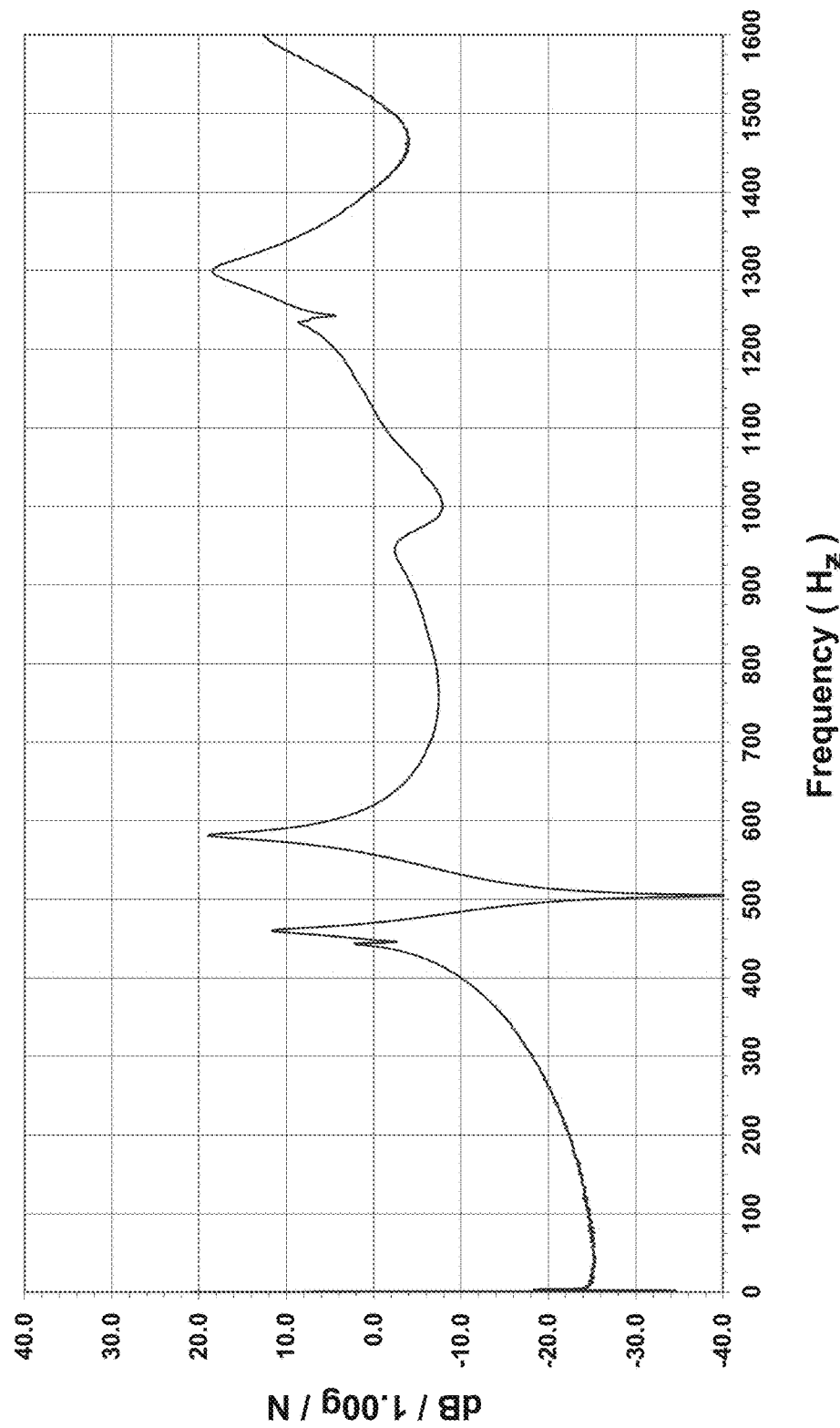
FIGS. 46-47 are frequency-response plots for exemplary driveshaft dampers having dual-start "triple-ridge" attenuation strips.

FIG. 46—Dual-Start "Triple-Ridge" Driveshaft Damper

FIG. 46 depicts the frequency response function (FRF) for the 30-inch aluminum propshaft tube dampened with a centrally positioned, 13.75-inch paperboard driveshaft damper having two EPDM rubber attenuation strips with three spaced protrusions (i.e., DAS-3EP). The driveshaft damper's outer diameter of 4.54 inches provides an interference fit of 0.206 inch. FIG. 46 demonstrates the dampened driveshaft has peak resonance frequencies at 460 Hz (11.6 dB) and 581 Hz (19.0 dB). FIG. 46 shows this kind of exemplary driveshaft damper effectively dampens NVH, reducing the NVH levels from the comparative driveshaft damper depicted FIG. 45.

Figure 47:
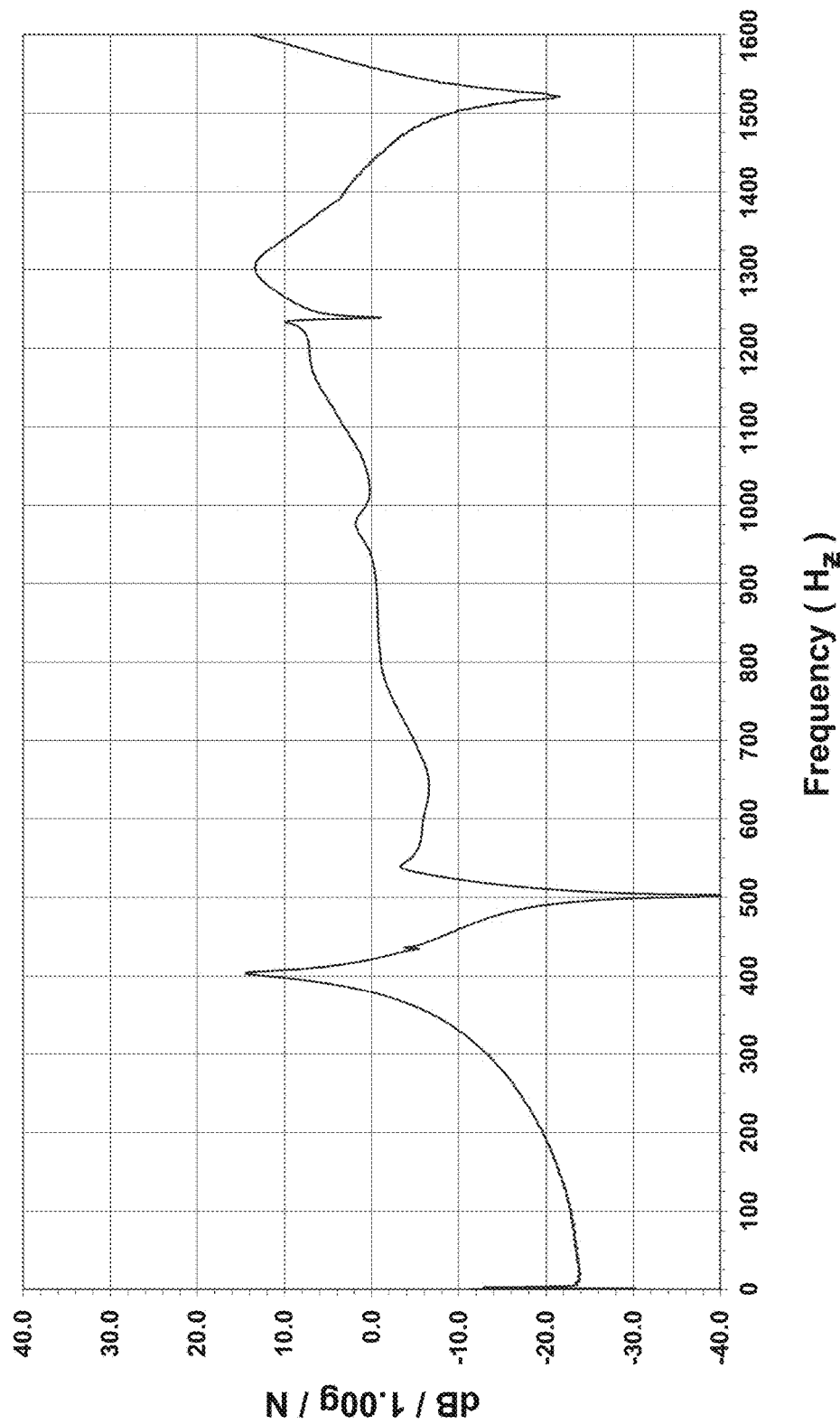

FIG. 47—Dual-Start "Triple-Ridge" Driveshaft Damper

FIG. 47 depicts the frequency response function (FRF) for the 30-inch aluminum propshaft tube dampened with a centrally positioned, 8.25-inch paperboard driveshaft damper having two EPDM rubber attenuation strips with three spaced protrusions (i.e., DAS-3EP). As compared with the similar "heavy-wall" driveshaft damper depicted FIG. 46, this "light-wall" paper core has a thickness of about 0.10 inch (i.e., 0.10 inch vs. 0.225 inch). The driveshaft damper's outer diameter of 4.54 inches provides an interference fit of 0.206 inch. FIG. 47 demonstrates the dampened driveshaft has peak resonance frequencies at 403 Hz (14.5 dB) and 975 Hz (1.9 dB). FIG. 47 shows this kind of exemplary driveshaft damper effectively dampens NVH and is especially effective at eliminating NVH around 600 dB and indeed through the frequency range between about 430 Hz and 900 Hz.

Figure 48:
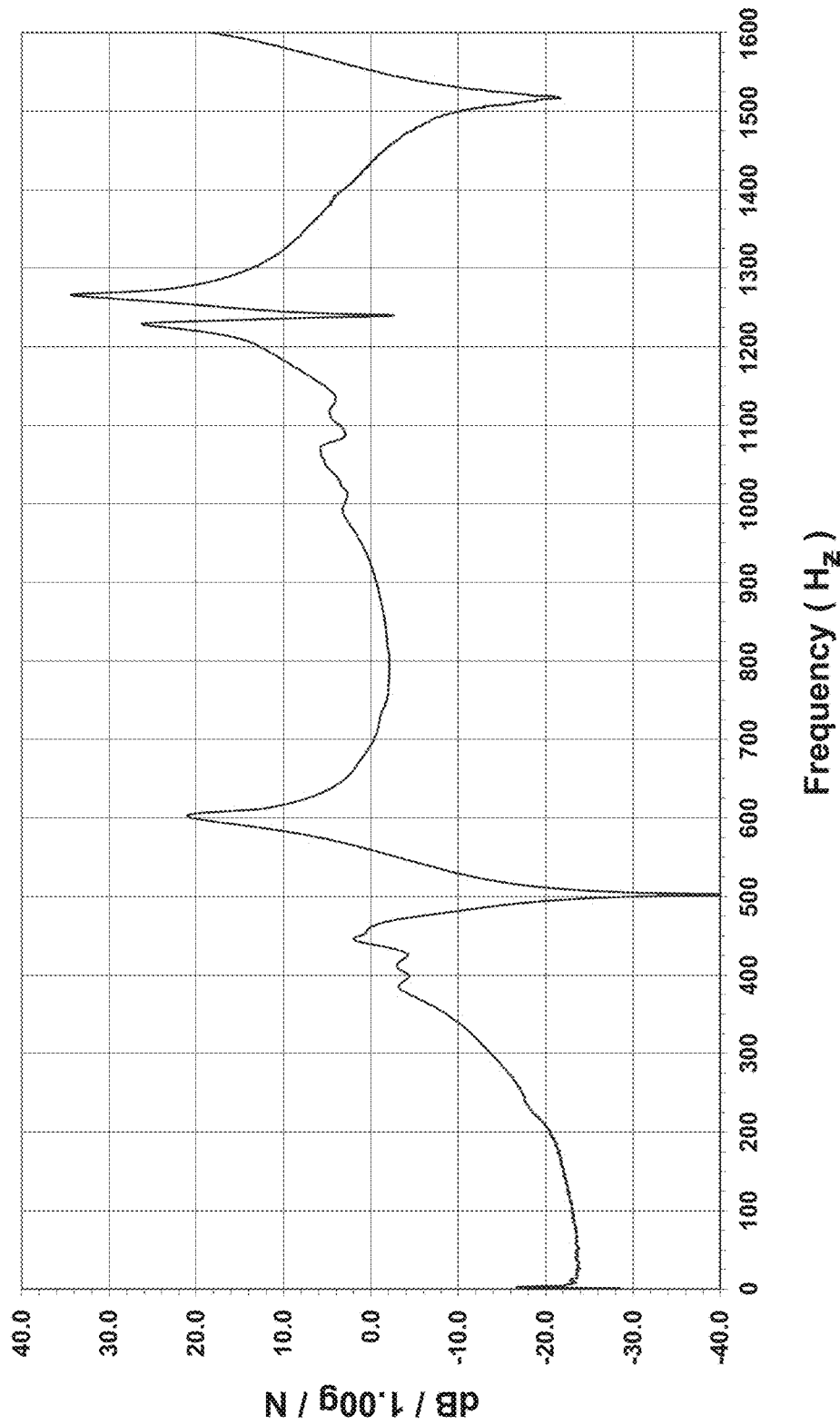
FIGS. 48-49 depict frequency-response plots for comparative driveshaft dampers.

FIG. 48—Comparative "SAS-1EP" Driveshaft Damper

FIG. 48 depicts the frequency response function (FRF) for the 30-inch aluminum propshaft tube dampened with a centrally positioned, 13.75-inch paperboard driveshaft damper having one 50-durometer silicone rubber attenuation strip with a single protrusion (i.e., SAS-1EP). The technical specifications for this "SAS-1EP" driveshaft damper are presented in Table 2 (above). FIG. 48 demonstrates the dampened driveshaft has peak resonance frequencies at 446 Hz (2.0 dB), 603 Hz (21.0 dB), and 1071 Hz (5.8 dB). FIG. 48 shows this kind of driveshaft damper effectively dampens NVH.

Figure 49:
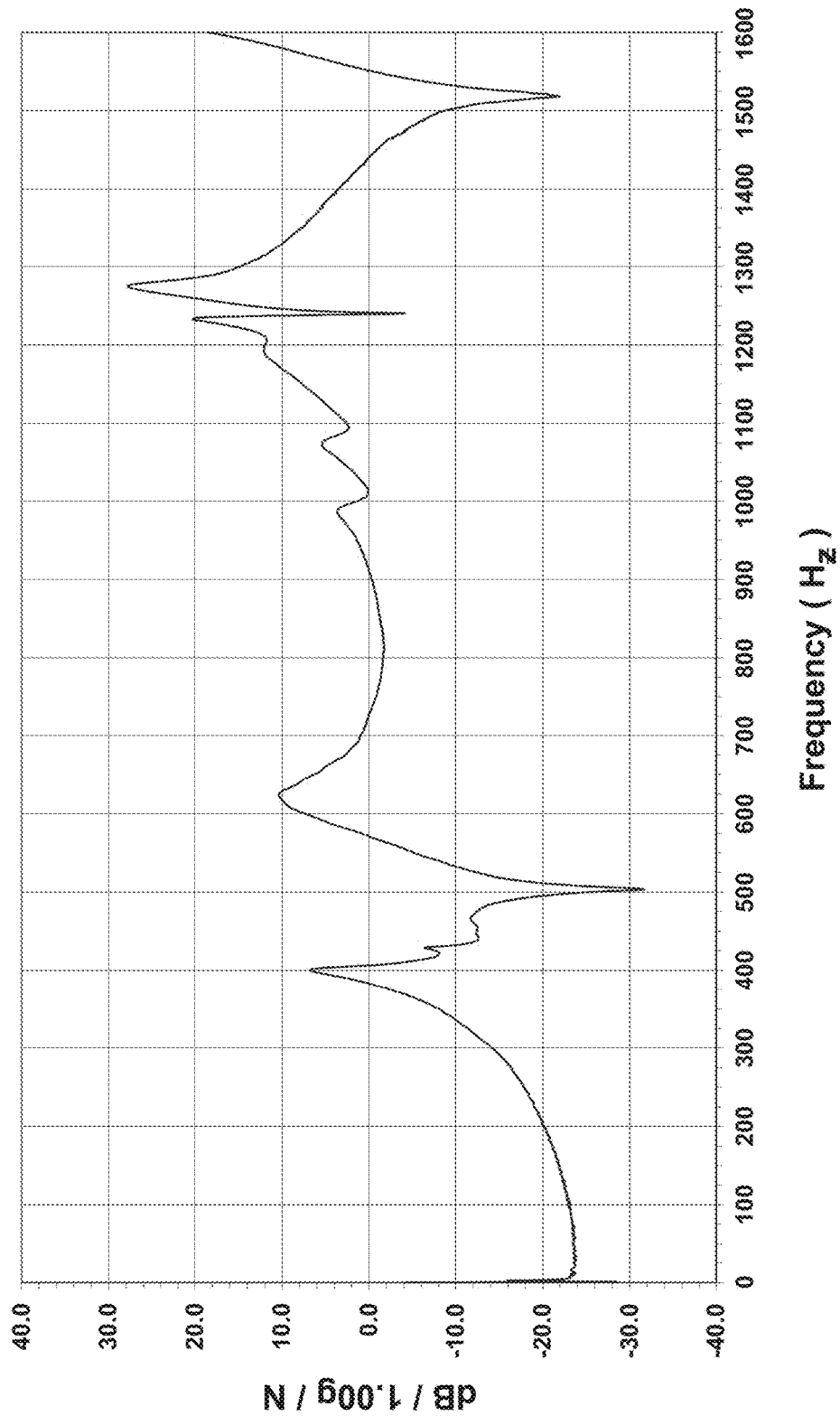

FIG. 49—Comparative "DAS-1EP" Driveshaft Damper

FIG. 49 depicts the frequency response function (FRF) for the 30-inch aluminum propshaft tube dampened with a centrally positioned, 13.75-inch paperboard driveshaft damper having two 50-durometer silicone rubber attenuation strips with a single protrusion (i.e., DAS-1EP). The technical specifications for this "DAS-1EP" driveshaft damper are presented in Table 2 (above). FIG. 49 demonstrates the dampened driveshaft has peak resonance frequencies at 400 Hz (6.8 dB), 623 Hz (10.4 dB), 986 Hz (3.7 dB), and 1073 Hz (5.4 dB). FIG. 49 shows this kind of driveshaft damper effectively dampens NVH.

Figure 50:
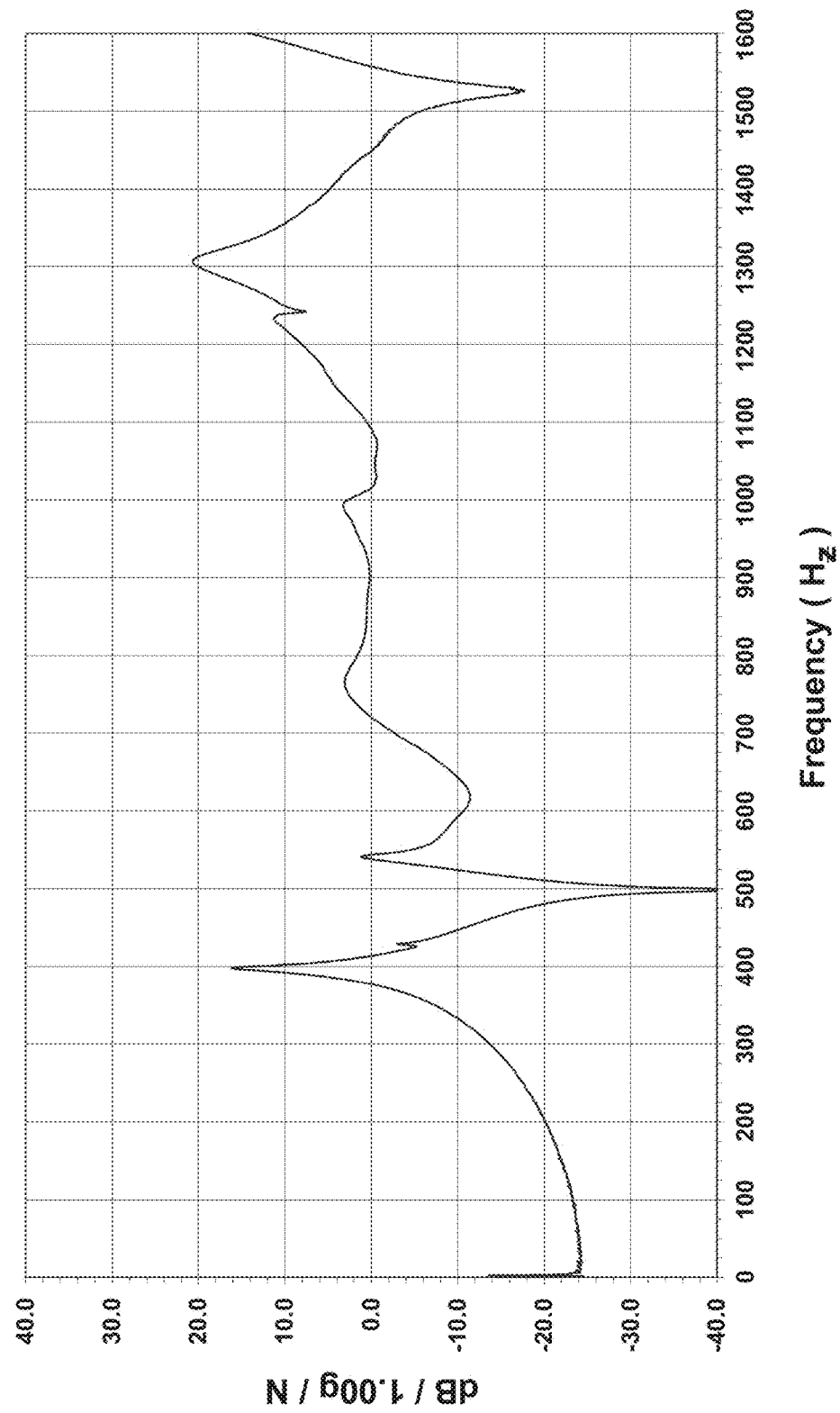
FIG. 50 is a frequency-response plot for an exemplary driveshaft damper having a single-start "triple-ridge" attenuation strip.

FIG. 50—"SAS-3EP" Driveshaft Damper

FIG. 50 depicts the frequency response function (FRF) for the 30-inch aluminum propshaft tube dampened with a centrally positioned, 13.75-inch paperboard driveshaft damper having one 50-durometer silicone rubber attenuation strip with three protrusions spaced 0.8-inch apart (i.e., SAS-3EP). The technical specifications for this "SAS-3EP" driveshaft damper are presented in Table 2 (above). FIG. 50 demonstrates the dampened driveshaft has peak resonance frequencies at 398 Hz (16.2 dB), 541 Hz (1.2 dB), 765 Hz (3.1 dB), and 991 Hz (3.3 dB). FIG. 50 shows this kind of single-start "triple-ridge" driveshaft damper effectively dampens NVH and is especially effective at eliminating NVH around 600 dB (i.e., shifting the resonance frequency from the problematic-automotive frequency of 600 Hz to 625 Hz) and indeed nearly eliminating NVH through the frequency range between about 425 Hz and 725 Hz.

Figure 51:
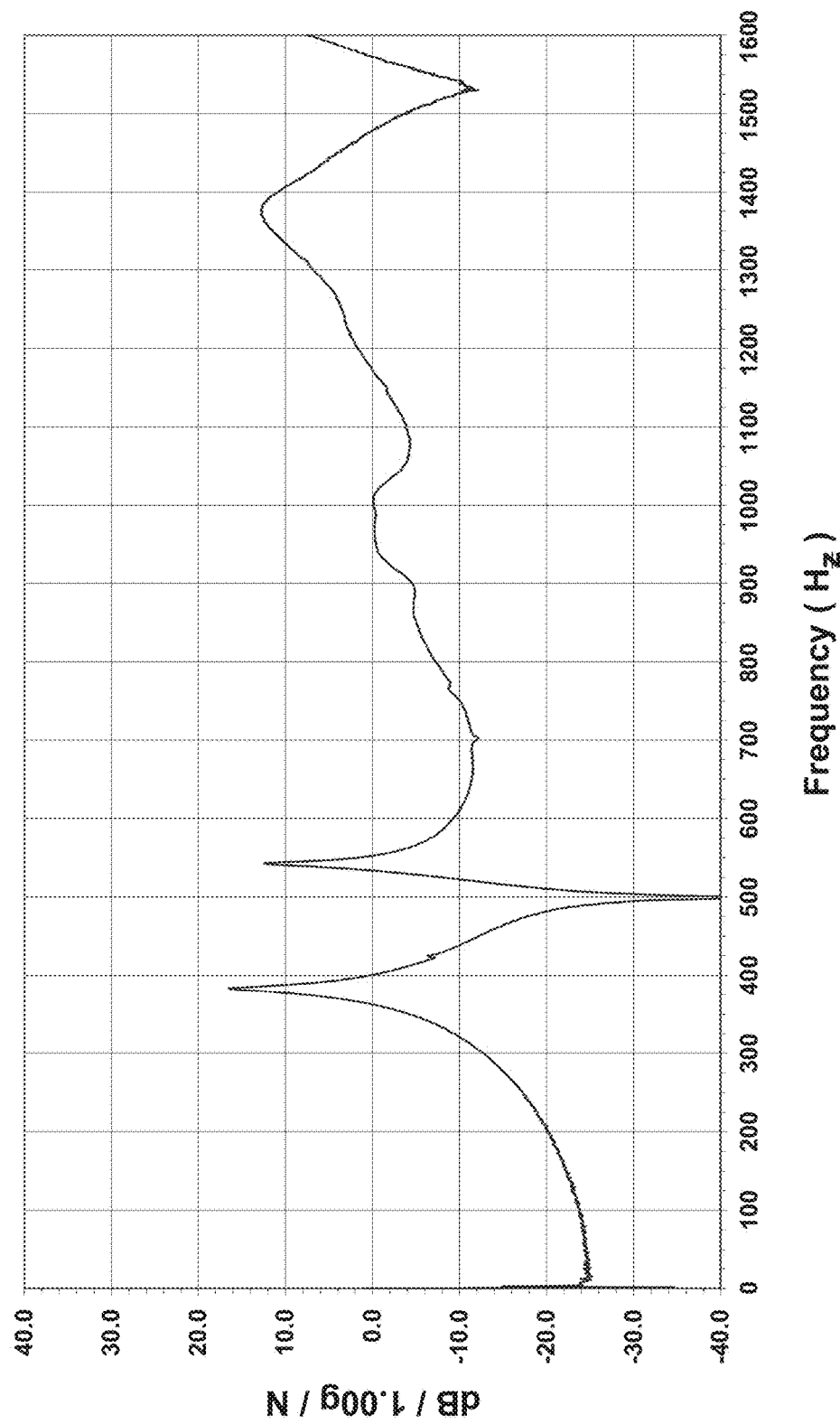
FIG. 51 is a frequency-response plot for an exemplary driveshaft damper having dual-start "triple-ridge" attenuation strips.

FIG. 51—"DAS-3EP" Driveshaft Damper

FIG. 51 depicts the frequency response function (FRF) for the 30-inch aluminum propshaft tube dampened with a centrally positioned, 13.75-inch paperboard driveshaft damper having two 50-durometer silicone rubber attenuation strips with three protrusions spaced 0.8-inch apart (i.e., DAS-3EP). The technical specifications for this "DAS-3EP" driveshaft damper are presented in Table 2 (above). FIG. 51 demonstrates the dampened driveshaft has peak resonance frequencies at 383 Hz (16.5 dB) and 543 Hz (12.4 dB). FIG. 51 shows this kind of driveshaft damper effectively dampens NVH. FIG. 51 shows this kind of dual-start "triple-ridge" driveshaft damper effectively dampens NVH and is especially effective at eliminating NVH around 600 dB (i.e., shifting the resonance frequency from the problematic-automotive frequency of 600 Hz to 625 Hz) and indeed eliminating NVH through the frequency range between about 575 Hz and 1100 Hz.

Figure 52:
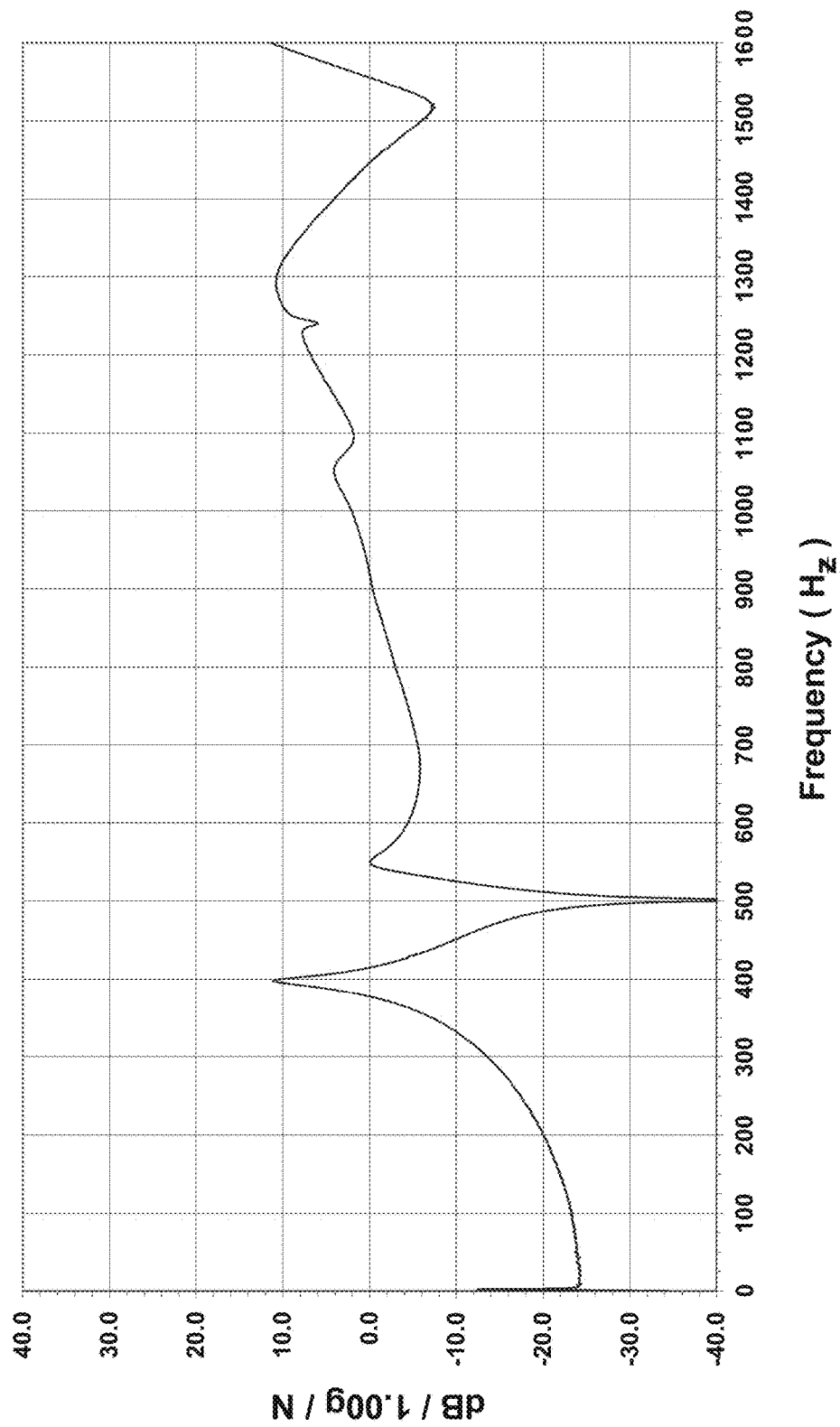
FIGS. 52 and 53 depict frequency-response plots for exemplary driveshaft dampers having a single-start "triple-ridge" attenuation strip with surficial foam.

FIG. 52—Surficial-Foam "SAS-3EP" Driveshaft Damper

FIG. 52 depicts the frequency response function (FRF) for the 30-inch aluminum propshaft tube dampened with a centrally positioned, 13.75-inch paperboard driveshaft damper having one 50-durometer EPDM rubber attenuation strip with three protrusions spaced 0.8-inch apart (i.e., SAS-3EP) and 0.25-inch surficial polyether foam with a density of 1.5 lbs/ft$^3$. This composite damper design is illustrated in FIGS. 29-31 (single-start silicone "triple-ridge" attenuation strip with 0.25-inch surficial polyether foam). Technical specifications for this "thin-walled" composite driveshaft damper except for the surficial foam are presented in Table 3 (above) as "SAS-3EP (4.75")." FIG. 52 demonstrates the dampened driveshaft has peak resonance frequencies at 398 Hz (11.2 dB), 549 Hz (0.0 dB), and 1050 Hz (4.1 dB). FIG. 52 shows this kind of single-start "triple-ridge" driveshaft damper with surficial foam effectively dampens NVH, is especially effective at eliminating NVH around 600 dB (i.e., shifting the resonance frequency from the problematic-automotive frequency of 600 Hz to 625 Hz), and keeps resonance noise under 0 dB from about 415 Hz and 918 Hz.

Figure 53:
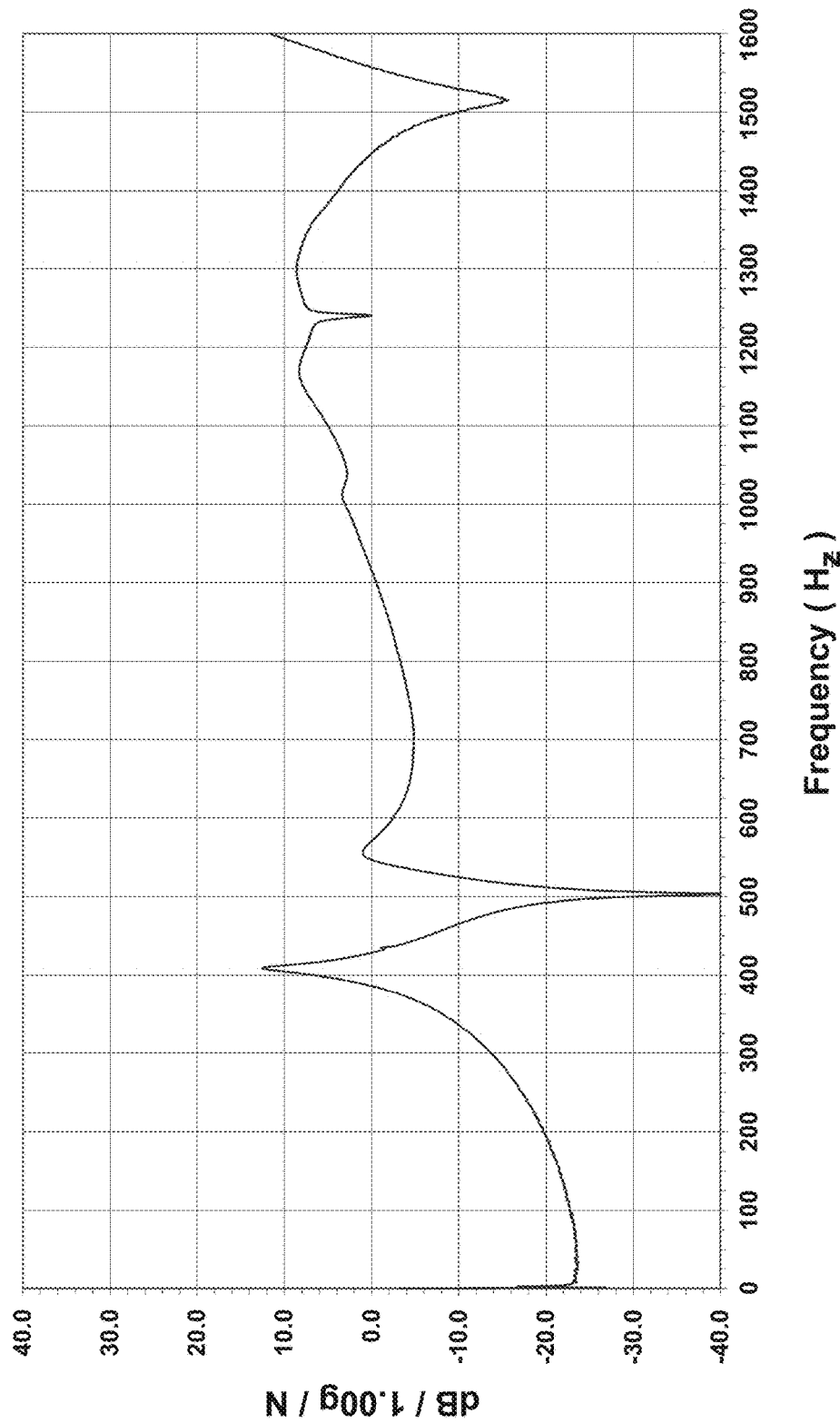

FIG. 53—Surficial-Foam "SAS-3EP" Driveshaft Damper

FIG. 53 depicts the frequency response function (FRF) for the 30-inch aluminum propshaft tube dampened with a centrally positioned, 10.5-inch paperboard driveshaft damper having one 50-durometer EPDM rubber attenuation strip with three protrusions spaced 0.8-inch apart (i.e., SAS-3EP) and 0.25-inch surficial polyether foam. This composite damper design is illustrated in FIGS. 29-31 (single-start EPDM "triple-ridge" attenuation strip with 0.25-inch surficial polyether foam). Technical specifications for this "thin-walled" composite driveshaft damper except for the 10.5-inch damper length and the surficial foam are presented in Table 3 (above) as "SAS-3EP (4.75")." FIG. 53 demonstrates the dampened driveshaft has peak resonance frequencies 409 Hz (12.6 dB), 556 Hz (1.1 dB), and 1017 Hz (3.4 dB). FIG. 53 shows this kind of single-start "triple-ridge" driveshaft damper with surficial foam effectively dampens NVH and is especially effective at eliminating NVH around 600 dB (i.e., shifting the resonance frequency from the problematic-automotive frequency of 600 Hz to 625 Hz).

Figure 54:
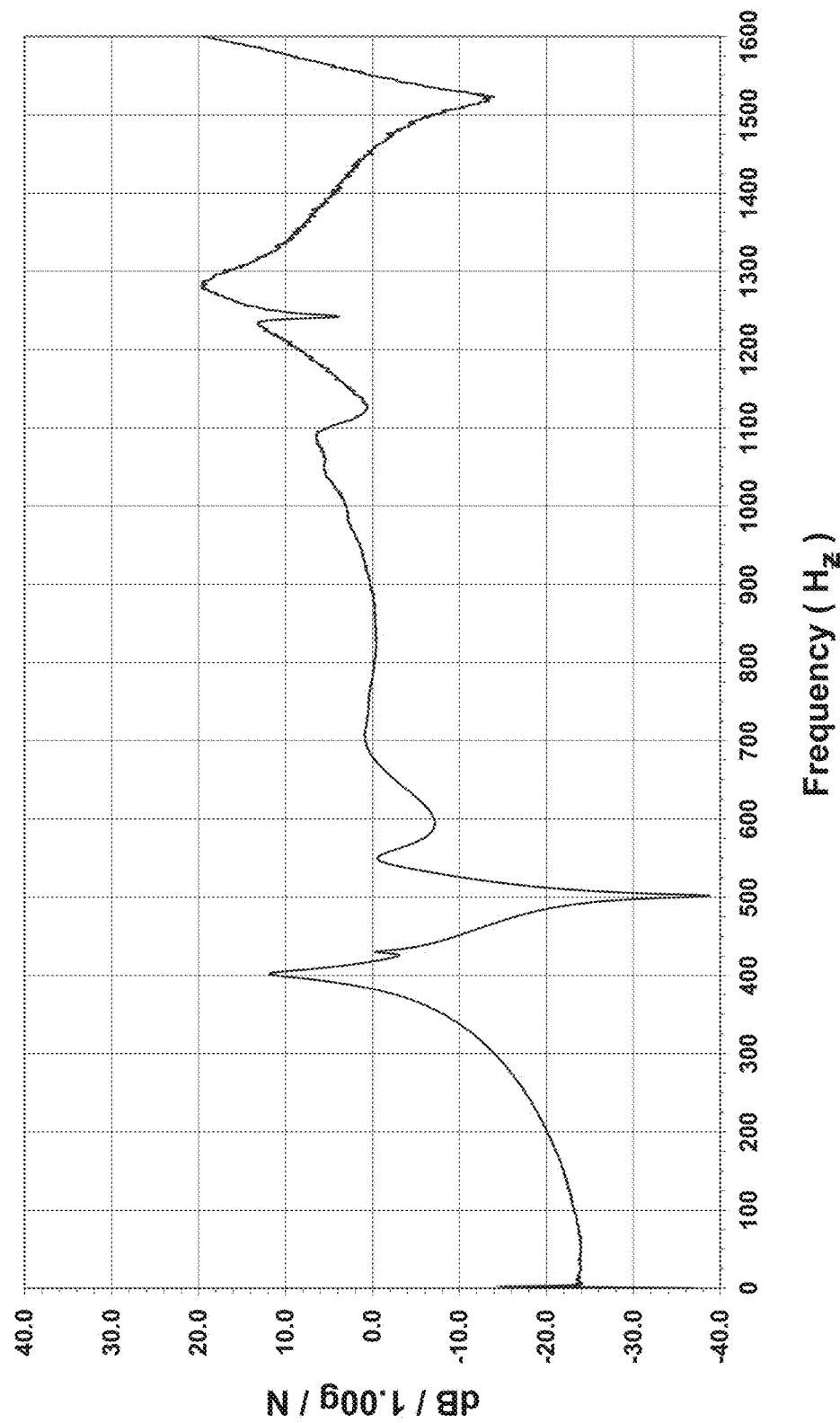
FIGS. 54-58 depict frequency-response plots for exemplary driveshaft dampers having either a single-start "double-ridge" attenuation strip or dual-start "double-ridge" attenuation strips.

FIG. 54—"SAS-2EP" Driveshaft Damper (4.625-Inch Paper)

FIG. 54 depicts the frequency response function (FRF) for the 30-inch aluminum propshaft tube dampened with a centrally positioned, 13.75-inch paperboard driveshaft damper having one 50-durometer EPDM rubber attenuation strip with two protrusions spaced 0.8-inch apart (i.e., SAS-2EP). The light-wall paperboard core is constructed using a 4.625-inch top-ply paper strip. The driveshaft damper's outer diameter of 4.484 inches provides an interference fit of 0.150 inch. The technical specifications for this "SAS-2EP" driveshaft damper are presented in Table 6 (above). FIG. 54 demonstrates the dampened driveshaft has peak resonance frequencies at 402 Hz (11.9 dB), 706 Hz (1.0 dB), and 1091 Hz (6.5 dB). FIG. 54 shows this kind of single-start "double-ridge" driveshaft damper effectively dampens NVH and is especially effective at eliminating NVH around 600 dB (i.e., shifting the resonance frequency from the problematic-automotive frequency of 600 Hz to 625 Hz).

Figure 55:
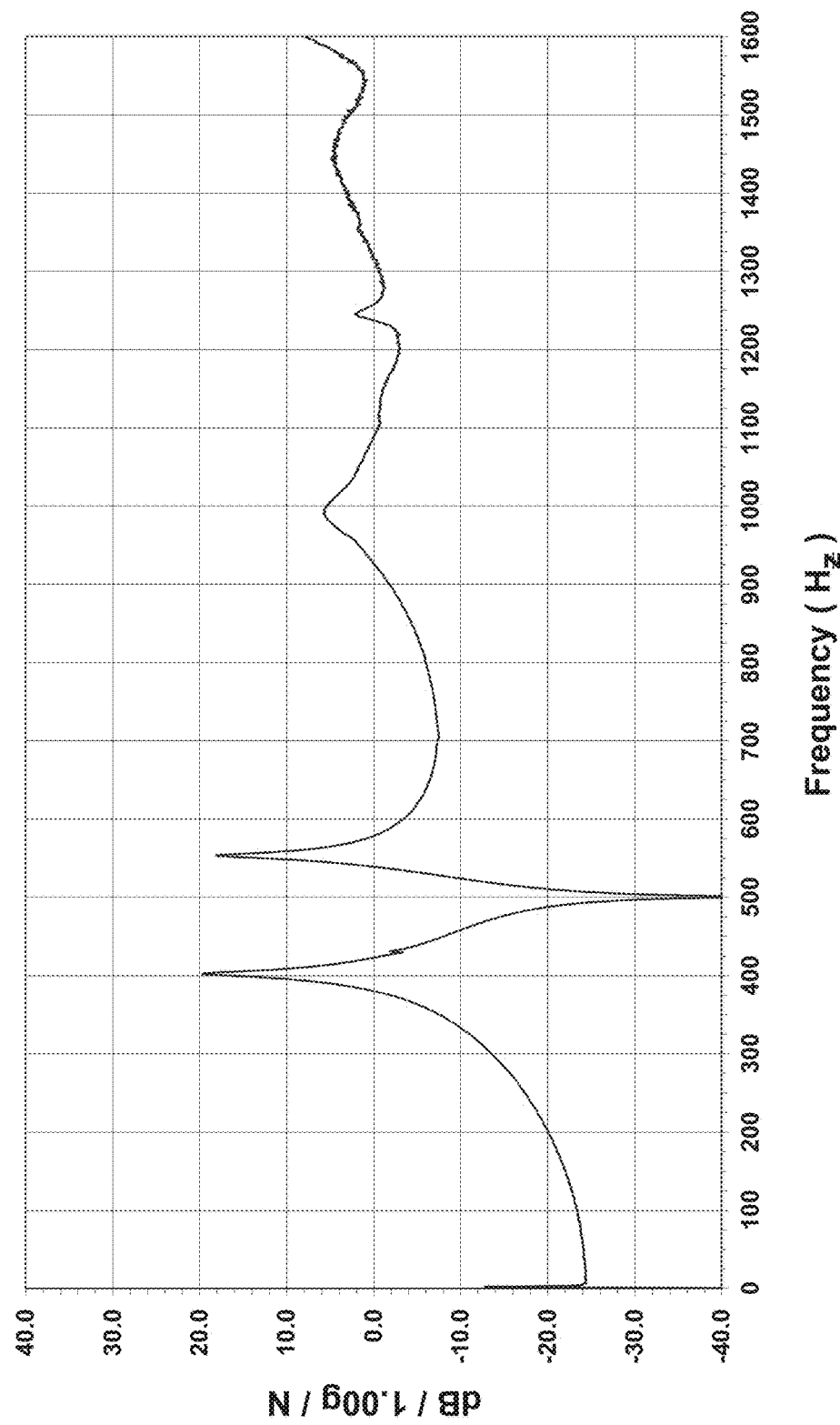

FIG. 55—"DAS-2EP" Driveshaft Damper (4.625-Inch Paper)

FIG. 55 depicts the frequency response function (FRF) for the 30-inch aluminum propshaft tube dampened with a centrally positioned, 13.75-inch paperboard driveshaft damper having two 50-durometer EPDM rubber attenuation strips each with two protrusions spaced 0.8-inch apart (i.e., DAS-2EP). The light-wall paperboard core is constructed using a 4.625-inch top-ply paper strip. The driveshaft damper's outer diameter of 4.484 inches provides an interference fit of 0.150 inch. The technical specifications for this "DAS-2EP" driveshaft damper are presented in Table 6 (above). FIG. 55 demonstrates the dampened driveshaft has peak resonance frequencies at 403 Hz (19.6 dB), 553 Hz (18.1 dB), and 997 Hz (5.62 dB). FIG. 55 shows this kind of dual-start "double-ridge" driveshaft damper effectively dampens NVH while performing differently than the single-start "double-ridge" driveshaft damper of FIG. 54.

Figure 56:
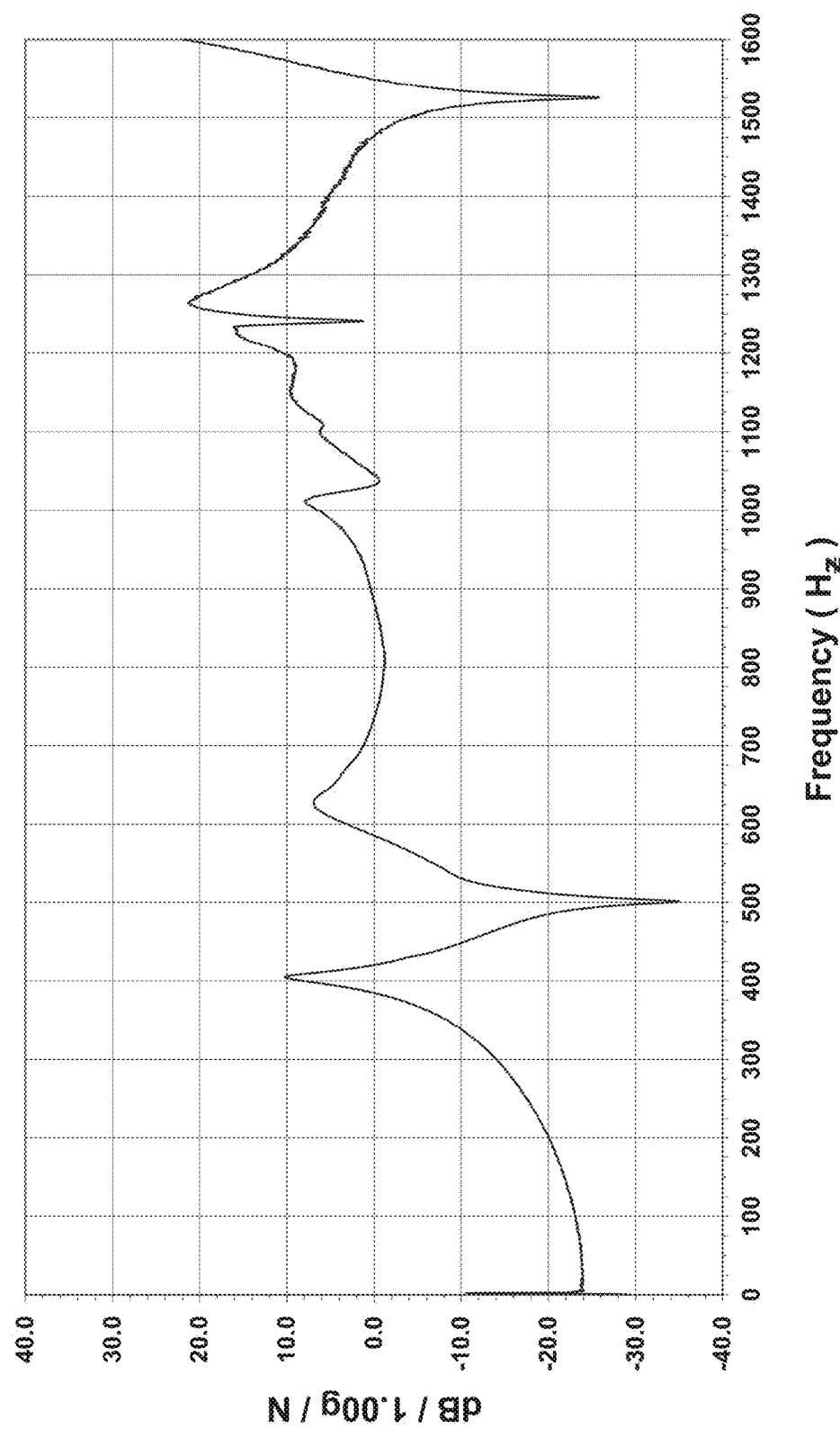

FIG. 56—"SAS-2EP" Driveshaft Damper (6.0-inch paper)

FIG. 56 depicts the frequency response function (FRY) for the 30-inch aluminum propshaft tube dampened with a centrally positioned, 13.75-inch paperboard driveshaft damper having one 50-durometer EPDM rubber attenuation strip with two protrusions spaced 0.8-inch apart (i.e., SAS-2EP). The light-wall paperboard core is constructed using a 6.0-inch top-ply paper strip. The driveshaft damper's outer diameter of 4.484 inches provides an interference fit of 0.150 inch. The technical specifications for this "SAS-2EP" driveshaft damper are presented in Table 6 (above). FIG. 56 demonstrates the dampened driveshaft has peak resonance frequencies at 405 Hz (10.2 dB), 626 Hz (7.0 dB), and 1011 Hz (8.0 dB). FIG. 56 shows this kind of single-start "double-ridge" driveshaft damper effectively dampens NVH.

Figure 57:
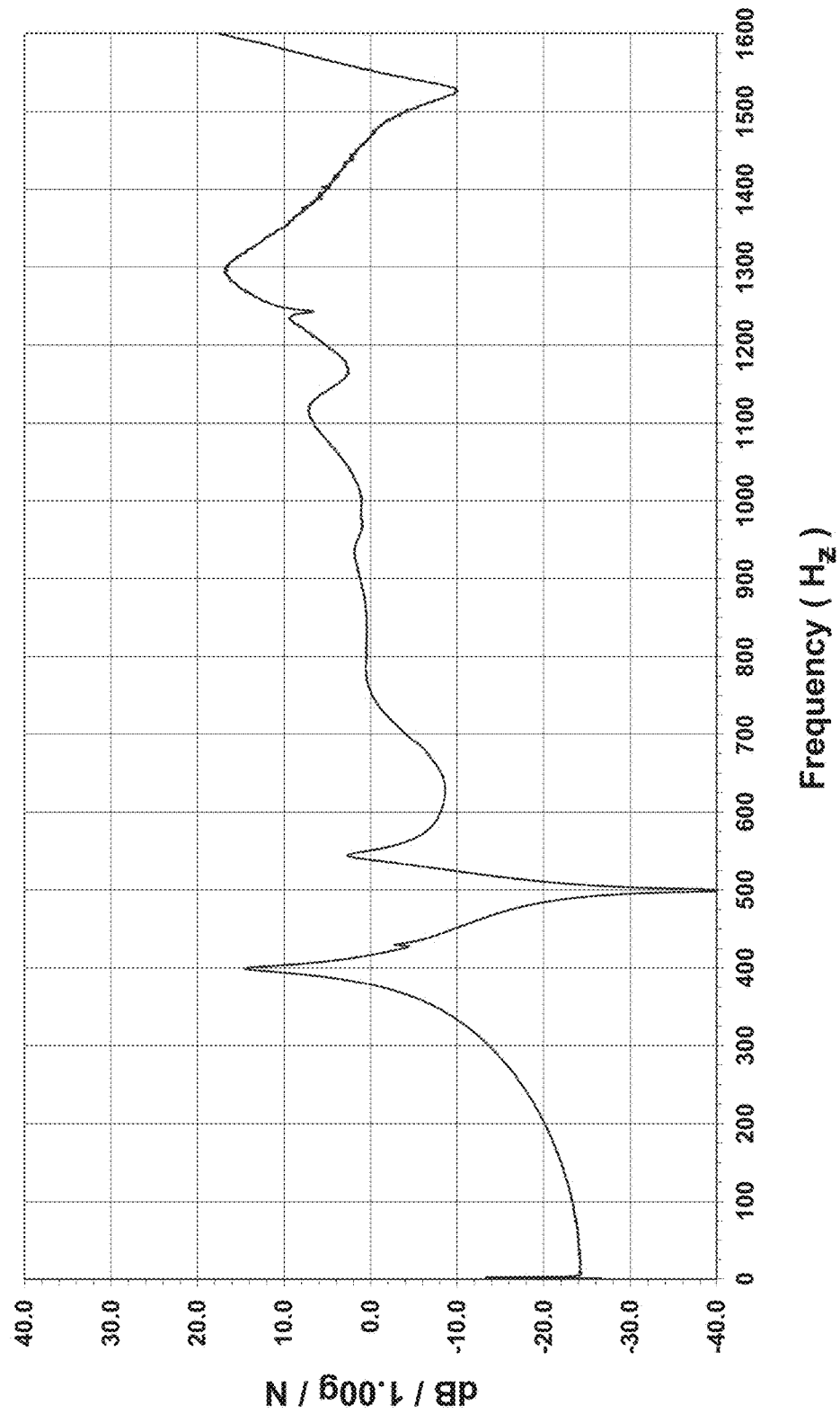

FIG. 57—"DAS-2EP" Driveshaft Damper (6.0-inch paper)

FIG. 57 depicts the frequency response function (FRF) for the 30-inch aluminum propshaft tube dampened with a centrally positioned, 13.75-inch paperboard driveshaft damper having two 50-durometer EPDM rubber attenuation strips each with two protrusions spaced 0.8-inch apart (i.e., SAS-2EP). The light-wall paperboard core is constructed using a 6.0-inch top-ply paper strip. The driveshaft damper's outer diameter of 4.484 inches provides an interference fit of 0.150 inch. The technical specifications for this "DAS-2EP" driveshaft damper are presented in Table 6 (above). FIG. 57 demonstrates the dampened driveshaft has peak resonance frequencies at 399 Hz (14.5 dB), 544 (2.7 dB), 933 Hz (2.0 dB), and 1117 Hz (7.3 dB). FIG. 57 shows this kind of dual-start "double-ridge" driveshaft damper effectively dampens NVH and is especially effective at eliminating NVH around 600 dB (i.e., shifting the resonance frequency from the problematic-automotive frequency of 600 Hz to 625 Hz) while performing differently than the single-start "double-ridge" driveshaft dampers of FIG. 54 and FIG. 56.

Figure 58:
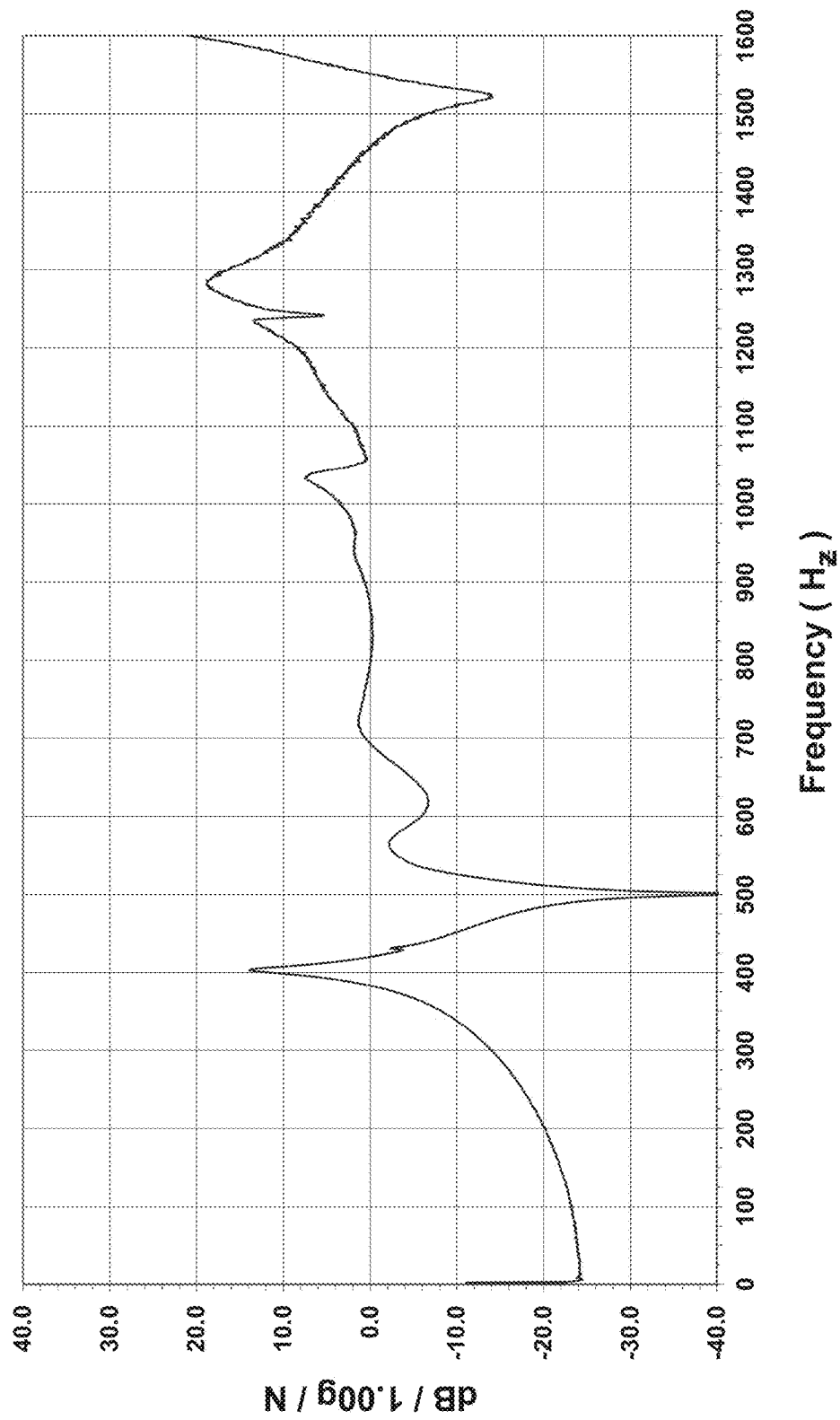

FIG. 58—"SAS-2EP" Driveshaft Damper (4.0-inch paper)

FIG. 58 depicts the frequency response function (FRF) for the 30-inch aluminum propshaft tube dampened with a centrally positioned, 13.75-inch paperboard driveshaft damper having one 50-durometer EPDM rubber attenuation strip with two protrusions spaced 0.8-inch apart (i.e., SAS-2EP). The light-wall paperboard core is constructed using a 4.0-inch top-ply paper strip. The driveshaft damper's outer diameter of 4.484 inches provides an interference fit of 0.150 inch. The technical specifications for this "SAS-2EP" driveshaft damper are presented in Table 6 (above). FIG. 58 demonstrates the dampened driveshaft has peak resonance frequencies at 403 Hz (14.0 dB), 721 (1.4 dB), and 1033 Hz (7.6 dB). FIG. 58 shows this kind of single-start "double-ridge" driveshaft damper effectively dampens NVH and is especially effective at eliminating NVH around 600 dB (i.e., shifting the resonance frequency from the problematic-automotive frequency of 600 Hz to 625 Hz).

Figure 59:
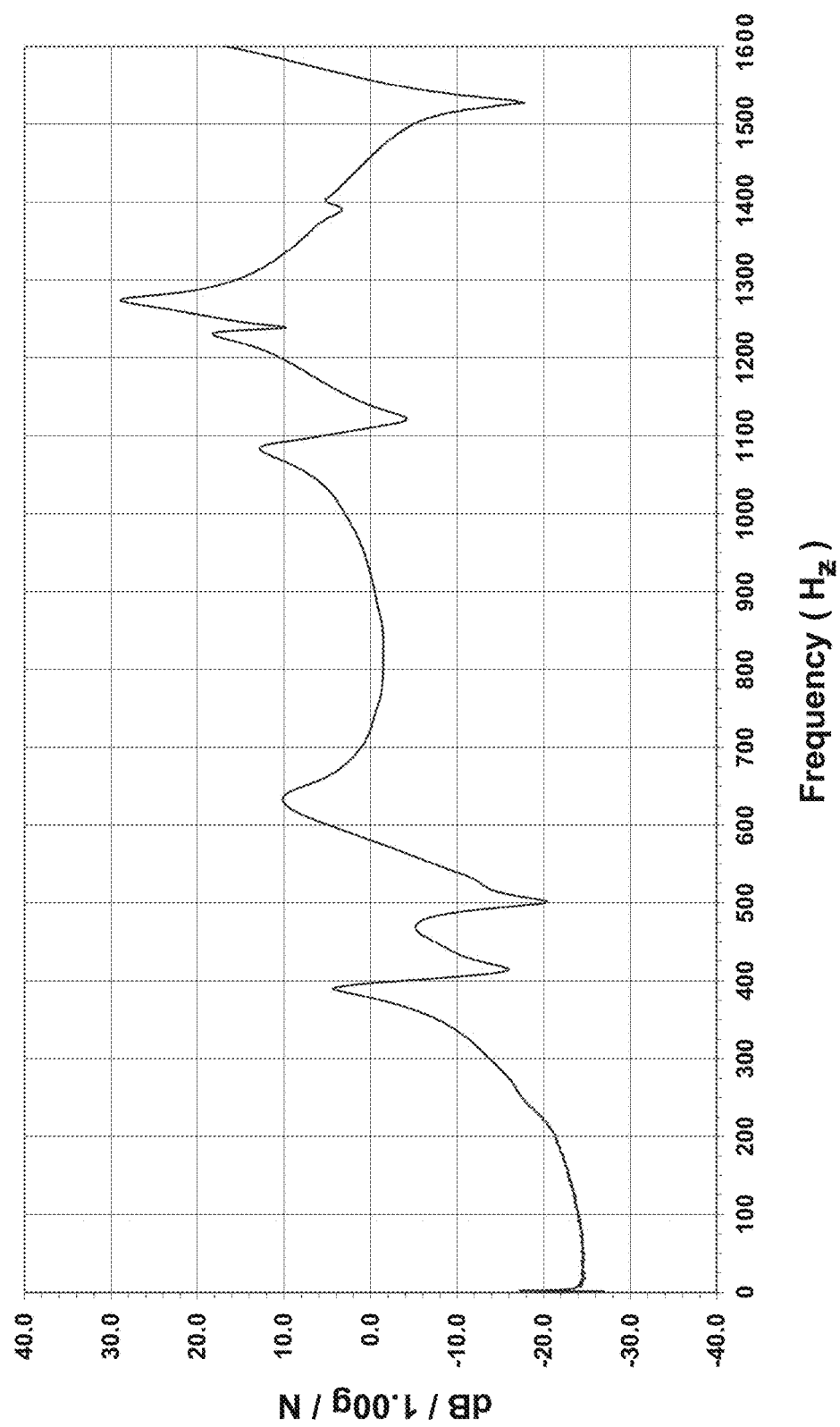
FIGS. 59 and 60 depict frequency-response plots for the combination of two different kinds of driveshaft dampers.

FIG. 59—Dual Driveshaft Dampers

FIG. 59 depicts the frequency response function (FRF) for the 30-inch aluminum propshaft tube dampened with both (i) a 9.75-inch paperboard driveshaft damper having one 50-durometer silicone rubber attenuation strip with three protrusions spaced 0.8-inch apart (i.e., SAS-3EP) and (ii) a 13.75-inch paperboard driveshaft damper having one 50-durometer silicone rubber attenuation strip with a single protrusion (i.e., SAS-1EP). The technical specifications for the "SAS-3EP" driveshaft damper—except for the 9.75-inch damper length—are presented in Table 2 (above) as "SAS- 3EP (4.625")." The technical specifications for this "SAS-1EP" driveshaft damper are presented in Table 2 (above) as "SAS-1EP (4.625")." FIG. 59 shows this combination of two different kinds of driveshaft dampers effectively dampens NVH at both the problematic automotive frequencies of 400 Hz and 600 Hz.

Figure 60:
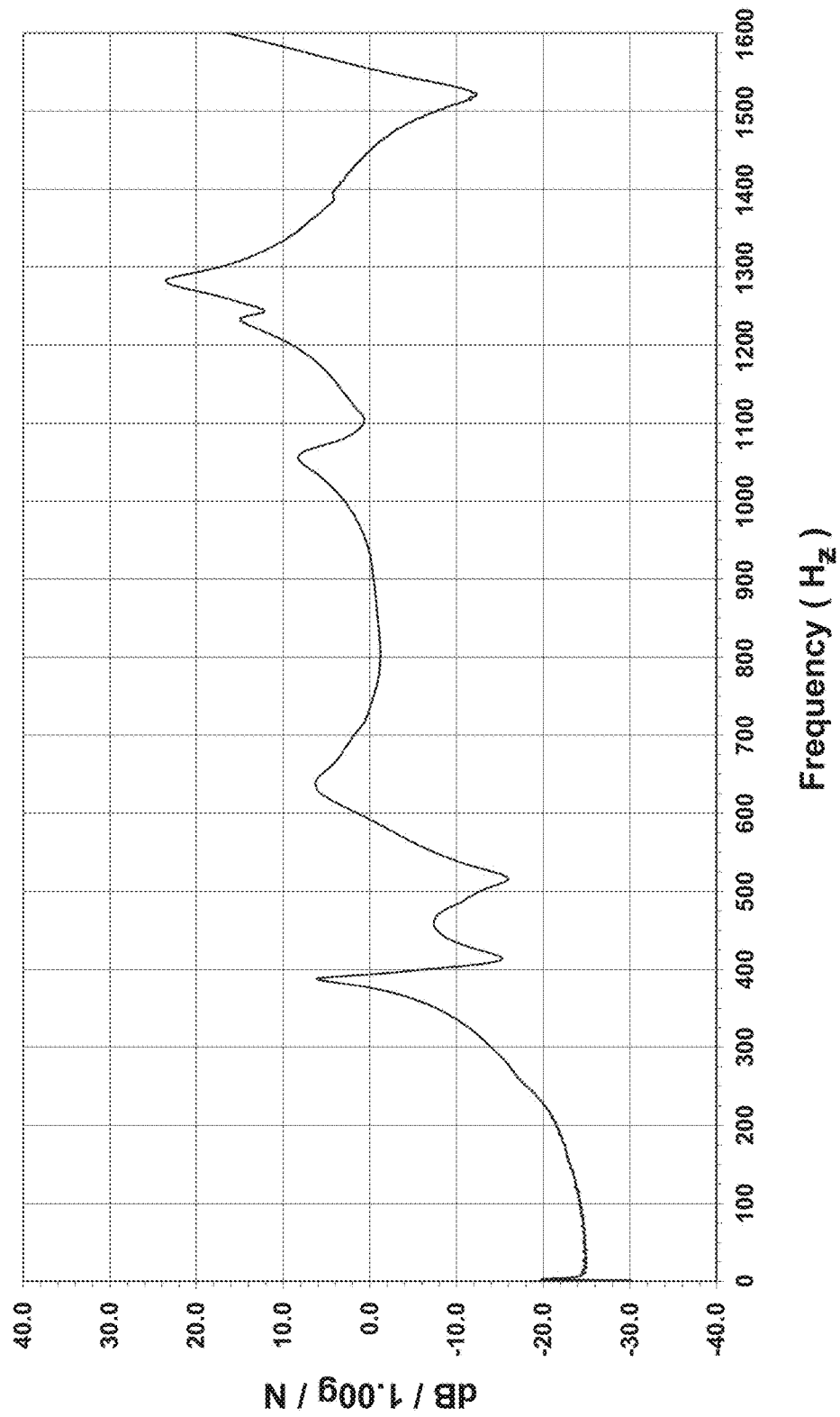

FIG. 60—Dual Driveshaft Dampers

FIG. 60 depicts the frequency response function (FRF) for the 30-inch aluminum propshaft tube dampened with both (i) a 13.75-inch paperboard driveshaft damper having one 50-durometer silicone rubber attenuation strip with three protrusions spaced 0.8-inch apart (i.e., SAS-3EP) and (ii) a 13.75-inch paperboard driveshaft damper having one 50-durometer silicone rubber attenuation strip with a single protrusion (i.e., SAS-1EP). The technical specifications for the "SAS-3EP" driveshaft damper are presented in Table 2 (above) as "SAS-3EP (6.0")." The technical specifications for the "SAS-1EP" driveshaft damper are presented in Table 2 (above) as "SAS-1EP (4.625")." FIG. 60 demonstrates the dampened driveshaft has peak resonance frequencies at 388 Hz (6.1 dB), 637 Hz (6.3 dB), and 1056 Hz (8.2 dB). FIG. 60 shows this combination of two different kinds of driveshaft dampers effectively dampens NVH at both the problematic automotive frequencies of 400 Hz and 600 Hz.

Figure 61:
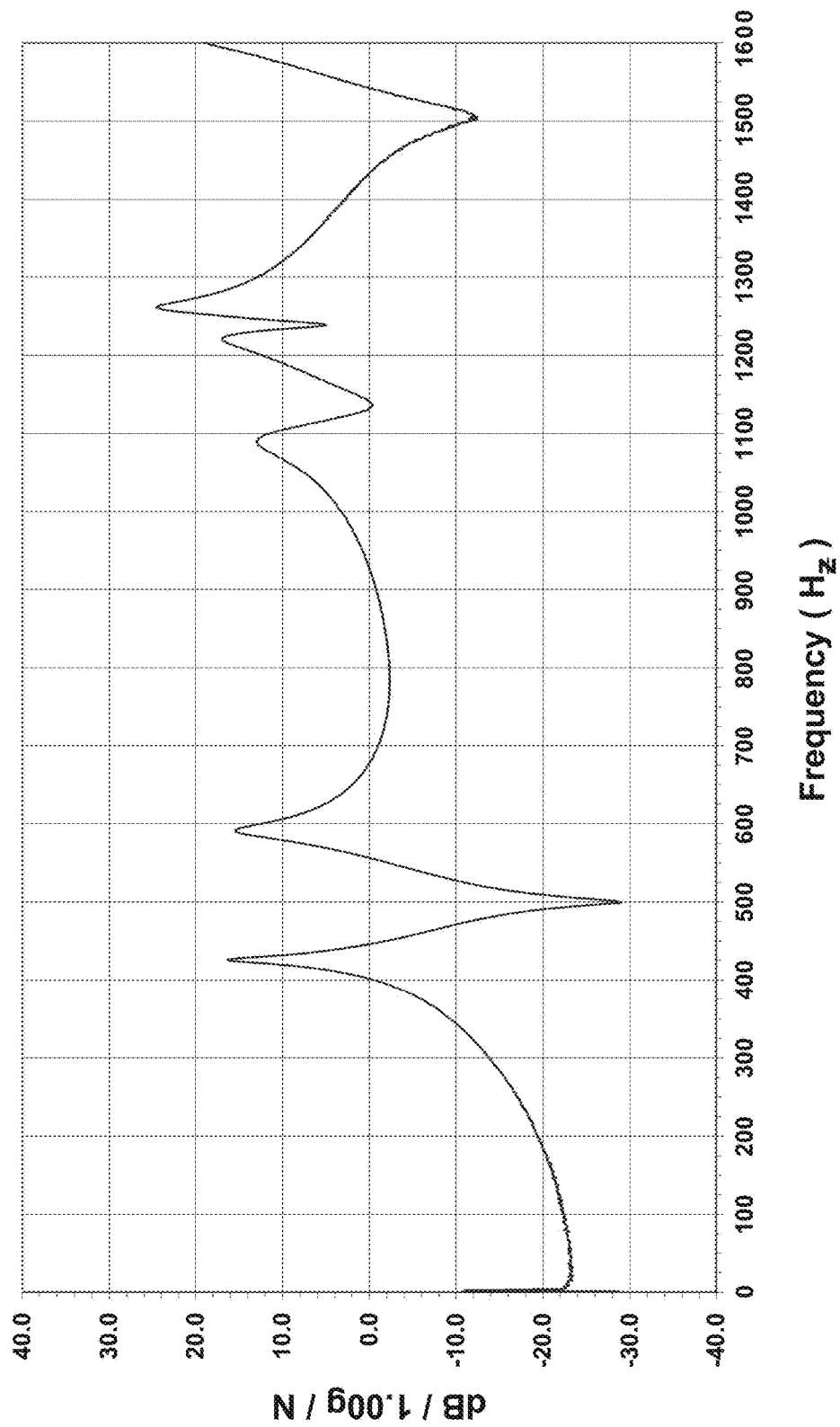
FIG. 61 is a frequency-response plot for a comparative foam-slug driveshaft damper.

FIG. 61—Comparative Foam-Slug Driveshaft Damper

FIG. 61 depicts the frequency response function (FRF) for the 30-inch aluminum propshaft tube dampened with a centrally positioned, 20-inch foam slug. FIG. 61 shows this kind of driveshaft damper dampens NVH, albeit less effectively at the problematic automotive frequencies of 400 Hz and 600 Hz than the foregoing driveshaft dampers according to the present disclosure.

Figure 62:
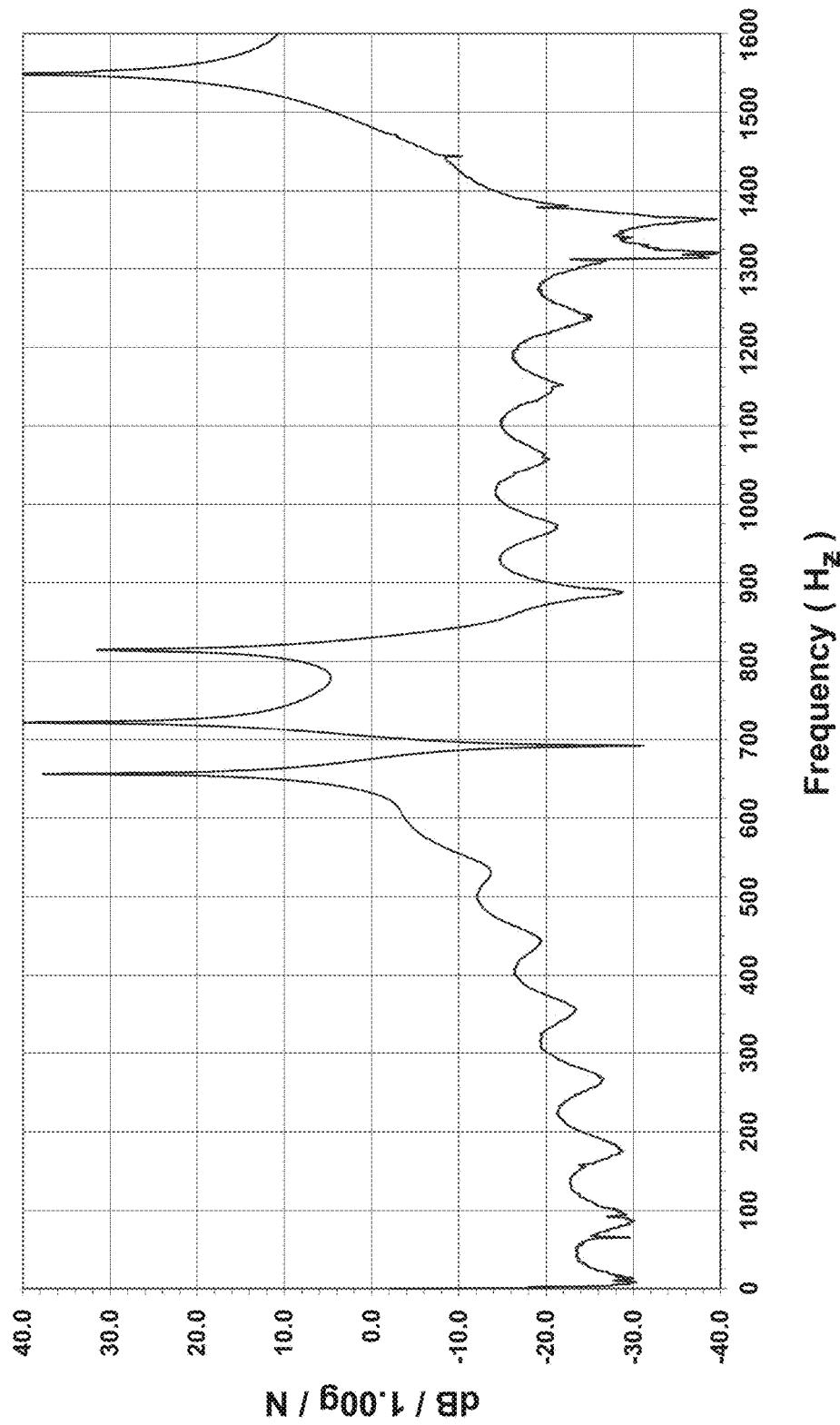
FIG. 62 is a frequency-response plot for an empty steel propshaft tube.

FIG. 62—Empty Steel Propshaft Tube

As a baseline, frequency response was established for an empty, 30-inch steel propshaft tube having an outer diameter of 3.15 inches, a wall thickness of 0.062 inch, and an inner diameter of 3.026 inches (i.e., outer diameter less double the wall thickness). This representative propshaft, which is described in the working examples of Table 7 (above), is the steel propshaft used in each of the following bench tests for frequency response function (FRF). FIG. 62 demonstrates the empty steel tube has natural resonance frequencies at 656 Hz (37.8 dB), 722 Hz (41.8 dB), and 815 Hz (34.2 dB). Problematic NVH frequencies that affect steel are different from the problematic frequencies that affect aluminum, and this is illustrated by the differences in baseline testing between FIG. 44 (empty aluminum tube) and FIG. 62 (empty steel tube).

Figure 63:
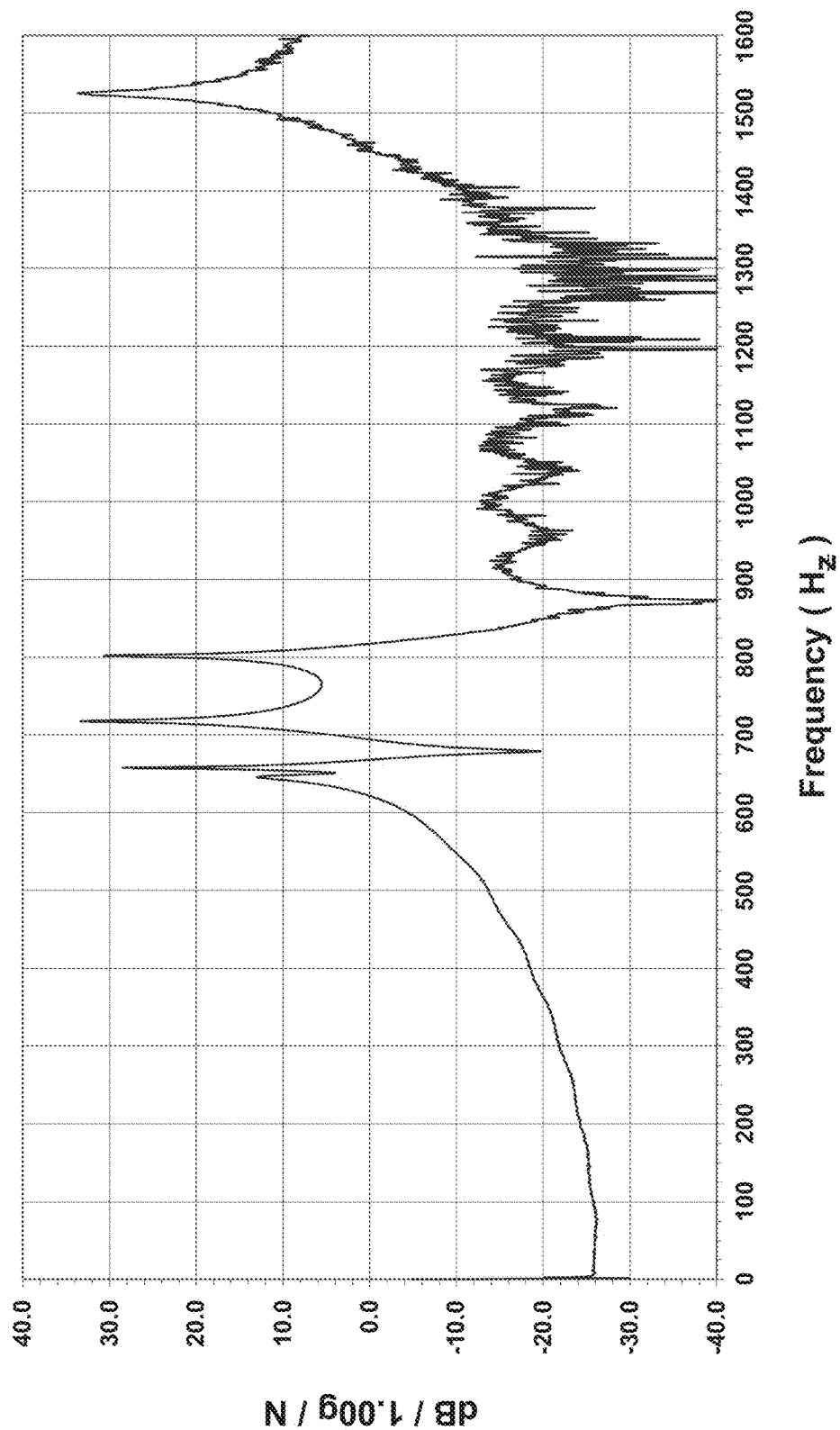
FIG. 63 is a frequency-response plot for a comparative driveshaft damper.

FIG. 63—Comparative Driveshaft Damper

FIG. 63 depicts the frequency response function (FRF) for the 30-inch steel propshaft tube dampened with a centrally positioned, 10.625-inch paperboard driveshaft damper having an outermost layer of single-face corrugated paper. The driveshaft damper's outer diameter of 3.086 inches provided an interference fit of 0.06 inch. FIG. 63 demonstrates the dampened driveshaft has peak resonance frequencies at 646 Hz (13.0 dB), 658 Hz (28.3 dB), 718 Hz (33.3 dB), and 802 Hz (30.7 dB). FIG. 63 shows this kind of driveshaft damper effectively dampens NVH.

Figure 64:
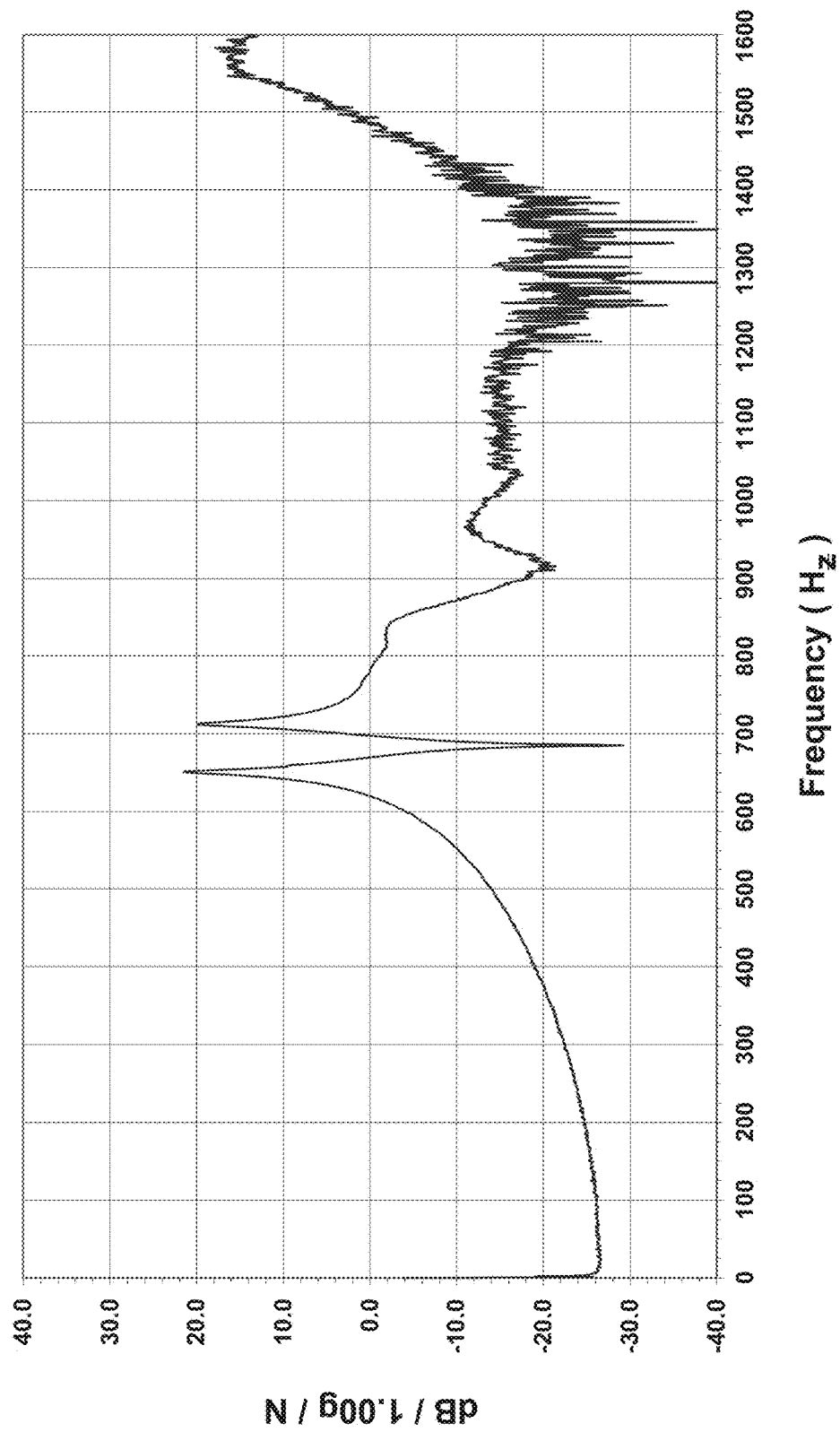
FIG. 64 is a frequency-response plot for an exemplary driveshaft damper having a single-start "triple-ridge" attenuation strip.

FIG. 64—Single-Start "Triple-Ridge" Driveshaft Damper

FIG. 64 depicts the frequency response function (FRF) for the 30-inch steel propshaft tube dampened with a centrally positioned, 9.75-inch paperboard driveshaft damper having one 50-durometer silicone rubber attenuation strip with three protrusions spaced 0.8-inch apart (i.e., SAS-3EP). The technical specifications for this "SAS-3EP" driveshaft damper are presented in Table 7 (above). The driveshaft damper's outer diameter of 3.175 inches provides an interference fit of 0.150 inch. FIG. 64 demonstrates the dampened driveshaft has peak resonance frequencies at 651 Hz (21.5 dB) and 713 Hz (19.9 dB). FIG. 64 shows this kind of exemplary driveshaft damper effectively dampens NVH, reducing the NVH levels from the comparative driveshaft damper depicted FIG. 63.

Figure 65:
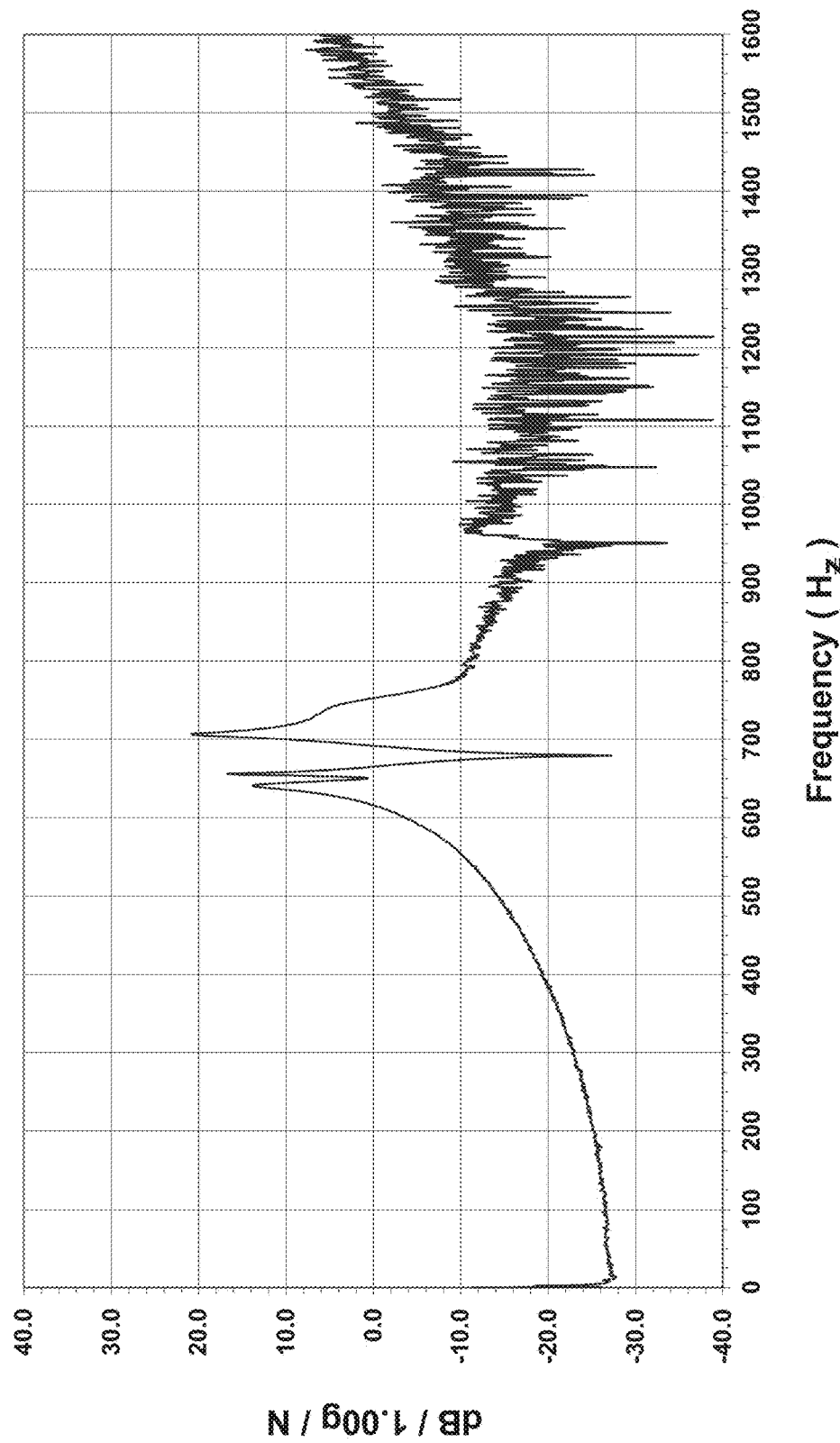
FIG. 65 is a frequency-response plot for an exemplary driveshaft damper having dual-start "triple-ridge" attenuation strips.

FIG. 65—Dual-Start "Triple-Ridge" Driveshaft Damper

FIG. 65 depicts the frequency response function (FRF) for the 30-inch steel propshaft tube dampened with a centrally positioned, 15.75-inch paperboard driveshaft damper having two 50-durometer EPDM rubber attenuation strips with three protrusions spaced 0.8-inch apart (i.e., DAS-3EP). The technical specifications for this "DAS-3EP" driveshaft damper are presented in Table 7 (above). The driveshaft damper's outer diameter of 3.175 inches provides an interference fit of 0.150 inch. FIG. 65 demonstrates the dampened driveshaft has peak resonance frequencies at 641 Hz (13.8 dB), 656 Hz (16.7 dB), and 707 Hz (20.86 dB). FIG. 65 shows this kind of exemplary driveshaft damper effectively dampens NVH, reducing the NVH levels from the comparative driveshaft damper depicted FIG. 63.

Figure 66:
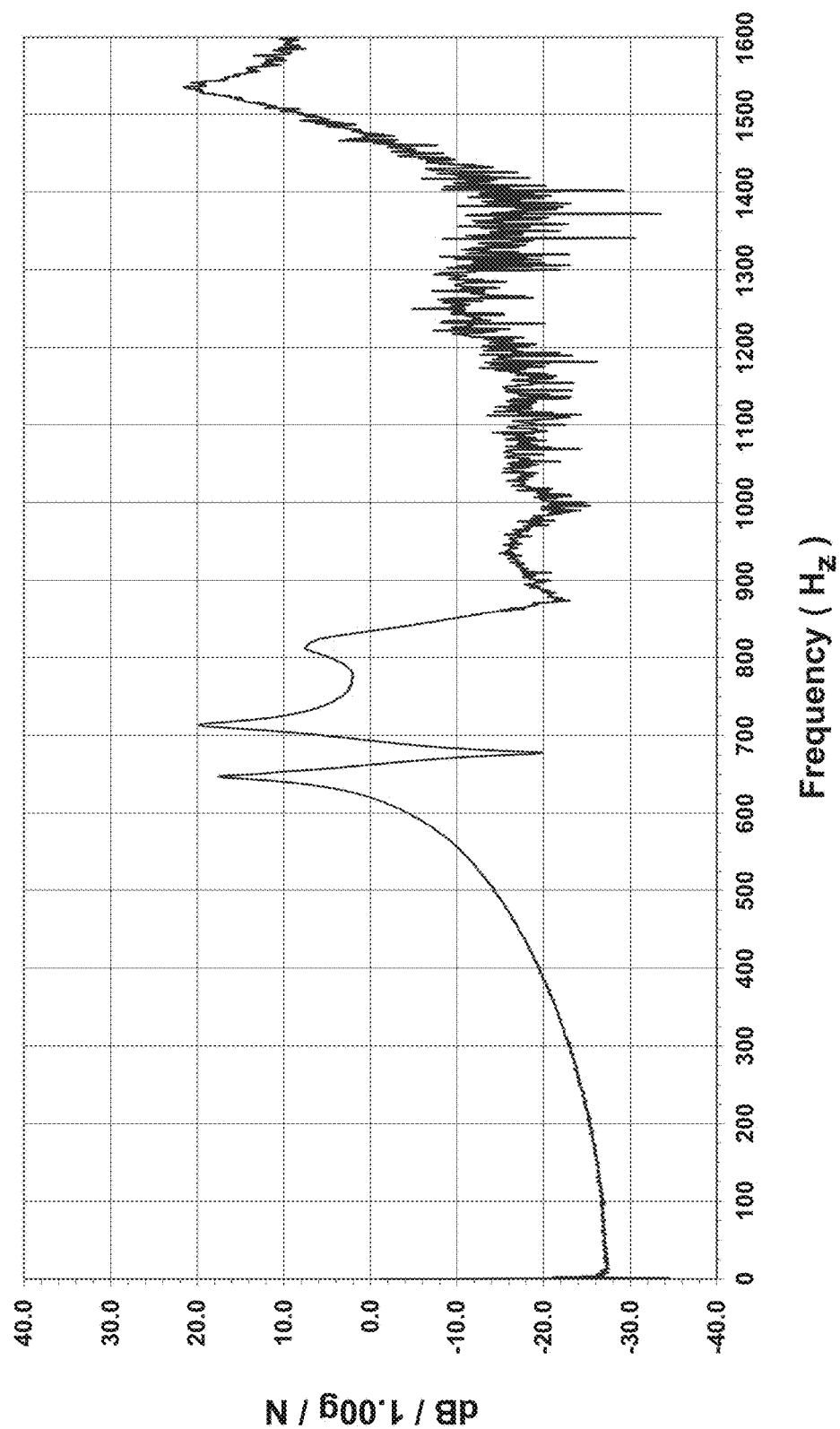
FIG. 66 is a frequency-response plot for the combination of two different kinds of driveshaft dampers.

FIG. 66—Dual Driveshaft Dampers

FIG. 66 depicts the frequency response function (FRF) for the 30-inch steel propshaft tube dampened with both (i) 10.625-inch paperboard driveshaft damper having an outermost layer of single-face corrugated paper as described with respect to FIG. 63 and (ii) 9.75-inch paperboard driveshaft damper having one 50-durometer silicone rubber attenuation strip with three protrusions spaced 0.8-inch apart (i.e., SAS-3EP). The technical specifications for the "SAS-3EP" driveshaft damper are presented in Table 7 (above) as "SAS-3EP (4.3125")." FIG. 66 demonstrates the dampened driveshaft has peak resonance frequencies at 647 Hz (17.5 dB), 713 Hz (19.8 dB), and 812 Hz (7.6 dB). FIG. 66 shows this combination of two different kinds of driveshaft dampers effectively dampens NVH.

Working Examples (Spring-Mass Systems)

Tables 8-13 (below) illustrate various tuned mass dampers (i.e., active mass dampers or harmonic absorbers) via the modification of the inherent spring-mass system. Tables 8-13 describe the selective adjustment (e.g., addition) of mass to exemplary driveshaft dampers by changing the profile of the EPDM "double-ridge" attenuation strip (i.e., the standard, heavy, and heavier embodiments). Tables 8-13 also illustrate adjusting mass (e.g., increasing mass or decreasing mass) by changing the winding angle of the paperboard tube's helical winding and thus the pitch angle of each attenuation strip. As noted, winding angle $\theta_w$ generally depends on the width of the plies of core material and the diameter of the core, and the pitch angle $\theta$ of each attenuation strip matches the winding angle $\theta_w$ of the plies of core material.

In Tables 8-13 (below), the designation "SAS" refers to a driveshaft damper having a single-start attenuation strip and the designation "DAS" refers to a driveshaft damper having dual-start attenuation strips. The "EP" designation refers to the number of elongate protrusions on each attenuation strip (e.g., "2EP" refers to two elongate protrusions on each attenuation strip).

Tables 8-13 illustrate the prophetic application of three exemplary "double-ridge" attenuation strips having different thicknesses and mass. Each of these prophetic driveshaft dampers is configured for an aluminum propshaft tube having an outer diameter of 4.50 inches, a wall thickness of 0.083 inch, and an inner diameter of 4.334 inches (i.e., outer diameter less double the wall thickness) such as described in the working examples of Tables 2-6 (above) and FRF-characterized in FIG. 44.

The three exemplary embodiments of "double-ridge" attenuation strips are formed from extruded 50-durometer ethylene propylene diene monomer (EPDM) rubber. Each attenuation strip has a maximum height of 0.250 inch and a nominal width of 1.640 inches. For each "double-ridge" attenuation strip, the two elongate protrusions are spaced 0.800 inch apart measured center-to-center. That said, the three exemplary embodiments of "double-ridge" attenuation strips—standard, heavy, and heavier—have different thicknesses (e.g., attenuation-strip base thicknesses) as respectively described (above) with reference to FIGS. 16A, 16B, 16C as the first version of the double-ridge attenuation strip 824, the second version of the double-ridge attenuation strip 824, and the third version of the double-ridge attenuation strip 824, respectively.

The "standard" attenuation-strip embodiment has a thickness of 0.054 inch between the two elongate protrusions and a thickness of 0.030 inch at the outer end of each adhesion flange. This "standard" EPDM attenuation strip has a mass per length of 0.0516 lb/ft. This exemplary "double-ridge" attenuation strip is depicted in FIG. 16A.

The "heavy" attenuation-strip embodiment is one millimeter (0.039 inch) thicker than the "standard" "double-ridge" attenuation-strip embodiment with a thickness of 0.093 inch between the two elongate protrusions and a thickness of 0.069 inch at the outer end of each adhesion flange. This "heavy" EPDM attenuation strip has a mass per length of 0.0792 lb/ft. This exemplary "double-ridge" attenuation strip is depicted in FIG. 16B.

The "heavier" attenuation-strip embodiment is two millimeters (0.079 inch) thicker than the "standard" "double-ridge" attenuation-strip embodiment with a thickness of 0.132 inch between the two elongate protrusions and a thickness of 0.108 inch at the outer end of each adhesion flange. This "heavier" EPDM attenuation strip has a mass per length of 0.108 lb/ft. This exemplary "double-ridge" attenuation strip is depicted in FIG. 16C.

"Double-Ridge" Attenuation Strips on a "Light Wall" Core

Tables 8-10 (below) illustrate the prophetic application of the three exemplary "double-ridge" attenuation strips to three different, light-wall paperboard cores constructed using (i) 4.625-inch paper strips (Table 8), (ii) 6-inch paper strips (Table 9), and (iii) 4-inch paper strips (Table 10). Each resulting paperboard core has an inner diameter of 3.830 inches, an outer diameter of 4.030 inches, a wall thickness of 0.100 inch, and a length of 13.75 inches.

Table 8 (below) illustrates the prophetic application of the three exemplary EPDM "double-ridge" attenuation strips (i.e., the standard, heavy, and heavier embodiments) in both single-start and dual-start configurations to a light-wall paperboard core formed using a 4.625 inch top-ply paper strip. The winding angle $\theta_w$ of the outer ply and the matching pitch angle $\theta$ of each attenuation strip is 68.6 degrees. The pitch length of each attenuation strip is 4.97 inches. Each "single-start" driveshaft damper requires 3.131 feet of attenuation strip, and each "dual-start" driveshaft damper requires 6.262 feet of attenuation strip.

TABLE 8

3.83" ID × 4.03"OD × 0.100" wall × 13.75" L; winding angle $\theta_w$ = 68.6°; pitch length L = 4.97

|  | core mass (lb) | strip mass (lb) | damper mass (lb) |
|---|---|---|---|
| "light wall" SAS-2EP |  |  |  |
| "standard" attenuation strip | 0.3825 | 0.1616 | 0.5441 |
| "heavy" attenuation strip (+1 mm) | 0.3825 | 0.2480 | 0.6305 |
| "heavier" attenuation strip (+2 mm) | 0.3825 | 0.3381 | 0.7206 |
| "light wall" DAS-2EP |  |  |  |
| "standard" attenuation strip | 0.3825 | 0.3232 | 0.7057 |
| "heavy" attenuation strip (+1 mm) | 0.3825 | 0.4960 | 0.8785 |
| "heavier" attenuation strip (+2 mm) | 0.3825 | 0.6762 | 1.0587 |

Table 9 (below) illustrates the prophetic application of the three exemplary EPDM "double-ridge" attenuation strips (i.e., the standard, heavy, and heavier embodiments) in both single-start and dual-start configurations to a light-wall paperboard core formed using a 6-inch top-ply paper strip. The winding angle $\theta_w$ of the outer ply and the matching pitch angle $\theta$ of each attenuation strip is 61.7 degrees. The pitch length of each attenuation strip is 6.81 inches. Each "single-start" driveshaft damper requires 2.414 feet of attenuation strip, and each "dual-start" driveshaft damper requires 4.828 feet of attenuation strip. As compared with Table 8, Table 9 demonstrates using wider strips of paper to form the paperboard core reduces the winding angle of the paperboard tube's helical winding and the pitch angle of each attenuation strip. This increases the pitch length of each attenuation strip and lessens the total mass of the driveshaft damper.

TABLE 9

3.83" ID × 4.03" OD × 0.100" wall × 13.75" length; winding angle $\theta_w$ = 61.7°; pitch length L = 6.81

|  | core mass (lb) | strip mass (lb) | damper mass (lb) |
|---|---|---|---|
| "light wall" SAS-2EP |  |  |  |
| "standard" attenuation strip | 0.3825 | 0.1246 | 0.5071 |
| "heavy" attenuation strip (+1 mm) | 0.3825 | 0.1912 | 0.5737 |
| "heavier" attenuation strip (+2 mm) | 0.3825 | 0.2607 | 0.6432 |

TABLE 9-continued 3.83" ID × 4.03" OD × 0.100" wall × 13.75" length; winding angle $\theta_w$ = 61.7°; pitch length L = 6.81

|  | core mass (lb) | strip mass (lb) | damper mass (lb) |
|---|---|---|---|
| "light wall" DAS-2EP |  |  |  |
| "standard" attenuation strip | 0.3825 | 0.2492 | 0.6317 |
| "heavy" attenuation strip (+1 mm) | 0.3825 | 0.3824 | 0.7649 |
| "heavier" attenuation strip (+2 mm) | 0.3825 | 0.5214 | 0.9039 |

Table 10 (below) illustrates the prophetic application of the three exemplary EPDM "double-ridge" attenuation strips (i.e., the standard, heavy, and heavier embodiments) in both single-start and dual-start configurations to a light-wall paperboard core formed using a 4-inch top-ply paper strip. The winding angle $\theta_w$ of the outer ply and the matching pitch angle $\theta$ of each attenuation strip is 71.6 degrees. The pitch length of each attenuation strip is 4.22 inches. Each "single-start" driveshaft damper requires 3.620 feet of attenuation strip, and each "dual-start" driveshaft damper requires 7.240 feet of attenuation strip. As compared with Table 8, Table 10 demonstrates using narrower strips of paper to form the paperboard core increases the winding angle of the paperboard tube's helical winding and the pitch angle of each attenuation strip. This decreases the pitch length of each attenuation strip and increases the total mass of the driveshaft damper.

TABLE 10

3.83" ID × 4.03" OD × 0.210" wall × 13.75" length; winding angle $\theta_w$ = 71.6°; pitch length L = 4.22

|  | core mass (lb) | strip mass (lb) | damper mass (lb) |
|---|---|---|---|
| "light wall" SAS-2EP |  |  |  |
| "standard" attenuation strip | 0.3825 | 0.1868 | 0.5693 |
| "heavy" attenuation strip (+1 mm) | 0.3825 | 0.2867 | 0.6692 |
| "heavier" attenuation strip (+2 mm) | 0.3825 | 0.3910 | 0.7735 |
| "light wall" DAS-2EP |  |  |  |
| "standard" attenuation strip | 0.3825 | 0.3736 | 0.7561 |
| "heavy" attenuation strip (+1 mm) | 0.3825 | 0.5734 | 0.9559 |
| "heavier" attenuation strip (+2 mm) | 0.3825 | 0.7820 | 1.1645 |

"Double-Ridge" Attenuation Strips on a "Heavy Wall" Core

Tables 11-13 (below) illustrate the prophetic application of the three exemplary "double-ridge" attenuation strips to three different, heavy-wall paperboard cores constructed using (i) 4.625-inch paper strips (Table 11), (ii) 6-inch paper strips (Table 12), and (iii) 4-inch paper strips (Table 13). Each resulting paperboard core has an inner diameter of 3.610 inches, an outer diameter of 4.030 inches, a wall thickness of 0.210 inch, and a length of 13.75 inches.

Table 11 (below) illustrates the prophetic application of the three exemplary EPDM "double-ridge" attenuation strips (i.e., the standard, heavy, and heavier embodiments) in both single-start and dual-start configurations to a heavy-wall paperboard core formed using a 4.625-inch top-ply paper strip. The winding angle $\theta_w$ of the outer ply and the matching pitch angle $\theta$ of each attenuation strip is 68.6 degrees. The pitch length of each attenuation strip is 4.97 inches. Each "single-start" driveshaft damper requires 3.135 feet of attenuation strip, and each "dual-start" driveshaft damper requires 6.27 feet of attenuation strip.

TABLE 11

3.61" ID × 4.03"OD × 0.210" wall × 13.75" length; winding angle $\theta_w$ = 68.6°; pitch length L = 4.97

|  | core mass (lb) | strip mass (lb) | damper mass (lb) |
|---|---|---|---|
| "heavy wall" SAS-2EP |  |  |  |
| "standard" attenuation strip | 0.7817 | 0.1618 | 0.9435 |
| "heavy" attenuation strip (+1 mm) | 0.7817 | 0.2483 | 1.0300 |
| "heavier" attenuation strip (+2 mm) | 0.7817 | 0.3386 | 1.1203 |
| "heavy wall" DAS-2EP |  |  |  |
| "standard" attenuation strip | 0.7817 | 0.3236 | 1.1053 |
| "heavy" attenuation strip (+1 mm) | 0.7817 | 0.4966 | 1.2783 |
| "heavier" attenuation strip (+2 mm) | 0.7817 | 0.6772 | 1.4589 |

Table 12 (below) illustrates the prophetic application of the three exemplary EPDM "double-ridge" attenuation strips (i.e., the standard, heavy, and heavier embodiments) in both single-start and dual-start configurations to a heavy-wall paperboard core formed using a 6-inch top-ply paper strip. The winding angle $\theta_w$ of the outer ply and the matching pitch angle $\theta$ of each attenuation strip is 61.7 degrees. The pitch length of each attenuation strip is 6.81 inches. Each "single-start" driveshaft damper requires 2.417 feet of attenuation strip, and each "dual-start" driveshaft damper requires 4.834 feet of attenuation strip. As compared with the Table 11, Table 12 demonstrates using wider strips of paper to form the paperboard core reduces the winding angle of the paperboard tube's helical winding and the pitch angle of each attenuation strip. This increases the pitch length of each attenuation strip and lessens the total mass of the driveshaft damper.

TABLE 12

3.61" ID × 4.03"OD × 0.210" wall × 13.75" length; winding angle $\theta_w$ = 61.7°; pitch length L = 6.81

|  | core mass (lb) | strip mass (lb) | damper mass (lb) |
|---|---|---|---|
| heavy wall" SAS-2EP |  |  |  |
| "standard" attenuation strip | 0.7817 | 0.1247 | 0.9064 |
| "heavy" attenuation strip (+1 mm) | 0.7817 | 0.1914 | 0.9731 |
| "heavier" attenuation strip (+2 mm) | 0.7817 | 0.2610 | 1.0427 |
| "heavy wall" DAS-2EP |  |  |  |
| "standard" attenuation strip | 0.7817 | 0.2494 | 1.0311 |
| "heavy" attenuation strip (+1 mm) | 0.7817 | 0.3828 | 1.1645 |
| "heavier" attenuation strip (+2 mm) | 0.7817 | 0.5220 | 1.3037 |

Table 13 (below) illustrates the prophetic application of the three exemplary EPDM "double-ridge" attenuation strips (i.e., the standard, heavy, and heavier embodiments) in both single-start and dual-start configurations to a heavy-wall paperboard core formed using a 4-inch top-ply paper strip. The winding angle $\theta_w$ of the outer ply and the matching pitch angle $\theta$ of each attenuation strip is 71.6 degrees. The pitch length of each attenuation strip is 4.22 inches. Each "single-start" driveshaft damper requires 3.625 feet of attenuation strip, and each "dual-start" driveshaft damper requires 7.250 feet of attenuation strip. As compared with the Table 11, Table 13 demonstrates using narrower strips of paper to form the paperboard core increases the winding angle of the paperboard tube's helical winding and the pitch angle of each attenuation strip. This decreases the pitch length of each attenuation strip and increases the total mass of the driveshaft damper.

TABLE 13

3.61" ID × 4.03"OD × 0.210" wall × 13.75" length; winding angle $\theta_w = 71.6°$; pitch length L = 4.22

|  | core mass (lb) | strip mass (lb) | damper mass (lb) |
|---|---|---|---|
| "heavy wall" SAS-2EP |  |  |  |
| "standard" attenuation strip | 0.7817 | 0.1871 | 0.9688 |
| "heavy" attenuation strip (+1 mm) | 0.7817 | 0.2871 | 1.0688 |
| "heavier" attenuation strip (+2 mm) | 0.7817 | 0.3915 | 1.1732 |
| "heavy wall" DAS-2EP |  |  |  |
| "standard" attenuation strip | 0.7817 | 0.3742 | 1.1559 |
| "heavy" attenuation strip (+1 mm) | 0.7817 | 0.5742 | 1.3559 |
| "heavier" attenuation strip (+2 mm) | 0.7817 | 0.7830 | 1.5647 |

OTHER ASPECTS AND EMBODIMENTS

The foregoing detailed description and accompanying figures set forth typical embodiments of driveshaft dampers for use in driveshafts to dampen or attenuate noise, vibration, and harshness (NVH). The disclosed driveshaft dampers include helically-wound driveshaft dampers with one or more attenuation strips. Also disclosed are systems and methods for making and using such helically-wound driveshaft dampers (e.g., combining two or more different kinds of driveshaft dampers to dampen NVH). The present disclosure is not limited to such exemplary embodiments. It will be apparent that numerous other embodiments of driveshaft dampers, and systems and methods for making and using driveshaft dampers, may be provided in accordance with the present disclosure. The present disclosure may utilize any variety of aspects, features, or steps, or combinations thereof. The figures may be schematic representations that are not necessarily drawn to scale.

It is within the scope of this disclosure for one or more of the terms "substantially," "about," "approximately," and/or the like, to qualify each adjective and adverb of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

While various aspects, features, and embodiments have been disclosed herein, other aspects, features, and embodiments will be apparent to those having ordinary skill in the art. The various disclosed aspects, features, and embodiments are for purposes of illustration and are not intended to be limiting. It is intended that the scope of the present invention includes at least the following claims and their equivalents:

The invention claimed is:

1. An NVH-reducing driveshaft damper, comprising:
a helically-wound tubular core having an outer diameter D and formed from a plurality of plies, the outermost ply helically wound at a winding angle $\theta_w$; and
one or more helically-wound attenuation strips mounted to the tubular core at a pitch angle $\theta$ and a pitch length L, the one or more helically-wound attenuation strips comprising a plurality of elongate protrusions, wherein the one or more helically-wound attenuation strips yield (i) an effective pitch length $L_e$, (ii) an effective pitch angle $\theta_e$ that exceeds both the winding angle $\theta_w$ and the pitch angle $\theta$ by at least 10 degrees, and (iii) an effective pitch ratio $P_e$ of at least 1.75, wherein:

$$\text{effective pitch length } L_e = \frac{\text{pitch length } L}{\text{number of elongate protrusions in damper}};$$

$$\text{effective pitch angle } \theta_e = \arctan\left(\frac{\pi D}{L_e}\right); \text{ and}$$

$$\text{effective pitch ratio } P_e = \frac{\text{core diameter } D}{\text{effective pitch length } L_e}.$$

2. The NVH-reducing driveshaft damper according to claim 1, wherein both the winding angle $\theta_w$ and the pitch angle $\theta$ are 78 degrees or less.

3. The NVH-reducing driveshaft damper according to claim 1, wherein both the winding angle $\theta_w$ and the pitch angle $\theta$ are 74 degrees or less.

4. The NVH-reducing driveshaft damper according to claim 1, wherein the effective pitch angle $\theta_e$ exceeds both the winding angle $\theta_w$ and the pitch angle $\theta$ by at least 12 degrees.

5. The NVH-reducing driveshaft damper according to claim 1, wherein the effective pitch ratio $P_e$ is at least 2.0.

6. The NVH-reducing driveshaft damper according to claim 1, wherein the one or more helically-wound attenuation strips comprise at least one helically-wound attenuation strip having at least three elongate protrusions having respective heights within a 5 percent variation from one another.

7. The NVH-reducing driveshaft damper according to claim 1, wherein the one or more helically-wound attenuation strips comprise two or more attenuation strips each having at least two elongate protrusions having respective heights within a 5 percent variation from one another.

8. The NVH-reducing driveshaft damper according to claim 1, comprising damping material mounted to the tubular core in a helical gap formed by the one or more helically-wound attenuation strips, the damping material being a different composition from the one or more helically-wound attenuation strips.

9. The NVH-reducing driveshaft damper according to claim 1, comprising polymeric batting and/or textile nonwoven material mounted to the tubular core.

10. A dampened driveshaft possessing NVH-reduction, comprising (i) a tubular driveshaft defining an internal annular space and (ii) the driveshaft damper according to claim 1 compressively positioned and frictionally secured within the tubular driveshaft.

11. A vehicle comprising the dampened tubular driveshaft of claim 10, wherein the driveshaft damper's tubular structure and the one or more helically-wound attenuation strips are configured to dampen a problematic resonance frequency.

12. A dampened driveshaft possessing NVH-reduction, comprising (i) a tubular driveshaft defining an internal annular space, (ii) a first driveshaft damper according to claim 1 compressively positioned and frictionally secured within the tubular driveshaft, and (iii) a second driveshaft damper positioned within the tubular driveshaft, wherein the first driveshaft damper and the second driveshaft damper are differently configured.

13. A vehicle comprising the dampened tubular driveshaft of claim 12.

14. An NVH-reducing driveshaft damper, comprising:
a helically-wound tubular core having an outer diameter D and formed from a plurality of plies, the outermost ply helically wound at a winding angle $\theta_w$; and
one or more helically-wound, unitary polymeric attenuation strips mounted to the tubular core at a pitch angle $\theta$ and a pitch length L, the one or more helically-wound, unitary polymeric attenuation strips comprising a plurality of elongate protrusions;
wherein the one or more helically-wound, unitary polymeric attenuation strips comprise at least one helically-wound, unitary polymeric attenuation strip having at least three elongate protrusions having respective heights within a 5 percent variation from one another; and
wherein the one or more helically-wound, unitary polymeric attenuation strips yield (i) an effective pitch length $L_e$, (ii) an effective pitch angle $\theta_e$ that exceeds both the winding angle $\theta_w$ and the pitch angle $\theta$ by at least 10 degrees, and (iii) an effective pitch ratio $P_e$ of at least 1.75, wherein:

$$\text{effective pitch length } L_e = \frac{\text{pitch length } L}{\text{number of elongate protrusions in damper}};$$

$$\text{effective pitch angle } \theta_e = \arctan\left(\frac{\pi D}{L_e}\right); \text{ and}$$

$$\text{effective pitch ratio } P_e = \frac{\text{core diameter } D}{\text{effective pitch length } L_e}.$$

15. The NVH-reducing driveshaft damper according to claim 14, wherein both the winding angle $\theta_w$ and the pitch angle $\theta$ are 78 degrees or less.

16. The NVH-reducing driveshaft damper according to claim 14, wherein both the winding angle $\theta_w$ and the pitch angle $\theta$ are 74 degrees or less.

17. The NVH-reducing driveshaft damper according to claim 14, wherein the effective pitch angle $\theta_e$ exceeds both the winding angle $\theta_w$ and the pitch angle $\theta$ by at least 12 degrees.

18. The NVH-reducing driveshaft damper according to claim 14, wherein the effective pitch ratio $P_e$ is at least 2.0.

19. The NVH-reducing driveshaft damper according to claim 14, comprising damping material mounted to the tubular core in a helical gap formed by the one or more helically-wound, unitary polymeric attenuation strips, the damping material being a different composition from the one or more helically-wound, unitary polymeric attenuation strips.

20. The NVH-reducing driveshaft damper according to claim 14, comprising polymeric batting and/or textile non-woven material mounted to the tubular core.

21. A dampened driveshaft possessing NVH-reduction, comprising (i) a tubular driveshaft defining an internal annular space and (ii) the driveshaft damper according to claim 14 compressively positioned and frictionally secured within the tubular driveshaft.

22. A vehicle comprising the dampened tubular driveshaft of claim 21, wherein the driveshaft damper's tubular structure and the one or more helically-wound, unitary polymeric attenuation strips are configured to dampen a problematic resonance frequency.

23. A dampened driveshaft possessing NVH-reduction, comprising (i) a tubular driveshaft defining an internal annular space, (ii) a first driveshaft damper according to claim 14 compressively positioned and frictionally secured within the tubular driveshaft, and (iii) a second driveshaft damper positioned within the tubular driveshaft, wherein the first driveshaft damper and the second driveshaft damper are differently configured.

24. A vehicle comprising the dampened tubular driveshaft of claim 23.

25. An NVH-reducing driveshaft damper, comprising:
a helically-wound tubular core having an outer diameter D and formed from a plurality of plies, the outermost ply helically wound at a winding angle $\theta_w$; and
one or more helically-wound, unitary polymeric attenuation strips mounted to the tubular core at a pitch angle $\theta$ and a pitch length L, the one or more helically-wound, unitary polymeric attenuation strips comprising a plurality of elongate protrusions;
wherein the one or more helically-wound, unitary polymeric attenuation strips comprise two or more attenuation strips each having at least two elongate protrusions having respective heights within a 5 percent variation from one another; and
wherein the one or more helically-wound, unitary polymeric attenuation strips yield (i) an effective pitch length $L_e$, (ii) an effective pitch angle $\theta_e$ that exceeds both the winding angle $\theta_w$ and the pitch angle $\theta$ by at least 10 degrees, and (iii) an effective pitch ratio $P_e$ of at least 1.75, wherein:

$$\text{effective pitch length } L_e = \frac{\text{pitch length } L}{\text{number of elongate protrusions in damper}};$$

$$\text{effective pitch angle } \theta_e = \arctan\left(\frac{\pi D}{L_e}\right); \text{ and}$$

$$\text{effective pitch ratio } P_e = \frac{\text{core diameter } D}{\text{effective pitch length } L_e}.$$

26. The NVH-reducing driveshaft damper according to claim 25, wherein both the winding angle $\theta_w$ and the pitch angle $\theta$ are 78 degrees or less.

27. The NVH-reducing driveshaft damper according to claim 25, wherein both the winding angle $\theta_w$ and the pitch angle $\theta$ are 74 degrees or less.

28. The NVH-reducing driveshaft damper according to claim 25, wherein the effective pitch angle $\theta_e$ exceeds both the winding angle $\theta_w$ and the pitch angle $\theta$ by at least 12 degrees.

29. The NVH-reducing driveshaft damper according to claim 25, wherein the effective pitch ratio $P_e$ is at least 2.0.

30. The NVH-reducing driveshaft damper according to claim 25, comprising damping material mounted to the tubular core in a helical gap formed by the one or more helically-wound, unitary polymeric attenuation strips, the damping material being a different composition from the one or more helically-wound, unitary polymeric attenuation strips.

31. The NVH-reducing driveshaft damper according to claim 25, comprising polymeric batting and/or textile non-woven material mounted to the tubular core.

32. A dampened driveshaft possessing NVH-reduction, comprising (i) a tubular driveshaft defining an internal annular space and (ii) the driveshaft damper according to claim 25 compressively positioned and frictionally secured within the tubular driveshaft.

33. A vehicle comprising the dampened tubular driveshaft of claim 32, wherein the driveshaft damper's tubular structure and the one or more helically-wound, unitary polymeric attenuation strips are configured to dampen a problematic resonance frequency.

34. A dampened driveshaft possessing NVH-reduction, comprising (i) a tubular driveshaft defining an internal annular space, (ii) a first driveshaft damper according to claim 25 compressively positioned and frictionally secured within the tubular driveshaft, and (iii) a second driveshaft damper positioned within the tubular driveshaft, wherein the first driveshaft damper and the second driveshaft damper are differently configured.

35. A vehicle comprising the dampened tubular driveshaft of claim 34.

\* \* \* \* \*

UNITED STATES PATENT AND TRADEMARK OFFICE
CERTIFICATE OF CORRECTION

| | |
|---|---|
| PATENT NO. | : 11,920,653 B1 |
| APPLICATION NO. | : 17/076079 |
| DATED | : March 5, 2024 |
| INVENTOR(S) | : Josh Wolfenbarger |

It is certified that error appears in the above-identified patent and that said Letters Patent is hereby corrected as shown below:

In the Specification

Column 10, delete Line 31 and insert: -- ing process may exhibit a pitch ratio P between --

Column 21, delete Line 25 and insert: -- 9°, 10° or more (e.g., 10°, 11°, 12°, 13°, 14°), 15° or more --

Column 21, delete Line 26 and insert: -- (e.g., 15°, 16°, etc.), or even 20° or more (e.g., 25° or more). --

Column 21, delete Line 32 and insert: -- between 45° and 80°). For example, Table 1 (below) pro- --

Column 22, delete Line 20 and insert: -- different effective pitch angles $\theta_e$. As one example, a first --

Column 24, delete Line 10 and insert: -- winding angle $\theta_w$ needs to fall within a range that will --

Column 44, delete Line 45 and insert: -- (FRF) for exemplary dampened driveshafts. For each of the --

Column 44, delete Line 54 and insert: -- damping the assembly). FRF testing is performed using a --

Column 45, delete Line 58 and insert: -- effective at eliminating NVH around 600 dB — and indeed --

Column 46, delete Line 33 and insert: -- 625 Hz) — and indeed nearly eliminating NVH through the --

Column 46, delete Line 50 and insert: -- automotive frequency of 600 Hz to 625 Hz) — and indeed --

Column 46, delete Line 64 and insert: -- driveshaft damper — except for the surficial foam — are presented --

Signed and Sealed this
Twenty-eighth Day of May, 2024

*Katherine Kelly Vidal*

Katherine Kelly Vidal
*Director of the United States Patent and Trademark Office*

CERTIFICATE OF CORRECTION (continued)
U.S. Pat. No. 11,920,653 B1

Column 47, delete Line 19 and insert: -- for this "thin walled" composite driveshaft damper — except --

Column 47, delete Line 20 and insert: -- for the 10.5-inch damper length and the surficial foam — are --

Column 48, delete Line 3 and insert: -- Fig. 56 depicts the frequency response function (FRF) --